US008829125B2

(12) United States Patent
Ding et al.

(10) Patent No.: US 8,829,125 B2
(45) Date of Patent: Sep. 9, 2014

(54) USE OF HYDROGEN AND AN ORGANOZINC COMPOUND FOR POLYMERIZATION AND POLYMER PROPERTY CONTROL

(71) Applicant: Chevron Phillips Chemical Company LP, The Woodlands, TX (US)

(72) Inventors: Errun Ding, Bartlesville, OK (US); Qing Yang, Bartlesville, OK (US); Albert P. Masino, Tulsa, OK (US); Youlu Yu, Bartlesville, OK (US); Lloyd W. Guatney, Bartlesville, OK (US); Jim B. Askew, Barnsdall, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 13/927,165

(22) Filed: Jun. 26, 2013

(65) Prior Publication Data
US 2013/0289226 A1 Oct. 31, 2013

Related U.S. Application Data

(63) Continuation of application No. 13/329,404, filed on Dec. 19, 2011, now Pat. No. 8,501,882.

(51) Int. Cl.
| | |
|---|---|
| C08F 4/00 | (2006.01) |
| C08F 4/06 | (2006.01) |
| C08F 4/12 | (2006.01) |
| C08F 2/00 | (2006.01) |
| C08F 210/00 | (2006.01) |
| C08F 210/16 | (2006.01) |
| C08F 10/00 | (2006.01) |
| C08F 110/02 | (2006.01) |

(52) U.S. Cl.
CPC .......... *C08F 210/16* (2013.01); *C08F 2400/02* (2013.01); *C08F 110/02* (2013.01); *C08F 10/00* (2013.01)
USPC ............. 526/90; 526/192; 526/226; 526/234; 526/348

(58) Field of Classification Search
USPC ............................ 526/90, 226, 234, 192, 348
See application file for complete search history.

(56) References Cited

U.S. PATENT DOCUMENTS

| | | | |
|---|---|---|---|
| 2,825,721 A | 3/1958 | Hogan et al. | |
| 3,119,569 A | 1/1964 | Baricordi | |
| 3,225,023 A | 12/1965 | Hogal et al. | |
| 3,226,205 A | 12/1965 | Rohlfing | |
| 3,242,099 A | 3/1966 | Manyik | |

(Continued)

FOREIGN PATENT DOCUMENTS

| | | |
|---|---|---|
| EP | 0 435 250 A2 | 7/1991 |
| EP | 1 092 730 A1 | 4/2001 |

(Continued)

OTHER PUBLICATIONS

Modern Plastics Encyclopedia '96, Mid-Nov. 1995 Issue, vol. 72, No. 12, 3 pages.

(Continued)

*Primary Examiner* — William Cheung
(74) *Attorney, Agent, or Firm* — Merchant & Gould P.C.

(57) ABSTRACT

Methods of controlling polymerization reactions using a synergistic amount of hydrogen and an organozinc compound are disclosed. The resulting polymers have lower molecular weights and higher melt flow indices.

20 Claims, 2 Drawing Sheets

(56) References Cited

U.S. PATENT DOCUMENTS

| | | |
|---|---|---|
| 3,248,179 A | 4/1966 | Norwood |
| 3,622,521 A | 11/1971 | Hogan et al. |
| 3,625,864 A | 12/1971 | Horvath |
| 3,887,494 A | 6/1975 | Dietz |
| 3,900,457 A | 8/1975 | Witt |
| 3,976,632 A | 8/1976 | Delap |
| 4,053,436 A | 10/1977 | Hogan et al. |
| 4,060,480 A | 11/1977 | Reed et al. |
| 4,081,407 A | 3/1978 | Short et al. |
| 4,151,122 A | 4/1979 | McDaniel et al. |
| 4,182,815 A | 1/1980 | McDaniel et al. |
| 4,247,421 A | 1/1981 | McDaniel et al. |
| 4,248,735 A | 2/1981 | McDaniel et al. |
| 4,296,001 A | 10/1981 | Hawley |
| 4,297,460 A | 10/1981 | McDaniel et al. |
| 4,301,034 A | 11/1981 | McDaniel |
| 4,339,559 A | 7/1982 | McDaniel |
| 4,364,842 A | 12/1982 | McDaniel et al. |
| 4,364,854 A | 12/1982 | McDaniel et al. |
| 4,364,855 A | 12/1982 | McDaniel et al. |
| 4,392,990 A | 7/1983 | Witt |
| 4,397,766 A | 8/1983 | Hawley et al. |
| 4,397,769 A | 8/1983 | McDaniel et al. |
| 4,405,501 A | 9/1983 | Witt |
| 4,444,962 A | 4/1984 | McDaniel et al. |
| 4,444,964 A | 4/1984 | McDaniel et al. |
| 4,444,965 A | 4/1984 | McDaniel et al. |
| 4,452,910 A | 6/1984 | Hopkins et al. |
| 4,460,756 A | 7/1984 | McDaniel et al. |
| 4,501,885 A | 2/1985 | Sherk |
| 4,504,638 A | 3/1985 | McDaniel et al. |
| 4,547,557 A | 10/1985 | McDaniel |
| 4,588,790 A | 5/1986 | Jenkins |
| 4,735,931 A | 4/1988 | McDaniel et al. |
| 4,794,096 A | 12/1988 | Ewen |
| 4,806,513 A | 2/1989 | McDaniel et al. |
| 4,808,561 A | 2/1989 | Welborn |
| 4,820,785 A | 4/1989 | McDaniel et al. |
| 4,855,271 A | 8/1989 | McDaniel et al. |
| 4,939,217 A | 7/1990 | Stricklen |
| 4,981,831 A | 1/1991 | Knudsen et al. |
| 4,988,657 A | 1/1991 | Martin et al. |
| 5,037,911 A | 8/1991 | McDaniel et al. |
| 5,179,178 A | 1/1993 | Stacy et al. |
| 5,191,132 A | 3/1993 | Patsidis et al. |
| 5,210,352 A | 5/1993 | Alt et al. |
| 5,219,817 A | 6/1993 | McDaniel et al. |
| 5,221,654 A | 6/1993 | McDaniel et al. |
| 5,237,025 A | 8/1993 | Benham et al. |
| 5,244,990 A | 9/1993 | Mitchell |
| 5,275,992 A | 1/1994 | Mitchell et al. |
| 5,347,026 A | 9/1994 | Patsidis et al. |
| 5,352,749 A | 10/1994 | DeChellis |
| 5,376,611 A | 12/1994 | Shveima |
| 5,399,636 A | 3/1995 | Alt et al. |
| 5,401,817 A | 3/1995 | Palackal et al. |
| 5,420,320 A | 5/1995 | Zenk et al. |
| 5,436,304 A | 7/1995 | Griffin |
| 5,436,305 A | 7/1995 | Alt et al. |
| 5,451,649 A | 9/1995 | Zenk et al. |
| 5,455,314 A | 10/1995 | Burns |
| 5,480,848 A | 1/1996 | Geerts |
| 5,496,781 A | 3/1996 | Geerts et al. |
| 5,498,581 A | 3/1996 | Welch et al. |
| 5,541,272 A | 7/1996 | Schmid et al. |
| 5,554,795 A | 9/1996 | Frey et al. |
| 5,563,284 A | 10/1996 | Frey et al. |
| 5,565,175 A | 10/1996 | Hottovy |
| 5,565,592 A | 10/1996 | Patsidis et al. |
| 5,571,880 A | 11/1996 | Alt et al. |
| 5,575,979 A | 11/1996 | Hanson |
| 5,576,259 A | 11/1996 | Hasegawa et al. |
| 5,594,078 A | 1/1997 | Welch et al. |
| 5,610,247 A | 3/1997 | Alt et al. |
| 5,627,247 A | 5/1997 | Alt et al. |
| 5,631,203 A | 5/1997 | Welch et al. |
| 5,631,335 A | 5/1997 | Alt et al. |
| 5,654,454 A | 8/1997 | Peifer et al. |
| 5,668,230 A | 9/1997 | Schertl et al. |
| 5,705,478 A | 1/1998 | Boime |
| 5,705,579 A | 1/1998 | Hawley et al. |
| 5,739,220 A | 4/1998 | Shamshoum et al. |
| 5,807,938 A | 9/1998 | Kaneko et al. |
| 5,919,983 A | 7/1999 | Rosen et al. |
| 6,090,740 A | 7/2000 | Agapiou et al. |
| 6,107,230 A | 8/2000 | McDaniel et al. |
| 6,165,929 A | 12/2000 | McDaniel et al. |
| 6,239,235 B1 | 5/2001 | Hottovy |
| 6,262,191 B1 | 7/2001 | Hottovy |
| 6,294,494 B1 | 9/2001 | McDaniel et al. |
| 6,300,271 B1 | 10/2001 | McDaniel |
| 6,316,553 B1 | 11/2001 | McDaniel et al. |
| 6,355,594 B1 | 3/2002 | McDaniel |
| 6,376,415 B1 | 4/2002 | McDaniel et al. |
| 6,388,017 B1 | 5/2002 | McDaniel et al. |
| 6,391,816 B1 | 5/2002 | McDaniel et al. |
| 6,395,666 B1 | 5/2002 | McDaniel |
| 6,524,987 B1 | 2/2003 | Collins et al. |
| 6,548,441 B1 | 4/2003 | McDaniel et al. |
| 6,548,442 B1 | 4/2003 | McDaniel |
| 6,576,583 B1 | 6/2003 | McDaniel et al. |
| 6,613,712 B1 | 9/2003 | McDaniel |
| 6,632,894 B1 | 10/2003 | McDaniel et al. |
| 6,653,416 B2 | 11/2003 | McDaniel et al. |
| 6,667,274 B1 | 12/2003 | Hawley et al. |
| 6,750,302 B1 | 6/2004 | McDaniel et al. |
| 6,831,141 B2 | 12/2004 | McDaniel et al. |
| 6,833,338 B2 | 12/2004 | McDaniel et al. |
| 6,833,415 B2 | 12/2004 | Kendrick |
| 6,933,353 B2 | 8/2005 | Wang |
| 7,041,617 B2 | 5/2006 | Jensen et al. |
| 7,119,153 B2 | 10/2006 | Jensen et al. |
| 7,196,147 B2 | 3/2007 | Wang et al. |
| 7,294,599 B2 | 11/2007 | Jensen et al. |
| 7,312,283 B2 | 12/2007 | Martin et al. |
| 7,417,097 B2 | 8/2008 | Yu et al. |
| 7,501,372 B2 | 3/2009 | Thorn et al. |
| 7,884,163 B2 | 2/2011 | McDaniel et al. |
| 7,915,192 B2 | 3/2011 | Arriola et al. |
| 7,951,192 B2 | 5/2011 | Yadin et al. |
| 7,951,882 B2 | 5/2011 | Arriola et al. |
| 8,114,946 B2 | 2/2012 | Yang et al. |
| 8,198,374 B2 | 6/2012 | Arriola et al. |
| 8,501,882 B2 | 8/2013 | Ding et al. |
| 8,680,218 B1 | 3/2014 | Yang et al. |
| 2004/0059070 A1 | 3/2004 | Whitte et al. |
| 2007/0010616 A1 | 1/2007 | Kapur et al. |
| 2008/0311812 A1 | 12/2008 | Arriola et al. |
| 2011/0282016 A1* | 11/2011 | Carter et al. .......... 526/145 |

FOREIGN PATENT DOCUMENTS

| | | |
|---|---|---|
| GB | 978541 A | 12/1964 |
| GB | 1010075 A | 11/1965 |
| JP | 5093014 A | 4/1993 |
| WO | WO 2001/32307 | 5/2001 |
| WO | WO 2005/090427 | 9/2005 |

OTHER PUBLICATIONS

Film Extrusion Manual—*Process, Materials, Properties*, TAPPI Press, 1992, pp. ix-xxiii.

Pinnavaia, "Intercalated Clay Catalysts," Science, 1983, 220(4595), pp. 365-371.

Thomas, "Sheet Silicate Intercalates: New Agents for Unusual Chemical Conversions," Intercalation Chemistry (S. Whittington and A. Jacobson, eds.), Academic Press, Inc. Ch. 3, 1972, pp. 55-99.

(56) References Cited

OTHER PUBLICATIONS

Li, et al., Coordination Copolymerization of Severely Encumbered Isoalkenes with Ethylene: Enhanced Enchainment Mediated by Binuclear Catalysts and Cocatalysts, JACS Articles, 2005, 127, 14756-14768.

Hawley's Condensed Chemical Dictionary, 11th Ed., John Wiley & Sons, 1995, 3 pages.

Cotton, F.A., Wilkinson, G., Murillo, C. A., and Bochmann, M., Advanced Inorganic Chemistry, 6th Ed., Wiley-Interscience, 1999, 4 pages.

International Application PCT/US2012/069661 Search Report dated Apr. 5, 2013, 4 pages.

U.S. Appl. No. 13/753,556, filed Jan. 30, 2013, 54 pages.

* cited by examiner

USE OF HYDROGEN AND AN ORGANOZINC COMPOUND FOR POLYMERIZATION AND POLYMER PROPERTY CONTROL

REFERENCE TO RELATED APPLICATION

This application is a continuation application of U.S. patent application Ser. No. 13/329,404, filed on Dec. 19, 2011, now U.S. Pat. No. 8,501,882, the disclosure of which is incorporated herein by reference in its entirety.

BACKGROUND OF THE INVENTION

There are various methods and materials that can be employed to reduce the molecular weight and/or increase the melt flow index of an olefin-based polymer. For example, hydrogen can be used to produce polymers having lower molecular weights or higher melt indices. However, the use of excessive amounts of hydrogen may adversely affect the polymerization process and other polymer properties.

It would be beneficial to develop new methods that can effectively reduce the molecular weight and/or increase the melt index of an olefin-based polymer without the use of excessive amounts of hydrogen, resulting in improved polymerization and polymer property control. Accordingly, it is to these ends that the present disclosure is directed.

SUMMARY OF THE INVENTION

This summary is provided to introduce a selection of concepts in a simplified, form that are further described below in the detailed description. This summary is not intended to identify required or essential features of the claimed subject matter. Nor is this summary intended to be used to limit the scope of the claimed subject matter.

Methods of controlling a polymerization reaction and for polymerizing olefins are disclosed herein. Generally, such methods employ the use of both hydrogen and an organozinc compound.

Consistent with aspects of the invention disclosed herein, a method, of controlling a polymerization reaction in a polymerization reactor system can comprise introducing a synergistic amount of hydrogen and an organozinc compound into the polymerization reactor system to reduce a weight-average molecular weight (Mw) and/or to increase a melt index (MI) of an olefin polymer produced by the polymerization reaction. The hydrogen and/or the organozinc compound can be introduced into a polymerization reactor within the polymerization reactor system, and/or the hydrogen and/or the organozinc compound can be introduced into the polymerization reaction system at a feed or inlet location other than directly into a polymerization reactor.

Another method of controlling a polymerization reaction in a polymerization reactor system is described herein, and in this aspect, the method can comprise:

(i) introducing a transition metal-based catalyst composition, an olefin monomer, and optionally an olefin comonomer into a polymerization reactor within the polymerization reactor system;

(ii) contacting the transition metal-based catalyst composition with the olefin monomer and the optional olefin comonomer under polymerization conditions to produce an olefin polymer; and (iii) introducing a synergistic amount of hydrogen and an organozinc compound into the polymerization reactor system to reduce a Mw and/or to increase a MI of the olefin polymer.

In yet another aspect, an olefin polymerization process is disclosed. This process can comprise contacting a transition metal-based catalyst composition with an olefin monomer and optionally an olefin comonomer under polymerization conditions, and in the presence of a synergistic amount of hydrogen and an organozinc compound, to produce an olefin polymer. In this process, a Mw of the olefin polymer can be less than about 200,000 g/mol and/or a MI of the olefin polymer can be greater than about 1 g/10 min.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects may be directed to various feature combinations and sub-combinations described in the detailed description.

DEFINITIONS

Figure 1:
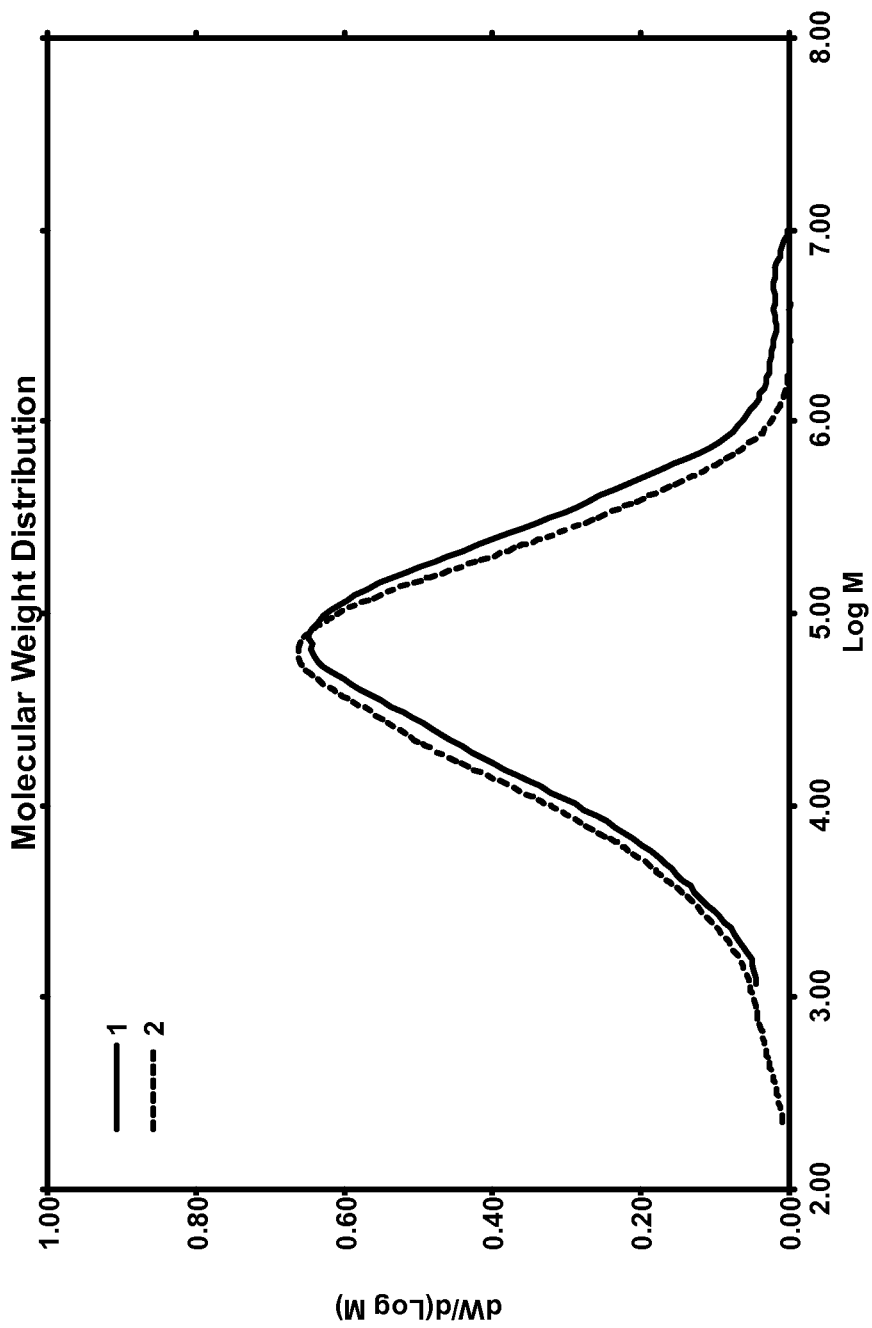
FIG. 1 presents a plot of the molecular weight distributions of the polymers of Examples 1-2.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Regarding claim transitional terms or phrases, the transitional term "comprising," which is synonymous with "including," "containing," "having," or "characterized by," is inclusive or open-ended and does not exclude additional, unrecited elements or method steps. The transitional phrase "consisting of" excludes any element, step, or ingredient not specified in the claim. The transitional phrase "consisting essentially of" limits the scope of a claim to the specified materials or steps and those that do not materially affect the basic and novel characteristic(s) of the claim, A "consisting essentially of" claim occupies a middle ground between closed claims that are written in a "consisting of" format and hilly open claims that are drafted in a "comprising" format. Absent an indication to the contrary, describing a compound or composition as "consisting essentially of" is not to be construed as "comprising," but is intended to describe the recited component that includes materials which do not significantly alter the composition or method to which the term is applied. For example, a feedstock consisting essentially of a material A can include impurities typically present in a commercially produced or commercially available sample of the recited compound or composition. When a claim includes different features and/or feature classes (for example, a method step, feedstock features, and/or product features, among other possibilities), the transitional terms comprising, consisting essentially of, and consisting of apply only to the feature class to which it is utilized, and it is possible to have different transitional terms or phrases utilized with different features within a claim. For example, a method can comprise several recited steps (and other non-recited steps), but utilize a system preparation consisting of specific components; alternatively, consisting essentially of specific components; or alternatively, comprising the specific components and other non-recited components. While compositions and methods are often described in terms of "comprising" various components or steps, the compositions and methods can also "consist essentially of" or "consist of" the various components or steps, unless stated otherwise. For example, a catalyst composition consistent with aspects of the present invention can comprise; alternatively, can consist essentially of; or alternatively, can consist of; (i) a transition metal compound, (ii) an activator, and (iii) optionally, a co-catalyst.

The terms "a," "an," and "the" are intended to include plural alternatives, e.g., at least one. For instance, the disclosure of "an organozinc compound," "an olefin comonomer," etc., is meant to encompass one, or mixtures or combinations of more than one, organozinc compound, olefin comonomer, etc., unless otherwise specified.

Groups of elements of the table are indicated using the numbering scheme indicated in the version of the periodic table of elements published in *Chemical and Engineering News*, 63(5), 27, 1985. In some instances, a group of elements may be indicated using a common name assigned to the group; for example, alkali metals for Group 1 elements, alkaline earth metals for Group 2 elements, transition metals for Group 3-12 elements, and halogens or halides for Group 17 elements.

For any particular compound or group disclosed herein, any name or structure (general or specific) presented is intended to encompass all conformational isomers, regioisomers, stereoisomers, and mixtures thereof that can arise from a particular set of substituents, unless otherwise specified. The name or structure (general or specific) also encompasses all enantiomers, diastereomers, and other optical isomers (if there are any) whether in enantiomeric or racemic forms, as well as mixtures of stereoisomers, as would be recognized by a skilled artisan, unless otherwise specified. A general reference to pentane, for example, includes n-pentane, 2-methylbutane, and 2,2-dimethylpropane; and a general reference to a butyl group includes a n-butyl group, a sec-butyl group, an iso-butyl group, and a t-butyl group.

Within this disclosure, the normal rules of organic nomenclature will prevail. For instance, when referencing substituted compounds or groups, references to substitution patterns are taken to indicate that the indicated group(s) is(are) located at the indicated position and that all other non-indicated positions are hydrogen. For example, reference to a 4-substituted phenyl group indicates that there is a non-hydrogen substituent located at the 4 position and hydrogens located at the 2, 3, 5, and 6 positions. By way of another example, reference to a 3-substituted naphth-2-yl indicates that there is a non-hydrogen substituent located at the 3 position and hydrogens located at the 4, 5, 6, 7, and 8 positions. References to compounds or groups having substitutions at positions in addition to the indicated position will be referenced using comprising or some other alternative language. For example, a reference to a phenyl group comprising a substituent at the 4 position refers to a phenyl group having a substituent at the 4 position and hydrogen or any non-hydrogen substituent at the 2, 3, 5, and 6 positions.

In an aspect, a chemical "group" is described according to how that group is formally derived from a reference or "parent" compound, for example, by the number of hydrogen atoms formally removed from the parent compound to generate the group, even if that group is not literally synthesized in this manner. These groups can be utilized as substituents or coordinated or bonded to metal atoms. By way of example, an "alkyl group" formally can be derived by removing one hydrogen atom from an alkane, while an "alkylene group" formally can be derived by removing two hydrogen atoms from an alkane. Moreover, a more general term can be used to encompass a variety of groups that formally are derived by removing any number ("one or more") hydrogen atoms from a parent compound, which in this example can be described as an "alkane group," and which encompasses an "alkyl group," an "alkylene group," and materials have three or more hydrogen atoms, as necessary for the situation, removed from the alkane. The disclosure that a substituent, ligand, or other chemical moiety may constitute a particular "group" implies that the well-known rules of chemical structure and bonding are followed when that group is employed as described. When describing a group as being "derived by," "derived from," "formed by," or "formed from," such terms are used in a formal sense and are not intended to reflect any specific synthetic methods or procedure, unless specified otherwise or the context requires otherwise.

The term "substituted" when used to describe a group or a chain of carbon atoms, for example, when referring to a substituted analog of a particular group or chain, is intended to describe or group or chain wherein any non-hydrogen moiety formally replaces a hydrogen in that group or chain, and is intended to be non-limiting, unless stated otherwise. A group or chain also can be referred to herein as "unsubstituted" or by equivalent terms such as "non-substituted," which refers to the original group or chain. "Substituted" is intended to be non-limiting and can include hydrocarbon substituents as specified and as understood by one of ordinary skill in the art.

The term "hydrocarbon" whenever used in this specification and claims refers to a compound containing only carbon and hydrogen. Other identifiers can be utilized to indicate the presence of particular groups in the hydrocarbon (e.g., halogenated hydrocarbon indicates the presence of one or more halogen atoms replacing an equivalent number of hydrogen atoms in the hydrocarbon). The term "hydrocarbyl group" is used herein in accordance with the definition specified by IUPAC: a univalent group formed by removing a hydrogen atom from a hydrocarbon (that is, a group containing only carbon and hydrogen). Similarly, a "hydrocarbylene group" refers to a group formed by removing two hydrogen atoms from a hydrocarbon, either two hydrogen atoms from one carbon atom or one hydrogen atom from each of two different carbon atoms. Therefore, in accordance with the terminology used herein, a "hydrocarbon group" refers to a generalized group formed by removing one or more hydrogen atoms (as needed for the particular group) from a hydrocarbon. A "hydrocarbyl group," "hydrocarbylene group," and "hydrocarbon group" can be acyclic or cyclic groups, and/or can be linear or branched. A "hydrocarbyl group," "hydrocarbylene group," and "hydrocarbon group" can include rings, ring systems, aromatic rings, and aromatic ring systems, which contain only carbon and hydrogen, "Hydrocarbyl groups," "hydrocarbylene groups," and "hydrocarbon groups" include, by way of example, aryl, arylene, arene groups, alkyl, alkylene, alkane groups, cycloalkyl, cycloalkylene, cycloalkane groups, aralkyl, aralkylene, and aralkane groups, respectively, among other groups as members.

An aliphatic compound is a non-aromatic organic compound. An "aliphatic group" is a generalized group formed by removing one or more hydrogen atoms (as needed for the particular group) from the carbon atoms of an aliphatic compound. An aliphatic compound can be acyclic or cyclic, saturated or unsaturated, and/or linear or branched organic compound. Aliphatic compounds and aliphatic groups can contain organic functional group(s) and/or atom(s) other than carbon and hydrogen unless otherwise specified (e.g., an aliphatic hydrocarbon).

An "aromatic group" refers to a generalized group formed by removing one or more hydrogen atoms (as needed for the particular group and at least one of which is an aromatic ring carbon atom) from an aromatic compound. Thus, an "aromatic group" as used herein refers to a group derived by removing one or more hydrogen atoms from an aromatic compound, that is, a compound containing a cyclically conjugated hydrocarbon that follows the Hückel (4n+2) rule and containing (4n+2) pi-electrons, where n is an integer from 1 to about 5. Aromatic compounds and hence "aromatic groups" can be monocyclic or polycyclic unless otherwise specified. Aromatic compounds include "arenes" (hydrocarbon aromatic compounds), examples of which can include, but are not limited to, benzene, naphthalene, and toluene, among others. As disclosed herein, the term "substituted" can be used to describe an aromatic group wherein any non-hydrogen moiety formally replaces a hydrogen in that group, and is intended to be non-limiting, unless stated otherwise.

The term "alkane" whenever used in this specification and claims refers to a saturated hydrocarbon compound. Other identifiers can be utilized to indicate the presence of particular groups in the alkane (e.g. halogenated alkane indicates that the presence of one or more halogen atoms replacing an equivalent number of hydrogen atoms in the alkane). The term "alkyl group" is used herein in accordance with the definition specified by IUPAC: a univalent group formed by removing a hydrogen atom from an alkane. Similarly, an "alkylene group" refers to a group formed by removing two hydrogen atoms from an alkane (either two hydrogen atoms from one carbon atom or one hydrogen atom from two different carbon atoms). An "alkane group" is a general term that refers to a group formed by removing one or more hydrogen atoms (as necessary for the particular group) from an alkane. An "alkyl group," "alkylene group," and "alkane group" can be acyclic or cyclic groups, and/or may be linear or branched unless otherwise specified. Primary, secondary, and tertiary alkyl group are derived by removal of a hydrogen atom from a primary, secondary, tertiary carbon atom, respectively, of an alkane. The n-alkyl group may be derived by removal of a hydrogen atom from a terminal carbon atom of a linear alkane. The groups $RCH_2$ ($R \neq H$), $R_2CH$($R \neq H$), and $R_3C$ ($R \neq H$) are primary, secondary, and tertiary alkyl groups, respectively.

A cycloalkane is a saturated cyclic hydrocarbon, with or without side chains (e.g., cyclobutane or methylcyclobutane). Unsaturated cyclic hydrocarbons having at least one non-aromatic endocyclic carbon-carbon double or one triple bond are cycloalkenes and cycloalkynes, respectively. Unsaturated cyclic hydrocarbons having more than one such multiple bond can further specify the number and/or position(s) of such multiple bonds (e.g., cycloalkadienes, cycloalkatrienes, and so forth). The unsaturated cyclic hydrocarbons can be further identified by the position of the carbon-carbon multiple bond(s).

A "cycloalkyl group" is a univalent group derived by removing a hydrogen atom from a ring carbon atom from a cycloalkane. For example, a 1-methylcyclopropyl group and a 2-methylcyclopropyl group are illustrated as follows:

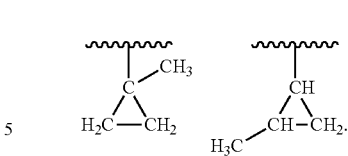

A "cycloalkylene group" refers to a group derived by removing two hydrogen atoms from a cycloalkane, at least one of which is a ring carbon. Thus, a "cycloalkylene group" includes a group derived from a cycloalkane in which two hydrogen atoms are formally removed from the same ring carbon, a group derived from a cycloalkane in which two hydrogen atoms are formally removed from two different ring carbons, and a group derived from a cycloalkane in which a first hydrogen atom is formally removed from a ring carbon and a second hydrogen atom is formally removed from a carbon atom that is not a ring carbon, A "cycloalkane group" refers to a generalized group formed by removing one or more hydrogen atoms (as necessary for the particular group and at least one of which is a ring carbon) from a cycloalkane.

The term "alkene" whenever used in this specification and claims refers to a compound that has at least one non-aromatic carbon-carbon double bond. The term "alkene" includes aliphatic or aromatic, cyclic or acyclic, and/or linear and branched alkenes unless expressly stated otherwise. Alkenes can also be further identified by the position of the carbon-carbon double bond. Alkenes having more than one such multiple bond are alkadienes, alkatrienes, and so forth. The alkene can be farther identified by the position(s) of the carbon-carbon double bond(s).

An "alkenyl group" is a univalent group derived from an alkene by removal of a hydrogen atom from any carbon atom of the alkene. Thus, "alkenyl group" includes groups in which the hydrogen atom is formally removed from an $sp^2$ hybridized (olefinic) carbon atom and groups in which the hydrogen atom is formally removed from any other carbon atom. For example and unless otherwise specified, propen-1-yl (—CH=CHCH$_3$), propen-2-yl [(CH$_3$)C=CH$_2$], and propen-3-yl (—CH$_2$CH=CH$_2$) groups are all encompassed with the term "alkenyl group." Similarly, an "alkenylene group" refers to a group formed by formally removing two hydrogen atoms from an alkene, either two hydrogen atoms from one carbon atom or one hydrogen atom from two different carbon atoms. An "alkene group" refers to a generalized, group formed by removing one or more hydrogen atoms (as needed for the particular group) from an alkene. When the hydrogen atom is removed from a carbon atom participating in a carbon-carbon double bond, the regiochemistry of the carbon from which the hydrogen atom is removed, and regiochemistry of the carbon-carbon double bond can both be specified. Alkenyl groups can also have more than one such multiple bond. The alkene group can also be further identified by the position(s) of the carbon-carbon double bond(s).

The term "alkyne" is used in this specification and claims to refer to a compound that has at least one carbon-carbon triple bond. The term "alkyne" includes aliphatic or aromatic, cyclic or acyclic, and/or linear and branched alkynes unless expressly stated otherwise. Alkynes having more than one such multiple bond are alkadiynes, alkatriynes, and so forth. The alkyne group can also be further identified by the position(s) of the carbon-carbon triple bond(s).

An "alkynyl group" is a univalent group derived from an alkyne by removal of a hydrogen atom from any carbon atom of the alkyne. Thus, "alkynyl group" includes groups in which the hydrogen atom is formally removed from an sp hybridized (acetylenic) carbon atom and groups in which the hydrogen atom is formally removed from any other carbon atom. For example and unless otherwise specified, 1-propyn-1-yl (—C≡CCH$_3$) and propyn-3-yl (HC≡CCH$_2$—) groups are encompassed with the term "alkynyl group." Similarly, an "alkynylene group" refers to a group formed by formally removing two hydrogen atoms from an alkyne, either two hydrogen atoms from one carbon atom if possible or one hydrogen atom from two different carbon atoms. An "alkyne group" refers to a generalized group formed by removing one or more hydrogen atoms (as needed for the particular group) from an alkyne. Alkyne groups can have more than one such multiple bond. Alkyne groups can also be further identified by the position(s) of the carbon-carbon triple bond(s).

An "aryl group" refers to a generalized group formed by removing a hydrogen atom from an aromatic hydrocarbon ring carbon atom from an arene. One example of an "aryl group" is ortho-tolyl (o-tolyl), the structure of which is shown here.

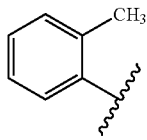 [SMILES: *c1ccccc1C]

Similarly, an "arylene group" refers to a group formed by removing two hydrogen atoms (at least one of which is from an aromatic hydrocarbon ring carbon) from an arene. An "arene group" refers to a generalized group formed by removing one or more hydrogen atoms (as needed for the particular group and at least one of which is an aromatic hydrocarbon ring carbon) from an arene.

An "aralkyl group" is an aryl-substituted alkyl group having a free valance at a non-aromatic carbon atom, for example, a benzyl group is an "aralkyl" group. Similarly, an "aralkylene group" is an aryl-substituted alkylene group having two free valances at a single non-aromatic carbon atom or a free valence at two non-aromatic carbon atoms while an "aralkane group" is a generalized is an aryl-substituted alkane group having one or more free valances at a non-aromatic carbon atom(s).

The term "polymer" is used herein generically to include olefin homopolymers, copolymers, terpolymers, and so forth. A copolymer can be derived from an olefin monomer and one olefin comonomer, while a terpolymer can be derived from an olefin monomer and two olefin comonomers. Accordingly, "polymer" encompasses copolymers, terpolymers, etc., derived from any olefin monomer and comonomer(s) disclosed herein. Similarly, an ethylene polymer would include ethylene homopolymers, ethylene copolymers, ethylene terpolymers, and the like. As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer could be categorized an as ethylene/1-hexene copolymer. The term "polymer" also is meant to include all molecular weight polymers, and is inclusive of lower molecular weight polymers or oligomers. Applicants intend for the term "polymer" to encompass oligomers derived from any olefin monomer disclosed herein (as well from an olefin monomer and one olefin comonomer, an olefin monomer and two olefin comonomers, and so forth).

In like manner, the scope of the term "polymerization" includes homopolymerization, copolymerization, telpolymerization, etc., as well as processes that might also be referred to as oligomerization processes. Therefore, a copolymerization process would involve contacting an olefin monomer (e.g., ethylene) and an olefin comonomer (e.g., 1-hexene) to produce an olefin copolymer.

The term "synergistic amount" of hydrogen and an organozinc compound is used herein to indicate that the combined addition (whether fed separately or in combination) of hydrogen and an organozinc compound has a "synergistic effect" on certain properties of the polymer, i.e., the effect of the addition of the synergistic amount of the two different components is greater than the effect of each component individually, and moreover, is greater than the sum of the individual component effects.

The term "co-catalyst" is used generally herein to refer to compounds such as aluminoxane compounds, organoboron or organoborate compounds, ionizing ionic compounds, organoaluminum compounds, organomagnesium compounds, organolithium compounds, and the like, that can constitute one component of a catalyst composition, when used in addition to an activator-support. The term "co-catalyst" is used regardless of the actual function of the compound or any chemical mechanism by which the compound may operate.

The terms "chemically-treated solid oxide," "treated solid oxide compound," and the like, are used herein to indicate a solid, inorganic oxide of relatively high porosity, which can exhibit Lewis acidic or Brønsted acidic behavior, and which has been treated with an electron-withdrawing component, typically an anion, and which is calcined. The electron-withdrawing component is typically an electron-withdrawing anion source compound. Thus, the chemically-treated solid oxide can comprise a calcined contact product of at least one solid oxide with at least one electron-withdrawing anion source compound. Typically, the chemically-treated solid oxide comprises at least one acidic solid oxide compound. The "activator-support" of the present invention can be a chemically-treated solid oxide. The terms "support" and "activator-support" are not used to imply these components are inert, and such components should not be construed as an inert component of the catalyst composition. The term "activator," as used herein, refers generally to a substance that is capable of converting a transition metal component into a catalyst that can polymerize olefins, or converting a contact product of a transition metal compound and a component that provides an activatable ligand (e.g., an alkyl, a hydride) to the transition metal compound, when the transition metal compound does not already comprise such a ligand, into a catalyst that can polymerize olefins. This term is used regardless of the actual activating mechanism. Illustrative activators include activator-supports, aluminoxanes, organoboron or organoborate compounds, ionizing ionic compounds, and the like. Aluminoxanes, organoboron or organoborate compounds, and ionizing ionic compounds generally are referred to as activators if used in a catalyst composition in which an activator-support is not present. If the catalyst composition contains an activator-support, then the aluminoxane, organoboron or organoborate, and ionizing ionic materials are typically referred to as co-catalysts.

The term "fluoroorgano boron compound" is used herein with its ordinary meaning to refer to neutral compounds of the form BY$_3$. The term "fluoroorgano borate compound" also has its usual meaning to refer to the monoanionic salts of a fluoroorgano boron compound of the form [cation]$^+$[BY$_4$]$^-$, where Y represents a fluorinated organic group. Materials of these types are generally and collectively referred to as "organoboron or organoborate compounds."

The terms "catalyst composition," "catalyst mixture," "catalyst system," and the like, do not depend upon the actual product or composition resulting from the contact or reaction of the initial components of the claimed catalyst composition/mixture/system, the nature of the active catalytic site, or the fate of the co-catalyst, the transition metal compound(s), any olefin monomer used to prepare a precontacted mixture, or the activator (e.g., activator-support), after combining these components. Therefore, the terms "catalyst composition," "catalyst mixture," "catalyst system," and the like, encompass the initial starting components of the composition, as well as whatever product(s) may result from contacting these initial starting components, and this is inclusive of both heterogeneous and homogenous catalyst systems or compositions.

The term "contact product" is used herein to describe compositions wherein the components are contacted together in any order, in any manner, and for any length of time. For example, the components can be contacted by blending or mixing. Further, contacting of any component can occur in the presence or absence of any other component of the compositions described herein. Combining additional materials or components can be done by any suitable method. Further, the term "contact product" includes mixtures, blends, solutions, slurries, reaction products, and the like, or combinations thereof. Although "contact product" can include reaction products, it is not required for the respective components to react with one another. Similarly, the term "contacting" is used herein to refer to materials which may be blended, mixed, slurried, dissolved, reacted, treated, or otherwise contacted in some other manner.

The term "precontacted" mixture is used herein to describe a first mixture of catalyst components that are contacted for a first period of time prior to the first mixture being used to form a "postcontacted" or second mixture of catalyst components that are contacted for a second period of time. Typically, the precontacted mixture can describe a mixture of transition metal compound (one or more than one), olefin monomer (or monomers), and organoaluminum compound (or compounds), before this mixture is contacted with an activator-support(s) and optional additional organoaluminum compound. Thus, precontacted describes components that are used to contact each other, but prior to contacting the components in the second, postcontacted mixture. Accordingly, this invention may occasionally distinguish between a component used to prepare the precontacted mixture and that component after the mixture has been prepared. For example, according to this description, it is possible for the precontacted organoaluminum compound, once it is contacted with the transition metal compound and the olefin monomer, to have reacted to form at least one different chemical compound, formulation, or structure from the distinct organoaluminum compound used to prepare the precontacted mixture. In this case, the precontacted organoaluminum compound or component is described as comprising an organoaluminum compound that was used to prepare the precontacted mixture.

Additionally, the precontacted mixture can describe a mixture of transition metal compound(s) and organoaluminum compound(s), prior to contacting this mixture with an activator-support(s). This precontacted mixture also can describe a mixture of transition metal compound(s), olefin monomer(s), and activator-support(s), before this mixture is contacted with an organoaluminum co-catalyst compound or compounds.

Similarly, the term "postcontacted" mixture is used herein to describe a second mixture of catalyst components that are contacted thr a second period of time, and one constituent of which is the "precontacted" or first mixture of catalyst components that were contacted for a first period of time. Typically, the term "postcontacted" mixture is used herein to describe the mixture of transition metal compound(s), olefin monomer(s), organoaluminum compound(s), and activator-support(s) formed from contacting the precontacted mixture of a portion of these components with any additional components added to make up the postcontacted mixture. Often, the activator-support can comprise a chemically-treated solid oxide. For instance, the additional component added to make up the postcontacted mixture can be a chemically-treated solid oxide (one or more than one), and optionally, can include an organoaluminum compound which is the same as or different from the organoaluminum compound used to prepare the precontacted mixture, as described herein. Accordingly, this invention may also occasionally distinguish between a component used to prepare the postcontacted mixture and that component after the mixture has been prepared.

Although any methods, devices, and materials similar or equivalent to those described herein can be used in the practice or testing of the invention, the typical methods, devices and materials are herein described.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

Applicants disclose several types of ranges in the present invention. When Applicants disclose or claim a range of any type, Applicants' intent is to disclose or claim individually each possible number that such a range could reasonably encompass, including end points of the range as well as any sub-ranges and combinations of sub-ranges encompassed therein. For example, when the Applicants disclose or claim a chemical moiety having a certain number of carbon atoms, Applicants' intent is to disclose or claim individually every possible number that such a range could encompass, consistent with the disclosure herein. For example, the disclosure that a moiety is a $C_1$ to $C_{18}$ hydrocarbyl group, or in alternative language a hydrocarbyl group having from 1 to 18 carbon atoms, as used herein, refers to a moiety that can be selected independently from a hydrocarbyl group having 1, 2, 3, 4, 5, 6, 7, 8, 9, 10, 11, 12, 13, 14, 15, 16, 17, or 18 carbon atoms, as well as any range between these two numbers (for example, a $C_1$ to $C_8$ hydrocarbyl group), and also including any combination of ranges between these two numbers (for example, a $C_2$ to $C_4$ and a $C_6$ to $C_{12}$ hydrocarbyl group).

Similarly, another representative example follows for the molar ratio of hydrogen to olefin monomer provided in aspects of this invention. By a disclosure that the molar ratio of the hydrogen to olefin monomer can be in a range from about 0.01:1 to 0.2:1, Applicants intend to recite that the molar ratio can be 0.01:1, about 0.02:1, about 0.03:1, about 0.04:1, about 0.05:1, about 0.06:1, about 0.07:1, about 0.08:1, about 0.09:1, about 0.1:1, about 0.11:1, about 0, 12:1, about 0, 13:1, about 0, 14:1, about 0, 15:1, about 0.16:1, about 0.17:1, about 0.18:1, about 0.19:1, or about 0.2:1. Additionally, the molar ratio can be within any range from about 0.01:1 to about 0.2:1 (for example, the molar ratio can be in a range from about 0.02:1 to about 0.1:1), and this also includes any combination of ranges between about 0.01:1 and about 0.2:1. Likewise, all other ranges disclosed herein should be interpreted in a manner similar to these examples.

Applicants reserve the right to proviso out or exclude any individual members of any such group, including any sub-ranges or combinations of sub-ranges within the group, that can be claimed according to a range or in any similar manner, if for any reason Applicants choose to claim less than the full measure of the disclosure, for example, to account for a reference that Applicants can be unaware of at the time of the filing of the application. Further, Applicants reserve the right to proviso out or exclude an individual substituents, analogs, compounds, ligands, structures, or groups thereof, or any members of a claimed group, if for any reason Applicants choose to claim less than the full measure of the disclosure, for example, to account for a reference that Applicants can be unaware of at the time of the filing of the application.

The following abbreviations, among others, are used in this disclosure:

DEZ—diethylzinc
ET—ethyl
HLMI—high load melt index
Me—methyl
MI—melt index
Mw—weight-average molecular weight
Ph—phenyl
TIBA—triisobutylaluminum

DETAILED DESCRIPTION OF THE INVENTION

Disclosed herein are methods for controlling a polymerization reaction in a polymerization reactor system. Processes for the polymerization of olefins also are described.

Methods Utilizing Hydrogen and an Organozinc Compound

Various aspects of the present invention are directed to methods of controlling a polymerization reaction in a polymerization reactor system. For instance, a method of controlling a polymerization reaction in a polymerization reactor system can comprise a step of introducing a synergistic amount of hydrogen and an organozinc compound into the polymerization reactor system to reduce a weight-average molecular weight (Mw) and/or to increase a melt index (MI) of an olefin polymer produced by the polymerization reaction. Another method disclosed herein for controlling a polymerization reaction in a polymerization reactor system can comprise:

(i) introducing a transition metal-based catalyst composition, an olefin monomer, and optionally an olefin comonomer into a polymerization reactor within the polymerization reactor system;
(ii) contacting the transition metal-based catalyst composition with the olefin monomer and the optional olefin comonomer under polymerization conditions to produce an olefin polymer; and
(iii) introducing a synergistic amount of hydrogen and an organozinc compound into the polymerization reactor system to reduce a Mw and/or to increase a MI of the olefin polymer.

In these methods, the hydrogen and the organozinc compound can be introduced (e.g., added, injected, etc.) into the polymerization reactor system by any suitable means, either alone, with a carrier (e.g., a carrier gas, a carrier liquid, etc.), in combination, etc. In some aspects, the hydrogen and the organozinc compound can be introduced into the polymerization reactor system at different locations within the system, although this is not a requirement. Additionally, the hydrogen and the organozinc compound often can be added directly into a polymerization reactor within the polymerization reactor system. However, in some aspects, one or more of the hydrogen and the organozinc compound can be introduced into the polymerization reaction system at a feed or inlet location other than directly into a polymerization reactor, for example, in a recycle stream. In one aspect, hydrogen can be added to the polymerization reactor along with the olefin monomer feed, while in another aspect, hydrogen can be added to the polymerization reactor separate from the olefin monomer feed. In another aspect, the organozinc compound can be added to the reactor by itself, while in yet another aspect, the organozinc compound can be added to the reactor with a carrier or solvent, non-limiting examples of which can include, but are not limited to isobutane, n-butane, n-pentane, isopentane, neopentane, n-hexane, heptane, octane, cyclohexane, cycloheptane, methylcyclohexane, methylcycloheptane, benzene, toluene, xylene, ethylbenzene, and the like, or combinations thereof.

Generally, the features of the methods disclosed herein (e.g., the transition metal-based catalyst composition, the olefin monomer, the olefin polymer, the organozinc compound, the synergistic amount of hydrogen and the organozinc compound, the polymerization reactor, the Mw, the MI, among others) are independently described herein, and these features may be combined in any combination to further describe the disclosed methods.

In certain methods disclosed herein, a step can comprise introducing a transition metal-based catalyst composition, an olefin monomer, and optionally an olefin comonomer into the polymerization reactor. As would be recognized by one of skill in the art, additional components can be introduced into the polymerization reactor in addition to the transition metal-based catalyst composition and the olefin monomer (and, olefin comonomer(s), if desired), and such unrecited components are encompassed herein. For instance, in the operation of a polymerization reactor system—depending, of course, on the polymerization reactor type, the desired olefin polymer, etc., among other factors—solvents and/or diluents and/or fluidizing gases, recycle streams, etc., also can be added or introduced into the polymerization reactor and polymerization reactor system.

As one of ordinary skill in the art would recognize, hydrogen can be generated in-situ by transition metal catalyst compositions in various olefin polymerization processes, and the amount generated may vary depending upon the specific catalyst composition and transition metal compound(s) employed, the type of polymerization process used, the polymerization reaction conditions utilized, and so forth. In accordance with the present invention, hydrogen is added to the polymerization reactor system (e.g., into a polymerization reactor). For example, hydrogen can be added as a set mole or weight percentage of the olefin monomer, and fed continuously to the reactor system along with the monomer. In one aspect, hydrogen can be added to the reactor system at a hydrogen:olefin monomer molar ratio in a range from about 0.005:1 to about 0.3:1, or from about 0.007:1 to about 0.25:1. In another aspect, hydrogen can be added to the reactor system at a hydrogen:olefin monomer molar ratio in a range from about 0.01:1 to about 0.2:1. Yet, in another aspect, hydrogen can be added to the reactor system at a hydrogen:olefin monomer molar ratio in a range from about 0.02:1 to about 0.2:1; alternatively, from about 0.01:1 to about 0.19:1; alternatively, from about 0.02:1 to about 0.18:1; alternatively, from about 0.03:1 to about 0.17:1; alternatively, from about 0.04:1 to about 0.16:1; or alternatively, from about 0.05:1 to about 0.15:1.

In some aspects of this invention, the feed ratio of hydrogen to olefin monomer can be maintained substantially constant during the polymerization run for a particular polymer grade. That is, the hydrogen:olefin monomer ratio can be selected at a particular ratio within a range from, for example, about 0.01:1 to about 0.2:1, and maintained at the ratio to within about +/−25% during the polymerization run. For instance, if the target ratio is 0.1:1, then maintaining the hydrogen:olefin monomer ratio substantially constant would entail maintaining the molar ratio between about 0.075:1 and about 0.125:1. Further, the addition of comonomer (or comonomers) can be, and generally is, substantially constant throughout the polymerization run for a particular polymer grade.

In accordance with the present invention, an organozinc compound can be added to the polymerization reactor system (e.g., into a polymerization reactor), either alone or with a carrier. In one aspect, the addition of the organozinc compound can result in a concentration of the organozinc compound in a range from about 0.02 mmol/L to about 2.5 mmol/L, based on the total volume of liquid in the reactor (e.g., slurry reactor, solution reactor). In another aspect, the organozinc addition can result in a concentration in a range from about 0.02 to about 2.2 mmol/L, from about 0.02 mmol/L to about 2 mmol/L, from about 0.03 mmol/L to about 2 mmol/L, or from about 0.03 to about 1.8 mmol/L. In yet another aspect, the resulting organozinc concentration can be in a range from about 0.03 to about 1.7 mmol/L; alternatively, from about 0.04 to about 2 mmol/L; alternatively, from about 0.05 to about 2 mmol/L; alternatively, from about 0.03 to about 1.5 mmol/L; alternatively, from about 0.03 to about 1.2 mmol/L; alternatively, from about 0.02 to about 1 mmol/L; alternatively, from about 0.05 to about 2 mmol/L; or from about 0.05 to about 1.5 mmol/L.

In an aspect, hydrogen and/or the organozinc compound can be introduced in the polymerization reactor system continuously. Alternatively, hydrogen and/or the organozinc compound (and/or monomer and/or optional comonomer) can be periodically pulsed to the reactor, for instance, in a manner similar to that employed in U.S. Pat. No. 5,739,220 and U.S. Patent Publication No. 2004/0059070, the disclosures of which are incorporated herein by reference in their entirety.

Hydrogen can be introduced into the polymerization reactor system before, during, and/or after the addition of the organozinc compound. For instance, hydrogen and the organozinc compound can be introduced into the reactor system substantially simultaneously. Such can be accomplished by the continuous addition of both components, or pulsed addition of both components at substantially the same time. Alternatively, hydrogen can be introduced into the reactor system before and/or after the addition of the organozinc compound, but not at substantially the same time.

Regardless of the manner in which hydrogen and the organozinc compound are added to the polymerization reactor system (i.e., relative timing, order of addition, location within the system, periodic or continuous addition, with or without a carrier, etc.), a synergistic amount of hydrogen and the organozinc compound can be added to the polymerization reactor system. The synergistic combination of these materials can result in a reduction in Mw and/or an increase in MI of an olefin polymer produced in the polymerization reactor system. While not being limited thereto, Applicants nevertheless contemplate various synergistic amounts or combinations of hydrogen and the organozinc compound. In some aspects, the synergistic amount of hydrogen and the organozinc compound can comprise a hydrogen:organozinc compound molar ratio in a range from about 100:1 to about 25,000:1. Accordingly, contemplated hydrogen:organozinc compound molar ratios can include, but are not limited to, the following ranges: from about 100:1 to about 20,000:1, from about 100:1 to about 10,000:1, from about 100:1 to about 7,500:1, from about 100:1 to about 5,000:1, from about 200:1 to about 20,000:1, from about 250:1 to about 20,000:1, from about 250:1 to about 15,000:1, from about 300:1 to about 20,000:1, from about 300:1 to about 10,000:1, from about 300:1 to about 5,000:1, from about 1,000:1 to about 7,500:1, from about 500:1 to about 7,500:1, from about 500:1 to about 5,000:1, and so forth.

The addition of a synergistic amount of hydrogen and an organozinc compound can reduce a Mw and/or increase a MI of an olefin polymer. For example, the Mw of the olefin polymer produced can be reduced to less than about 250,000, less than about 225,000, or less than about 200,000 g/mol. In some aspects, the Mw of the olefin polymer can be reduced to less than about 190,000, less than about 180,000, less than about 170,000, less than about 160,000, or less than about 150,000 g/mol. Contemplated Mw ranges encompassed by the present invention can include, but are not limited to, from about 40,000 to about 250,000 g/mol, from about 50,000 to about 250,000 g/mol, from about 40,000 to about 200,000 g/mol, from about 50,000 to about 200,000 g/mol, from about 70,000 to about 225,000 g/mol, from about 70,000 to about 170,000 g/mol, from about 60,000 to about 210,000 g/mol, from about 60,000 to about 180,000 g/mol, or from about 80,000 to about 160,000 g/mol.

The addition of a synergistic amount of hydrogen and an organozinc compound can result in a significant reduction in the Mw (or Mz, or Mv, or Mp) of an olefin polymer, as compared to the Mw (or Mz, or Mv, or Mp) of an olefin polymer produced in the absence of hydrogen and the organozinc compound. In one aspect, the Mw (or Mz, or Mv, or Mp) of the olefin polymer can be reduced by at least about 50%, at least about 60%, at least about 70%, or at least about 75%. In further aspects, the Mw (or Mz, or Mv, or Mp) of an olefin polymer can be reduced by at least about 80%; alternatively, at least about 85%; or alternatively, at least about 90%. Additionally, the ratio of Mw/Mn of the olefin polymer also can be reduced by at least about 50%, at least about 70%, at least about 75%, at least about 80%, at least about 85%, or at least about 90%, via the addition of the synergistic amount of hydrogen and the organozinc compound.

Interestingly, while the Mw (or Mz, or Mv, or Mp) can be reduced significantly by the introduction of the synergistic amount of hydrogen and the organozinc compound, the Mn of the olefin polymer can be substantially unchanged. That is, the Mn of an olefin polymer produced using a synergistic amount of hydrogen and the organozinc compound can be within +/−25% (and in some aspects, +/−20%, or +/−15%) of the Mn of an olefin polymer produced in the absence of hydrogen and the organozinc compound.

The addition of a synergistic amount of hydrogen and an organozinc compound can result in a significant increase in the MI (or HLMI) of an olefin polymer, as compared to the MI (or HLMI) of an olefin polymer produced in the absence of hydrogen and the organozinc compound. In one aspect, the MI can be increased to at least about 0.75 g/10 min, while in another aspect, the MI can be increased to at least about 1 g/10 min. Contemplated MI ranges encompassed by the present invention can include, but are not limited to, from about 1 to about 50 g/10 min, from about 1 to about 25 g/10 min, from about 1 to about 20 g/10 min, from about 1.5 to about 20 g/10 min, from about 2 to about 15 g/10 min, from about 2.5 to about 25 g/10 min, from about 3 to about 10 g/10 min, from about 1 to about 10 g/10 min, or from about 1.5 to about 8 g/10 min.

In another aspect of this invention, olefin polymerization processes are disclosed. One such process can comprise contacting a transition metal-based catalyst composition with an olefin monomer and optionally an olefin comonomer under polymerization conditions (e.g., in a polymerization reactor system), and in the presence of a synergistic amount of hydrogen and an organozinc compound (or introducing a synergistic amount of hydrogen and the organozinc compound into a polymerization reactor system), to produce an olefin polymer. In this process, a Mw of the olefin polymer can be less than about 200,000 g/mol and/or a MI of the olefin polymer can be greater than about 1 g/10 min.

Generally, the features of these olefin polymerization processes (e.g., the transition metal-based catalyst composition, the olefin monomer, the olefin polymer, the organozinc compound, the synergistic amount of hydrogen and the organozinc compound, the Mw, the MI, etc.) are independently described herein, and these features may be combined in any combination to further describe the disclosed processes. For example, the transition metal-based catalyst composition can be a chromium-based catalyst composition, a Ziegler-Natta based catalyst composition, a metallocene-based catalyst composition, or a combination thereof; or alternatively, the transition metal-based catalyst composition can comprise any transition metal compound disclosed herein, e.g., comprising at least one of chromium, vanadium, titanium, zirconium, and hafnium; any activator disclosed herein, e.g., an activator-support, an aluminoxane, etc; and optionally, any co-catalyst disclosed herein, an organoaluminum compound. Likewise, the olefin monomer can be any olefin monomer disclosed herein, such as a $C_2$-$C_{20}$ olefin, or ethylene; and the olefin comonomer can be any comonomer disclosed herein, such as propylene, 1-butene, 1-pentene, 1-hexene, 1-heptene, 1-octene, 1-decene, styrene, and the like, or mixtures thereof. The presence of a synergistic amount of hydrogen and the organozinc compound (or the introduction of a synergistic amount of hydrogen and the organozinc compound) can encompass any molar amount of hydrogen:organozinc compound disclosed herein, such as within a range of from about 100:1 to about 25,000:1, from about 200:1 to about 20,000:1, or from about 500:1 to about 7,500:1.

In such olefin polymerization processes, the Mw of the olefin polymer generally can be less than about 200,000 g/mol, such as within a range from about 50,000 to about 200,000 g/mol. Additionally or alternatively, the MI of the olefin polymer generally can be greater than about 1 g/1.0 min, such as within a range from about 1 to about 20 g/10

For ethylene-based polymers produced herein, the density typically can fall within the range from about 0.88 to about 0.97 g/cc. In one aspect of this invention, the ethylene polymer density can be in a range from about 0.90 to about 0.97 g/cc. Yet, in another aspect, the density generally can be in a range from about 0.91 to about 0.96 g/cc.

Polymers of ethylene, whether homopolymers, copolymers, terpolymers, and so forth, can be formed into various articles of manufacture. Articles which can comprise polymers of this invention include, but are not limited to, an agricultural film, an automobile part, a bottle, a drum, a fiber or fabric, a food packaging film or container, a food service article, a fuel tank, a geomembrane, a household container, a liner, a molded product, a medical device or material, a pipe, a sheet or tape, a toy, and the like. Various processes can be employed to form these articles. Non-limiting examples of these processes can include injection molding, blow molding, rotational molding, film extrusion, sheet extrusion, profile extrusion, thermoforming, and the like. Additionally, additives and modifiers are often added to these polymers in order to provide beneficial polymer processing or end-use product attributes. Such processes and materials are described in *Modern Plastics Encyclopedia*, Mid-November 1995 Issue, Vol. 72, No. 12; and *Film Extrusion Manual—Process, Materials, Properties*, TAPPI Press, 1992; the disclosures of which are incorporated, herein by reference in their entirety.

Applicants also contemplate a method for forming or preparing an article of manufacture comprising a polymer produced by any of the polymerization processes disclosed herein. For instance, a method can comprise (i) contacting a transition metal-based catalyst composition with an olefin monomer and optionally an olefin comonomer one or more) under polymerization conditions, and in the presence of a synergistic amount of hydrogen and an organozinc compound (or introducing a synergistic amount of hydrogen and the organozinc compound into a polymerization reactor system), to produce an olefin polymer, wherein a Mw of the olefin polymer can be less than about 200,000 g/mol and/or a MI of the olefin polymer can be greater than about g/10 min; and (ii) forming an article of manufacture comprising the olefin polymer. The forming step can comprise blending, melt processing, extruding, molding, or thermoforming, and the like, including combinations thereof.

Organozinc Compounds

Organozinc compounds suitable for use in the present invention can include, but are not limited to, compounds having the formula:

$$Zn(X^{10})(X^{11}) \hspace{2cm} (I).$$

Generally, the selections of $X^{10}$ and $X^{11}$ in formula (I) are independently described herein, and these selections can be combined in any combination to further describe the organozinc compound having formula (I). In some aspects, $X^{10}$ can be a $C_1$ to $C_{18}$ hydrocarbyl group, and $X^{11}$ can be H, a halide, or a $C_1$ to $C_{18}$ hydrocarbyl or $C_1$ to $C_{18}$ hydrocarboxy group. It is contemplated in these and other aspects that $X^{10}$ and $X^{11}$ can be the same, or that $X^{10}$ and $X^{11}$ can be different.

In one aspect, $X^{10}$ and $X^{11}$ independently can be a $C_1$ to $C_{18}$ hydrocarbyl group, while in another aspect, $X^{10}$ and $X^{11}$ independently can be a $C_1$ to $C_{12}$ hydrocarbyl group. In yet another aspect, $X^{10}$ and $X^{11}$ independently can be a $C_1$ to $C_8$ hydrocarbyl group or a $C_1$ to $C_5$ hydrocarbyl group. In still another aspect, $X^{10}$ and $X^{11}$ independently can be a $C_1$ to $C_{18}$ alkyl group, a $C_2$ to $C_{18}$ alkenyl group, a $C_6$ to $C_{18}$ aryl group, or a $C_7$ to $C_{18}$ aralkyl group. In these and other aspects, $X^{10}$ and independently can be a $C_1$ to $C_8$ alkyl group, a $C_2$ to $C_{12}$ alkenyl group, a $C_6$ to $C_{15}$ aryl group, or a $C_7$ to $C_{15}$ aralkyl group; alternatively, $X^{10}$ and $X^{11}$ independently can be a $C_1$ to $C_{10}$ alkyl group, a $C_1$ to $C_{10}$ alkenyl group, a $C_6$ to $C_{12}$ aryl group, or a $C_7$ to $C_{12}$ aralkyl group; alternatively, $X^{10}$ and $X^{11}$ independently can be a $C_1$ to $C_8$ alkyl group, a $C_2$ to $C_8$ alkenyl group, a $C_6$ to $C_{10}$ aryl group, or a $C_7$ to $C_{10}$ aralkyl group; or alternatively, $X^{10}$ and $X^{11}$ independently can be a $C_1$ to $C_5$ alkyl group, a $C_2$ to $C_5$ alkenyl group, a $C_6$ to $C_8$ aryl group, or a $C_7$ to $C_8$ aralkyl group.

Accordingly, in some aspects, the alkyl group which can be $X^{10}$ and/or $X^{11}$ in formula (I) can be a methyl group, an ethyl group, a propyl group, a butyl group, a pentyl group, a hexyl group, a heptyl group, an octyl group, a nonyl group, a decyl group, a undecyl group, a dodecyl group, a tridecyl group, a tetradecyl group, a pentadecyl group, a hexadecyl group, a heptadecyl group, or an octadecyl group; or alternatively, a methyl group, an ethyl group, a propyl group, a butyl group, a pentyl group, a hexyl group, a heptyl group, an octyl group, a nonyl group, or a decyl group. In other aspects, the alkyl group which can be $X^{10}$ and/or $X^{11}$ in formula (I) can be a methyl group, an ethyl group, a n-propyl group, an iso-propyl group, a n-butyl group, an iso-butyl group, a sec-butyl group, a tert-butyl group, a n-pentyl group, an iso-pentyl group, a sec-pentyl group, or a neopentyl group; alternatively, a methyl group, an ethyl group, an iso-propyl group, a n-butyl group, a tert-butyl group, or a neopentyl group; alternatively, a methyl group; alternatively, an ethyl group; alternatively, a n-propyl group; alternatively, an iso-propyl group; alternatively, a n-butyl group; alternatively, a tert-butyl group; or alternatively, a neopentyl group.

Illustrative alkenyl groups which can be $X^{10}$ and/or $X^{11}$ in formula (I) can include, but are not limited to, an ethenyl group, a propenyl group, a butenyl group, a pentenyl group, a hexenyl group, a heptenyl group, an octenyl group, a nonenyl group, a decenyl group, a undecenyl group, a dodecenyl group, a tridecenyl group, a tetradecenyl group, a pentadecenyl group, a hexadecenyl group, a heptadecenyl group, or an octadecenyl group. In one aspect, $X^{10}$ and/or $X^{11}$ formula (I) can be an ethenyl group, a propenyl group, a butenyl group, a pentenyl group, a hexenyl group, a heptenyl group, an octenyl group, a nonenyl group, or a decenyl group, while in another aspect, $X^{10}$ and/or $X^{11}$ can be an ethenyl group, a propenyl group, a butenyl group, a pentenyl group, or a hexenyl group. For example, $X^{10}$ and/or $X^{11}$ can be an ethenyl group; alternatively, a propenyl group; alternatively, a butenyl group; alternatively, a pentenyl group; or alternatively, a hexenyl group. In yet another aspect, $X^{10}$ and/or $X^{11}$ can be an acyclic terminal alkenyl group, such as a $C_8$ to $C_{10}$, or a $C_3$ to $C_8$, terminal alkenyl group.

In some aspects, the aryl group which can be $X^{10}$ and/or $X^{11}$ in formula (I) can be a phenyl group, a substituted phenyl group, a naphthyl group, or a substituted naphthyl group. In an aspect, the aryl group can be a phenyl group or a substituted phenyl group; alternatively, a naphthyl group or a substituted naphthyl group; alternatively, a phenyl group or a naphthyl group; or alternatively, a substituted phenyl group or a substituted naphthyl group. Substituents which can be utilized for the substituted phenyl group or substituted naphthyl group are independently disclosed herein and can be utilized without limitation to further describe the substituted phenyl group or substituted naphthyl group which can be utilized, as $X^{10}$ and/or $X^{11}$ in formula (I).

In an aspect, the substituted phenyl group which can be utilized as $X^{10}$ and/or $X^{11}$ can be a 2-substituted phenyl group, a 3-substituted phenyl group, a 4-substituted phenyl group, a 2,4-disubstituted phenyl group, a 2,6-disubstituted phenyl group, 3,5-disubstituted phenyl group, or a 2,4,6-trisubstituted phenyl group. In other aspects, the substituted phenyl group can be a 2-substituted phenyl group, a 4-substituted phenyl group, a 2,4-disubstituted phenyl group, or a 2,6-disubstituted phenyl group; alternatively, a 3-substituted phenyl group or a 3,5-disubstituted phenyl group; alternatively, a 2-substituted phenyl group or a 4-substituted phenyl group; alternatively, a 2,4-disubstituted phenyl group or a 2,6-disubstituted phenyl group; alternatively, a 2-substituted phenyl group; alternatively, a 3-substituted phenyl group; alternatively, a 4-substituted phenyl group; alternatively, a 2,4-disubstituted phenyl group; alternatively, a 2,6-disubstituted phenyl group; alternatively, 3,5-disubstituted phenyl group; or alternatively, a 2,4,6-trisubstituted phenyl group. Substituents which can be utilized for these specific substituted phenyl groups are independently disclosed herein and can be utilized without limitation to further describe these substituted phenyl groups which can be utilized as the $X^{10}$ nod/or $X^1$ group of formula (I).

In some aspects, the aralkyl group which can be utilized as $X^{10}$ and/or $X^{11}$ of formula (I) can be a benzyl group or a substituted benzyl group. Substituents which can be utilized for the substituted aralkyl group are independently disclosed herein and can be utilized without limitation to further describe the substituted aralkyl group which can be utilized as $X^{10}$ and/or $X^{11}$ of formula (I).

In an aspect, each non-hydrogen substituent for the substituted aryl group or substituted aralkyl group which can be $X^{10}$ and/or $X^{11}$ in formula (I) independently can be a $C_1$ to $C_{10}$ hydrocarbyl group; alternatively, a $C_1$ to $C_8$ hydrocarbyl group; or alternatively, a $C_1$ to $C_5$ hydrocarbyl group. Specific substituent hydrocarbyl groups are independently disclosed herein and can be utilized without limitation to further describe the substituents of the substituted aryl group or substituted aralkyl group which can be $X^{10}$ and/or $X^{11}$ of formula (I). The number of substituents and their respective number of carbon atoms in any substituted aryl group or substituted aralkyl group is limited such that $X^{10}$ and $X^{11}$ of formula (I) have at most 18 carbon atoms. Exemplary hydrocarbyl substituents can include, but are not limited to, an alkyl group, such as a methyl group, an ethyl group, a n-propyl group, an isopropyl group, a n-butyl group, a sec-butyl group, an isobutyl group, a tert-butyl group, a n-pentyl group, a 2-pentyl group, a 3-pentyl group, a 2-methyl-1-butyl group, a tert-pentyl group, a 3-methyl-1-butyl group, a 3-methyl-2-butyl group, or a neo-pentyl group, and the like, including combinations thereof.

In one aspect, $X^{10}$ and $X^{11}$ independently can be a $C_1$ to $C_{12}$ alkyl group, a $C_2$ to $C_{12}$ alkenyl group, a $C_6$ to $C_{15}$ aryl group, or a $C_7$ to $C_{15}$ aralkyl group; or alternatively, a $C_1$ to $C_8$ alkyl group, a $C_2$ to $C_8$ alkenyl group, a $C_6$ to $C_{10}$ aryl group, or a $C_7$ to $C_{10}$ aralkyl group. In another aspect, $X^{10}$ and $X^{11}$ in independently can be a $C_1$ to $C_{12}$ alkyl group or a $C_2$ to $C_{12}$ alkenyl group. In yet another aspect, $X^{10}$ and $X^{11}$ independently can be methyl, ethyl, propyl, butyl, pentyl (e.g., neopentyl), hexyl, heptyl, octyl, nonyl, decyl, ethenyl, propenyl, butenyl, pentenyl, hexenyl, heptenyl, octenyl, nonenyl, decenyl, phenyl, benzyl, or tolyl; alternatively, methyl, ethyl, propyl, butyl, pentyl, hexyl, heptyl, octyl, ethenyl, propenyl, butenyl, pentenyl, hexenyl, heptenyl, octenyl, phenyl, benzyl, or tolyl; alternatively, methyl, ethyl, propyl, butyl, pentyl, hexyl, ethenyl, propenyl, butenyl pentenyl, hexenyl, phenyl, benzyl, or tolyl; or alternatively, methyl, ethyl, propyl, butyl, pentyl, ethenyl, propenyl, butenyl, or pentenyl. In still another aspect, $X^{10}$ and $X^{11}$ independently can be methyl, ethyl, propyl, butyl, or pentyl neopentyl), or both $X^{10}$ and $X^{11}$ can be methyl, or ethyl, or propyl, or butyl, or pentyl neopentyl).

In some aspects, $X^{11}$ can be a $C_1$ to $C_{18}$ hydrocarboxy group. A hydrocarboxy group is used generically herein to include, for instance, alkoxy, aryloxy, aralkoxy, and -(alkyl, aryl, or aralyl)-O-(alkyl, aryl, or aralkyl) groups, and such groups which are suitable for $X^{11}$ can comprise up to about 18 carbon atoms (e.g., $C_1$ to $C_{15}$, $C_1$ to $C_{12}$, $C_1$ to $C_{10}$, or $C_1$ to $C_8$ hydrocarboxy groups). Illustrative and non-limiting examples of hydrocarboxy groups which can be $X^{11}$ in formula (I) can include, but are not limited to, a methoxy group, an ethoxy group, a n-propoxy group, an isopropoxy group, a n-butoxy group, a sec-butoxy group, an isobutoxy group, a tert-butoxy group, a n-pentoxy group, a 2-pentoxy group, a 3-pentoxy group, a 2-methyl-1-butoxy group, a tert-pentoxy group, a 3-methyl-1-butoxy group, a 3-methyl-2-butoxy group, a neo-pentoxy group, a phenoxy group, a toloxy group, a xyloxy group, a 2,4,6-trimethylphenoxy group; a benzoxy group, an acetylacetonate group (acac), and the like. In an aspect, the hydrocarboxy group which can be $X^{11}$ in formula (I) can be a methoxy group; alternatively, an ethoxy group; alternatively, a n-propoxy group; alternatively, an isopropoxy group; alternatively, a n-butoxy group; alternatively, a sec-butoxy group; alternatively, an isobutoxy group; alternatively, a tert-butoxy group; alternatively, a n-pentoxy group; alternatively, a 2-pentoxy group; alternatively, a 3-pentoxy group; alternatively, a 2-methyl-1-butoxy group; alternatively, a tert-pentoxy group; alternatively, a 3-methyl-1-butoxy group, alternatively, a 3-methyl-2-butoxy group; alternatively, a neo-pentoxy group; alternatively, a phenoxy group; alternatively, a toloxy group; alternatively, a xyloxy group; alternatively, a 2,4,6-trimethylphenoxy group; alternatively, a benzoxy group; or alternatively, an acetylacetonate group.

$X^{11}$ can be H, a halide, or a $C_1$ to $C_{18}$ hydrocarbyl or $C_1$ to $C_{18}$ hydrocarboxy group. In some aspects, $X^{11}$ can be H, a halide (e.g., Cl), or a $C_1$ to $C_{12}$ hydrocarbyl or $C_1$ to $C_{12}$ hydrocarboxy group; alternatively, H, a halide, or a $C_1$ to $C_8$ hydrocarbyl or $C_1$ to $C_8$ hydrocarboxy group; or alternatively, H, Br, Cl, F, I, methyl, ethyl, propyl, butyl, pentyl neopentyl), hexyl, heptyl, octyl, nonyl, decyl, ethenyl, propenyl, butenyl, pentenyl, hexenyl, heptenyl, octenyl, nonenyl, decenyl, phenyl, benzyl, tolyl, methoxy, ethoxy, propoxy, butoxy pentoxy, phenoxy, toloxy, xyloxy, or benzoxy.

In certain aspects, the organozinc compound can be a di(hydrocarbylsilyl)zinc compound. Each hydrocarbyl (one or more) of the hydrocarbylsilyl group can be any hydrocarbyl group disclosed herein (e.g., a $C_1$ to $C_{18}$ alkyl group, a $C_2$ to $C_{18}$ alkenyl group, a $C_6$ to $C_{18}$ aryl group, a $C_7$ to $C_{15}$ aralkyl group, etc.). Illustrative and non-limiting examples of hydrocarbylsilyl groups can include, but are not limited to, trimethylsilyl, triethylsilyl, tripropylsilyl (e.g., triisopropylsilyl), tripentylsilyl, triphenylsilyl, trimethylsilylmethyl, and the like.

In other aspects, the organozinc compound can be dimethylzinc, diethylzinc, dipropylzinc, dibutylzinc, dineopentylzinc, di(trimethylsilyl)zinc, di(triethylsilyl)zinc, di(triisoproplysilyl)zinc, di(triphenylsilyl)zinc, di(allyldimethylsilyl)zinc, di(trimethylsilylmethyl)zinc, and the like, or combinations thereof; alternatively, dimethylzinc, diethylzinc, dipropylzinc, dibutylzinc, dineopentylzinc, di(trimethylsilylmethyl)zinc, or combinations thereof; alternatively, dimethylzinc; alternatively, diethylzinc; alternatively, dipropylzinc; alternatively, dibutylzinc; alternatively, dineopentylzinc; or alternatively, di(trimethylsilylmethyl)zinc.

Activator-Supports

The present invention encompasses various catalyst compositions containing an activator-support. In one aspect, the activator-support can comprise a chemically-treated solid oxide. Alternatively, in another aspect, the activator-support can comprise a clay mineral, a pillared clay, an exfoliated clay, an exfoliated clay gelled into another oxide matrix, a layered silicate mineral, a non-layered silicate mineral, a layered aluminosilicate mineral, a non-layered aluminosilicate mineral, or combinations thereof.

Generally, chemically-treated solid oxides exhibit enhanced acidity as compared to the corresponding untreated solid oxide compound. The chemically-treated solid oxide also can function as a catalyst activator as compared to the corresponding untreated solid oxide. While the chemically-treated solid oxide can activate a transition metal complex in the absence of co-catalysts, it is not necessary to eliminate co-catalysts from the catalyst composition. The activation function of the activator-support may be evident in the enhanced activity of catalyst composition as a whole, as compared to a catalyst composition containing the corresponding untreated solid oxide. However, it is believed that the chemically-treated solid oxide can function as an activator, even in the absence of organoaluminum compounds, aluminoxanes, organoboron or organoborate compounds, ionizing ionic compounds, and the like.

The chemically-treated solid oxide can comprise a solid oxide treated with an electron-withdrawing anion. While not intending to be bound by the following statement, it is believed that treatment of the solid oxide with an electron-withdrawing component augments or enhances the acidity of the oxide. Thus, either the activator-support exhibits Lewis or Brønsted acidity that is typically greater than the Lewis or Brønsted acid strength of the untreated solid oxide, or the activator-support has a greater number of acid sites than the untreated solid oxide, or both. One method to quantify the acidity of the chemically-treated and untreated solid oxide materials can be by comparing the polymerization activities of the treated and untreated oxides under acid catalyzed reactions.

Chemically-treated solid oxides of this invention generally can be formed from an inorganic solid oxide that exhibits Lewis acidic or Brønsted acidic behavior and has a relatively high porosity. The solid oxide can be chemically-treated with an electron-withdrawing component, typically an electron-withdrawing anion, to form an activator-support.

According to one aspect of the present invention, the solid oxide used to prepare the chemically-treated solid oxide can have a pore volume greater than about 0.1 cc/g. According to another aspect of the present invention, the solid oxide can have a pore volume greater than about 0.5 cc/g. According to yet another aspect of the present invention, the solid oxide can have a pore volume greater than about 1.0 cc/g.

In another aspect, the solid oxide can have a surface area of front about 100 to about 1000 $m^2/g$. In yet another aspect, the solid oxide can have a surface area of from about 200 to about 800 $m^2/g$. In still another aspect of the present invention, the solid oxide can have a surface area of from about 250 to about 600 $m^2/g$.

The chemically-treated solid oxide can comprise a solid inorganic oxide comprising oxygen and one or more elements selected from Group 2, 3, 4, 5, 6, 7, 8, 9, 10, 11, 12, 13, 14, or 15 of the periodic table, or comprising oxygen and one or more elements selected from the lanthanide or actinide elements (See: Hawley's Condensed Chemical Dictionary, 11$^{th}$ Ed., John Wiley & Sons, 1995; Cotton, F. A., Wilkinson, G., Murillo, C. A., and Bochmann, M., Advanced Inorganic Chemistry, 6$^{th}$ Ed., Wiley-interscience, 1999). For example, the inorganic oxide can comprise oxygen and an element, or elements, selected from Al, B, Be, Bi, Cd, Co, Cr, Cu, Fe, Ga, La, Mn, Mo, Ni, Sb, Si, Sn, Sr, Th, Ti, V, W, P, Y, Zn, and Zr.

Suitable examples of solid oxide materials or compounds that can be used to form the chemically-treated solid oxide can include, but are not limited to, $Al_2O_3$, $B_2O_3$, BeO, $Bi_2O_3$, CdO, $Co_3O_4$, $Cr_2O_3$, CuO, $Fe_2O_3$, $Ga_2O_3$, $La_2O_3$, $Mn_2O_3$, $MoO_3$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, $ZrO_2$, and the like, including mixed oxides thereof and combinations thereof. For example, the solid oxide can comprise silica, alumina, silica-alumina, silica-coated alumina, aluminum phosphate, aluminophosphate, heteropolytungstate, titania, zirconia, magnesia, boria, zinc oxide, mixed oxides thereof, or any combination thereof.

The solid oxide of this invention encompasses oxide materials such as alumina, "mixed oxide" compounds thereof such as silica-alumina, and combinations and mixtures thereof. The mixed oxide compounds such as silica-alumina can be single or multiple chemical phases with more than one metal combined with oxygen to form a solid oxide compound. Examples of mixed oxides that can be used in the activator-support of the present invention, either singly or in combination, can include, but are not limited to, silica-alumina, silica-titania, silica-zirconia, zeolites, various clay minerals, alumina-titania, alumina-zirconia, zinc-aluminate, alumina-boria, silica-boria, aluminophosphate-silica, titania-zirconia, and the like. The solid oxide of this invention also encompasses oxide materials such as silica-coated alumina, as described in U.S. Pat. No. 7,884,163, the disclosure of which is incorporated herein by reference in its entirety.

The electron-withdrawing component used to treat the solid oxide can be any component that increases the Lewis or Brønsted acidity of the solid oxide upon treatment (as compared to the solid oxide that is not treated with at least one electron-withdrawing anion). According to one aspect of the present invention, the electron-withdrawing component can be an electron-withdrawing anion derived from a salt, an acid, or other compound, such as a volatile organic compound, that serves as a source or precursor for that anion. Examples of electron-withdrawing anions can include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, phosphotungstate, and the like, including mixtures and combinations thereof. In addition, other ionic or non-ionic compounds that serve as sources for these electron-withdrawing anions also can be employed in the present invention. It is contemplated that the electron-withdrawing anion can be, or can comprise, fluoride, chloride, bromide, phosphate, triflate, bisulfate, or sulfate, and the like, or any combination thereof, in some aspects of this invention. In other aspects, the electron-withdrawing anion can comprise sulfate, bisulfate, fluoride, chloride, bromide, fluorosulfate, fluoroborate, phosphate, fluorophosphate, trifluoroacetate, triflate, fluorozirconate, fluorotitanate, and the like, or combinations thereof.

Thus, for example, the activator-support chemically-treated solid oxide) used in the catalyst compositions of the present invention can be, or can comprise, fluorided alumina, chlorided alumina, bromided alumina, sulfated alumina, fluorided silica-alumina, chlorided bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, and the like, or combinations thereof. In one aspect, the activator-support can be, or can comprise, fluorided alumina, sulfated alumina, fluorided silica-alumina, sulfated silica-alumina, fluorided silica-coated alumina, sulfated silica-coated alumina, phosphated silica-coated alumina, and the like, or any combination thereof. In another aspect, the activator-support can comprise fluorided alumina; alternatively, chlorided alumina; alternatively, sulfated alumina; alternatively, fluorided silica-alumina; alternatively, sulfated silica-alumina; alternatively, fluorided silica-zirconia; alternatively, chlorided zirconia; or alternatively, fluorided silica-coated alumina.

When the electron-withdrawing component comprises a salt of an electron-withdrawing anion, the counterion or cation of that salt can be selected from any cation that allows the salt to revert or decompose back to the acid during calcining. Factors that dictate the suitability of the particular salt to serve as a source for the electron-withdrawing anion can include, but are not limited to, the solubility of the salt in the desired solvent, the lack of adverse reactivity of the cation, ion-pairing effects between the cation and anion, hygroscopic properties imparted to the salt by the cation, and the like, and thermal stability of the anion. Examples of suitable cations in the salt of the electron-withdrawing anion can include, but are not limited to, ammonium, trialkyl ammonium, tetraalkyl ammonium, tetraalkyl phosphonium, $H^+$, $[H(OEt_2)_2]^+$, and the like.

Further, combinations of one or more different electron-withdrawing anions, in varying proportions, can be used to tailor the specific acidity of the activator-support to the desired level. Combinations of electron-withdrawing components can be contacted with the oxide material simultaneously or individually, and in any order that affords the desired chemically-treated solid oxide acidity. For example, one aspect of this invention can employ two or more electron-withdrawing anion source compounds in two or more separate contacting steps.

Thus, a process by which a chemically-treated solid oxide can be prepared is as follows: a selected solid oxide, or combination of solid oxides, can be contacted with a first electron-withdrawing anion source compound to form a first mixture; this first mixture can be calcined and then contacted with a second electron-withdrawing anion source compound to form a second mixture; the second mixture then can be calcined to form a treated solid oxide. In such a process, the first and second electron-withdrawing anion source compounds can be either the same or different compounds.

According to another aspect of the present invention, the chemically-treated solid oxide can comprise a solid inorganic oxide material, a mixed oxide material, or a combination of inorganic oxide materials, that is chemically-treated with an electron-withdrawing component, and optionally treated with a metal source, including metal salts, metal ions, or other metal-containing compounds. Non-limiting examples of the metal or metal ion can include zinc, nickel, vanadium, titanium, silver, copper, gallium, tin, tungsten, molybdenum, zirconium, and the like, or combinations thereof. Examples of chemically-treated solid oxides that contain a metal or metal ion can include, but are not limited to, chlorided zinc-impregnated alumina, fluorided titanium-impregnated alumina, fluorided zinc-impregnated alumina, chlorided zinc-impregnated silica-alumina, fluorided zinc-impregnated silica-alumina, sulfated zinc-impregnated alumina, chlorided zinc aluminate, fluorided zinc aluminate, sulfated zinc aluminate, silica-coated alumina treated with hexafluorotitanic acid, silica-coated alumina treated with zinc and then fluorided, and the like, or any combination thereof.

Any method of impregnating the solid oxide material with a metal can be used. The method by which the oxide is contacted with a metal source, typically a salt or metal-containing compound, can include, but is not limited to, gelling, co-gelling, impregnation of one compound onto another, and the like. If desired, the metal-containing compound can be added to or impregnated into the solid oxide in solution form, and subsequently converted into the supported metal upon calcining. Accordingly, the solid inorganic oxide can further comprise a metal selected from zinc, titanium, nickel, vanadium, silver, copper, gallium, tin, tungsten, molybdenum, and the like, or combinations of these metals. For example, zinc often can be used to impregnate the solid oxide because it can provide improved catalyst activity at a low cost.

The solid oxide can be treated with metal salts or metal-containing compounds before, after, or at the same time that the solid oxide is treated with the electron-withdrawing anion. Following any contacting method, the contacted mixture of solid compound, electron-withdrawing anion, and the metal ion can be calcined. Alternatively, a solid oxide material, an electron-withdrawing anion source, and the metal salt or metal-containing compound can be contacted and calcined simultaneously.

Various processes can be used to form the chemically-treated solid oxide useful in the present invention. The chemically-treated solid oxide can comprise the contact product of one or more solid oxides with one or more electron-withdrawing anion sources. It is not required that the solid oxide be calcined prior to contacting the electron-withdrawing anion source. Typically, the contact product can be calcined either during or after the solid oxide is contacted with the electron-withdrawing anion source. The solid oxide can be calcined or uncalcined. Various processes to prepare solid oxide activator-supports that can be employed in this invention have been reported. For example, such methods are described in U.S. Pat. Nos. 6,107,230, 6,165,929, 6,294,494, 6,300,271, 6,316,553, 6,355,594, 6,376,415, 6,388,017, 6,391,816, 6,395,666, 6,524,987, 6,548,441, 6,548,442, 6,576,583, 6,613,712, 6,632,894, 6,667,274, and 6,750,302, the disclosures of which are incorporated herein by reference in their entirety.

According to one aspect of the present invention, the solid oxide material can be chemically-treated by contacting it with an electron-withdrawing component, typically an electron-withdrawing anion source. Further, the solid oxide material optionally can be chemically treated with a metal ion, and then calcined to form a metal-containing or metal-impregnated chemically-treated solid oxide. According to another aspect of the present invention, the solid oxide material and electron-withdrawing anion source can be contacted and calcined simultaneously.

The method by which the oxide is contacted with the electron-withdrawing component, typically a salt or an acid of an electron-withdrawing anion, can include, but is not limited to, gelling, co-gelling, impregnation of one compound onto another, and the like. Thus, following any contacting method, the contacted mixture of the solid oxide, electron-withdrawing anion, and optional metal ion, can be calcined.

The solid oxide activator-support (i.e., chemically-treated solid oxide) thus can be produced by a process comprising:

1) contacting a solid oxide (or solid oxides) with an electron-withdrawing anion source compound (or compounds) to form a first mixture; and 2) calcining the first mixture to form the solid oxide activator-support.

According to another aspect of the present invention, the solid oxide activator-support (chemically-treated solid oxide) can be produced by a process comprising:

1) contacting a solid oxide (or solid oxides) with a first electron-withdrawing anion source compound to form a first mixture;

2) calcining the first mixture to produce a calcined first mixture;

3) contacting the calcined first mixture with a second electron-withdrawing anion source compound to form a second mixture; and 4) calcining the second mixture to form the solid oxide activator-support.

According to yet another aspect of the present invention, the chemically-treated solid oxide can be produced or formed by contacting the solid oxide with the electron-withdrawing anion source compound, where the solid oxide compound is calcined before, during, or after contacting the electron-withdrawing anion source, and where there is a substantial absence of aluminoxanes, organoboron or organoborate compounds, and ionizing ionic compounds.

Calcining of the treated solid oxide generally can be conducted in an ambient atmosphere, typically in a dry ambient atmosphere, at a temperature from about 200° C. to about 900° C., and for a time of about 1 minute to about 100 hours. Calcining can be conducted at a temperature of from about 300° C. to about 800° C., or alternatively, at a temperature of from about 400° C. to about 700° C. Calcining can be conducted for about 30 minutes to about 50 hours, or for about 1 hour to about 15 hours. Thus, for example, calcining can be carried out for about 1 to about 10 hours at a temperature of from about 350° C. to about 550° C. Any suitable ambient atmosphere can be employed during calcining. Generally, calcining can be conducted in an oxidizing atmosphere, such as air. Alternatively, an inert atmosphere, such as nitrogen or argon, or a reducing atmosphere, such as hydrogen or carbon monoxide, can be used.

According to one aspect of the present invention, the solid oxide material can be treated with a source of halide ion, sulfate ion, or a combination of anions, optionally treated with a metal ion, and then calcined to provide the chemically-treated solid oxide in the form of a particulate solid. For example, the solid oxide material can be treated with a source of sulfate (termed a "sulfating agent"), a source of chloride ion (termed a "chloriding agent"), a source of fluoride ion (termed a "fluoriding agent"), or a combination thereof, and calcined to provide the solid oxide activator. Useful acidic activator-supports can include, but are not limited to, bromided alumina, chlorided alumina, fluorided alumina, sulfated alumina, bromided silica-alumina, chlorided silican-alumina, fluorided silica-alumina, sulfated silica-alumina, bromided silica-zirconia, chlorided silica-zirconia, fluorided silica-zirconia, sulfated silica-zirconia, fluorided silica-titania, alumina treated with hexafluorotitanic acid, silica-coated alumina treated with hexafluorotitanic acid, silica-alumina treated with hexafluorozirconic acid, silica-alumina treated with trifluoroacetic acid, fluorided boria-alumina, silica treated with tetrafluorohoric acid, alumina treated with tetrafluoroboric acid, alumina treated with hexafluorophosphoric acid, a pillared clay, such as a pillared montmorillonite, optionally treated with fluoride, chloride, or sulfate; phosphated alumina or other aluminophosphates optionally treated with sulfate, fluoride, or chloride; or any combination of the above. Further, any of these activator-supports optionally can be treated or impregnated with a metal ion.

The chemically-treated solid oxide can comprise a fluorided solid oxide in the form of a particulate solid. The fluorided solid oxide can be formed by contacting a solid oxide with a fluoriding agent. The fluoride ion can be added to the oxide by forming a slurry of the oxide in a suitable solvent such as alcohol or water including, but not limited to, the one to three carbon alcohols because of their volatility and low surface tension. Examples of suitable fluoriding agents can include, but are not limited to, hydrofluoric acid (HF), ammonium fluoride ($NH_4F$), ammonium bifluoride ($NH_4HF_2$), ammonium tetrafluoroborate ($NH_4BF_4$), ammonium silicofluoride (hexafluorosilicate) (($NH_4$)$_2SiF_6$), ammonium hexafluorophosphate ($NH_4PF_6$), hexafluorotitanic acid ($H_2TiF_6$), ammonium hexafluorotitanic acid (($NH_4$)$_2TiF_6$), hexafluorozirconic acid ($H_2ZrF_6$), $AlF_3$, $NH_4AlF_4$, analogs thereof, and combinations thereof. Triflic acid and ammonium triflate also can be employed. For example, ammonium bifluoride ($NH_4HF_2$) can be used as the fluoriding agent, due to its ease of use and availability.

If desired, the solid oxide can be treated with a fluoriding agent during the calcining step. Any fluoriding agent capable of thoroughly contacting the solid oxide during the calcining step can be used. For example, in addition to those fluoriding agents described previously, volatile organic fluoriding agents can be used. Examples of volatile organic fluoriding agents useful in this aspect of the invention can include, but are not limited to, freons, perfluorohexane, perfluorobenzene, fluoromethane, trifluoroethanol, and the like, and combinations thereof. Calcining temperatures generally must be high enough to decompose the compound and release fluoride. Gaseous hydrogen fluoride (HF) or fluorine ($F_2$) itself also can be used with the solid oxide if fluorided while calcining.

Silicon tetrafluoride ($SiF_4$) and compounds containing tetrafluoroborate ($BF_4^-$) also can be employed. One convenient method of contacting the solid oxide with the fluoriding agent can be to vaporize a fluoriding agent into a gas stream used to fluidize the solid oxide during calcination.

Similarly, in another aspect of this invention, the chemically-treated solid oxide can comprise a chlorided solid oxide in the form of a particulate solid. The chlorided solid oxide can be formed by contacting a solid oxide with a chloriding agent. The chloride ion can be added to the oxide by forming a slurry of the oxide in a suitable solvent. The solid oxide can be treated with a chloriding agent during the calcining step. Any chloriding agent capable of serving as a source of chloride and thoroughly contacting the oxide during the calcining step can be used, such as $SiCl_4$, $SiMe_2Cl_2$, $TiCl_4$, $BCl_3$, and the like, including mixtures thereof. Volatile organic chloriding agents can be used. Examples of suitable volatile organic chloriding agents can include, but are not limited to, certain freons, perchlorobenzene, chloromethane, dichloromethane, chloroform, carbon tetrachloride, trichloroethanol, and the like, or any combination thereof. Gaseous hydrogen chloride or chlorine itself also can be used with the solid oxide during calcining. One convenient method of contacting the oxide with the chloriding agent can be to vaporize a chloriding agent into a gas stream used to fluidize the solid oxide during calcination.

The amount of fluoride or chloride ion present before calcining the solid oxide generally can be from about 1 to about 50% by weight, where the weight percent is based on the weight of the solid oxide, for example, silica-alumina, before calcining. According to another aspect of this invention, the amount of fluoride or chloride ion present before calcining the solid oxide can be from about 1 to about 25% by weight, and according to another aspect of this invention, from about 2 to about 20% by weight. According to yet another aspect of this invention, the amount of fluoride or chloride ion present before calcining the solid oxide can be from about 4 to about 10% by weight. Once impregnated with halide, the halided oxide can be dried by any suitable method including, but not limited to, suction filtration followed by evaporation, drying under vacuum, spray drying, and the like, although it is also possible to initiate the calcining step immediately without drying the impregnated solid oxide.

The silica-alumina used to prepare the treated silica-alumina typically ca have a pore volume greater than about 0.5 cc/g. According to one aspect of the present invention, the pore volume can be greater than about 0.8 cc/g, and according to another aspect of the present invention, greater than about 1.0 cc/g. Further, the silica-alumina generally can have a surface area greater than about 100 $m^2/g$. According to another aspect of this invention, the surface area can be greater than about 250 $m^2/g$. Yet, in another aspect, the surface area can be greater than about 350 $m^2/g$.

The silica-alumina utilized in the present invention typically can have an alumina content from about 5 to about 95% by weight. According to one aspect of this invention, the alumina content of the silica-alumina can be from about 5 to about 50%, or from about 8% to about 30%, alumina by weight. In another aspect, high alumina content silica-alumina compounds can be employed, in which the alumina content of these silica-alumina compounds typically ranges from about 60% to about 90%, or from about 65% to about 80%, alumina by weight. According to yet another aspect of this invention, the solid oxide component can comprise alumina without silica, and according to another aspect of this invention, the solid oxide component can comprise silica without alumina.

The sulfated solid oxide can comprise sulfate and a solid oxide component, such as alumina or silica-alumina, in the form of a particulate solid. Optionally, the sulfated oxide can be treated further with a metal ion such that the calcined sulfated oxide comprises a metal. According to one aspect of the present invention, the sulfated solid oxide can comprise sulfate and alumina. In some instances, the sulfated alumina can be formed by a process wherein the alumina is treated with a sulfate source, for example, sulfuric acid or a sulfate salt such as ammonium sulfate. This process generally can be performed by thrilling a slurry of the alumina in a suitable solvent, such as alcohol or water, in which the desired concentration of the sulfating agent has been added. Suitable organic solvents can include, but are not limited to, the one to three carbon alcohols because of their volatility and low surface tension.

According to one aspect of this invention, the amount of sulfate ion present before calcining can be from about 0.5 to about 100 parts by weight sulfate ion to about 100 parts by weight solid oxide. According to another aspect of this invention, the amount of sulfate ion present before calcining can be from about 1 to about 50 parts by weight sulfate ion to about 100 parts by weight solid oxide, and according to still another aspect of this invention, from about 5 to about 30 parts by weight sulfate ion to about 100 parts by weight solid oxide. These weight ratios are based on the weight of the solid oxide before calcining. Once impregnated with sulfate, the sulfated oxide can be dried by any suitable method including, but not limited to, suction filtration followed by evaporation, drying under vacuum, spray drying, and the like, although it is also possible to initiate the calcining step immediately.

According to another aspect of the present invention, the activator-support used in preparing the catalyst compositions of this invention can comprise an ion-exchangeable activator-support including, but not limited to, silicate and aluminosilicate compounds or minerals, either with layered or non-layered structures, and combinations thereof. In another aspect of this invention, ion-exchangeable, layered aluminosilicates such as pillared clays can be used as activator-supports. When the acidic activator-support comprises an ion-exchangeable activator-support, it can optionally be treated with at least one electron-withdrawing anion such as those disclosed herein, though typically the ion-exchangeable activator-support is not treated with an electron-withdrawing anion.

According to another aspect of the present invention, the activator-support of this invention can comprise clay minerals having exchangeable cations and layers capable of expanding. Typical clay mineral activator-supports can include, but are not limited to, ion-exchangeable, layered aluminosilicates such as pillared clays. Although the term "support" is used, it is not meant to be construed as an inert component of the catalyst composition, but rather can be considered an active part of the catalyst composition, because of its intimate association with the transition metal complex component.

According to another aspect of the present invention, the clay materials of this invention can encompass materials either in their natural state or that have been treated with various ions by wetting, ion exchange, or pillaring. Typically, the clay material activator-support of this invention can comprise clays that have been ion exchanged with large cations, including polynuclear, highly charged metal complex cations. However, the clay material activator-supports of this invention also can encompass clays that have been ion exchanged with simple salts, including, but not limited to, salts of Al(III), Fe(II), Fe(III), and Zn(II) with ligands such as halide, acetate, sulfate, nitrate, or nitrite.

According to another aspect of the present invention, the activator-support can comprise a pillared clay. The term "pillared clay" is used to refer to clay materials that have been ion exchanged with large, typically polynuclear, highly charged metal complex cations. Examples of such ions can include, but are not limited to, Keggin ions which can have charges such as 7+, various polyoxometallates, and other large ions. Thus, the term pillaring can refer to a simple exchange reaction in which the exchangeable cations of a clay material are replaced with large, highly charged ions, such as Keggin ions. These polymeric cations then can be immobilized within the inter layers of the clay and when calcined are converted to metal oxide "pillars," effectively supporting the clay layers as column-like structures. Thus, once the clay is dried and calcined to produce the supporting pillars between clay layers, the expanded lattice structure can be maintained and the porosity can be enhanced. The resulting pores can vary in shape and size as a function of the pillaring material and the parent clay material used. Examples of pillaring and pillared clays are found in: T. J. Pinnavaia, *Science* 220 (4595), 365-371 (1983); J. M. Thomas, intercalation Chemistry, (S. Whittington and A. Jacobson, eds.) Ch. 3, pp. 55-99, Academic Press, Inc., (1972); U.S. Pat. No. 4,452,910; U.S. Pat. No. 5,376,611; and U.S. Pat. No. 4,060,480; the disclosures of which are incorporated herein by reference in their entirety.

The pillaring process can utilize clay minerals having exchangeable cations and layers capable of expanding. Any pillared clay that can enhance the polymerization of olefins in the catalyst composition of the present invention can be used. Therefore, suitable clay minerals for pillaring can include, but are not limited to, allophanes; smectites, both dioctahedral (Al) and tri-octahedral (Mg) and derivatives thereof such as montmorillonites (bentonites), nontronites, hectorites, or LAPONITE® (manufactured by Rockwood Additives Limited); halloysites; vermiculites; micas; thioromicas; chlorites; mixed-layer clays; the fibrous clays including but not limited to sepiolites, attapulizites, and palygorskites; a serpentine clay; illite; LAPONITE® (manufactured by Rockwood Additives Limited); saponite; and any combination thereof. In one aspect, the pillared clay activator-support can comprise bentonite or montmorillonite. The principal component of bentonite is montmorillonite.

The pillared clay can be pretreated if desired. For example, a pillared bentonite can be pretreated by drying at about 300° C. under an inert atmosphere, typically dry nitrogen, for about 3 hours, before being added to the polymerization reactor. Although an exemplary pretreatment is described herein, it should be understood that the preheating can be carried out at many other temperatures and times, including any combination of temperature and time steps, all of which are encompassed by this invention.

The activator-support used to prepare the catalyst compositions of the present invention can be combined with other inorganic support materials, including, but not limited to, zeolites, inorganic oxides, phosphated inorganic oxides, and the like. In one aspect, typical support materials that can be used include, but are not limited to, silica, silica-alumina, alumina, titania, zirconia, magnesia, boria, thoria, aluminophosphate, aluminum phosphate, silica-titania, coprecipitated silica/titania, mixtures thereof, or any combination thereof.

According to another aspect of the present invention, one or more of the transition metal complexes can be precontacted with an olefin monomer and an organoaluminum compound for a first period of time prior to contacting this mixture with the activator-support. Once the precontacted mixture of the transition metal complex(es), olefin monomer, and organoaluminum compound is contacted with the activator-support, the composition further comprising the activator-support is termed a "postcontacted" mixture. The postcontacted mixture can be allowed to remain in farther contact for a second period of time prior to being charged into the reactor in which the polymerization process will be carried out.

According to yet another aspect of the present invention, one or more of the transition metal complexes can be precontacted with an olefin monomer and an activator-support for a first period of time prior to contacting this mixture with the organoaluminum compound. Once the precontacted mixture of the transition metal complex(es), olefin monomer, and activator-support is contacted with the organoaluminum compound, the composition further comprising the organoaluminum is termed a "postcontacted" mixture. The postcontacted mixture can be allowed to remain in further contact for a second period of time prior to being introduced into the polymerization reactor.

Co-Catalysts

In certain aspects directed to catalyst compositions containing a co-catalyst, the co-catalyst can comprise a metal hydrocarbyl compound, examples of which include non-halide metal hydrocarbyl compounds, metal hydrocarbyl halide compounds, non-halide metal alkyl compounds, metal alkyl halide compounds, and so forth. The hydrocarbyl group (or alkyl group can be any hydrocarbyl (or alkyl) group disclosed herein. Moreover, in some aspects, the metal of the metal hydrocarbyl can be a group 1, 2, 11, 12, 13, or 14 metal; alternatively, a group 13 or 14 metal; or alternatively, a group 13 metal. Hence, in some aspects, the metal of the metal hydrocarbyl (non-halide metal hydrocarbyl or metal hydrocarbyl halide) can be lithium, sodium, potassium, rubidium, cesium, beryllium, magnesium, calcium, strontium, barium, cadmium, boron, aluminum, or tin; alternatively, lithium, sodium, potassium, magnesium, calcium, boron, aluminum, or tin; alternatively, lithium, sodium, or potassium; alternatively, magnesium or calcium; alternatively, lithium; alternatively, sodium; alternatively, potassium; alternatively, magnesium; alternatively, calcium; alternatively, boron; alternatively, aluminum; or alternatively, tin. In some aspects, the metal hydrocarbyl or metal alkyl, with or without a halide, can comprise a lithium hydrocarbyl or alkyl, a magnesium hydrocarbyl or alkyl, a boron hydrocarbyl or alkyl, or an aluminum hydrocarbyl or alkyl.

In particular aspects directed to catalyst compositions containing an activator-support and a co-catalyst, the co-catalyst can comprise an aluminoxane compound, an organoboron or organoborate compound, an ionizing ionic compound, an organoaluminum compound, an organomagnesium compound, or an organolithium compound, and this includes any combinations of these materials. In one aspect, the co-catalyst can comprise an organoaluminum compound. In another aspect, the co-catalyst can comprise an aluminoxane compound, an organoboron or organoborate compound, an ionizing ionic compound, an organomagnesium compound, an organolithium compound, or any combination thereof. In yet another aspect, the co-catalyst can comprise an aluminoxane compound; alternatively, an organoboron or organoborate compound; alternatively, an ionizing ionic compound; alternatively, an organomagnesium compound; or alternatively, an organolithium compound.

Organoaluminum Compounds

In some aspects, catalyst compositions of the present invention can comprise one or more organoaluminum compounds. Such compounds can include, but are not limited to, compounds having the formula:

$$(R^X)_3Al;$$

where $R^X$ can be an aliphatic group having from 1 to 10 carbon atoms. For example, $R^X$ can be methyl, ethyl, propyl, butyl, hexyl, or isobutyl.

Other organoaluminum compounds which can be used in catalyst compositions disclosed herein can include, but are not limited to, compounds having the formula:

$$Al(X^5)_m(X^6)_{3-m}.$$

Generally, the selections of $X^5$, $X^6$, and m in this formula are independently described herein, and these selections can be combined in any combination to further describe the organoaluminum compound. In some aspects, m can be from 1 to 3, inclusive, $X^5$ can be a $C_1$ to $C_{15}$ hydrocarbyl group, and $X^6$ can be H, a halide, or a $C_1$ to $C_{18}$ hydrocarboxy group. It is contemplated that each $X^5$ (and/or $X^6$) can be the same, or that each $X^5$ (and/or $X^6$) can be different.

The $C_1$ to $C_{18}$ hydrocarbyl and $C_1$ to $C_{18}$ hydrocarboxy groups can be any $C_1$ to $C_{18}$ hydrocarbyl and $C_1$ to $C_{15}$ hydrocarboxy group disclosed herein. For instance, the $C_1$ to $C_{18}$ hydrocarbyl group can be any $C_1$ to $C_{15}$ alkyl group, $C_2$ to $C_{18}$ alkenyl group, $C_6$ to $C_{18}$ aryl group, or $C_7$ to $C_{18}$ aralkyl group disclosed herein. Non-limiting examples of suitable hydrocarbyl groups can include, but are not limited to, methyl, ethyl, propyl n-propyl), butyl (e.g., n-butyl, isobutyl), pentyl (e.g., neopentyl), hexyl (e.g., n-hexyl), heptyl, octyl, nonyl, decyl, ethenyl, propenyl, butenyl, pentenyl, hexenyl, heptenyl, octenyl, nonenyl, decenyl, phenyl, benzyl, or tolyl, and the like. Likewise, non-limiting examples of suitable hydrocarboxy groups can include, but are not limited to, methoxy, ethoxy, propoxy, butoxy, pentoxy, phenoxy, toloxy, xyloxy, or benzoxy, and the like.

In one aspect of the present invention, can be a $C_1$ to $C_{18}$ hydrocarbyl group. In another aspect, $X^5$ can be a $C_1$ to $C_{18}$ alkyl group, or a $C_1$ to $C_{10}$ alkyl group. For example, $X^5$ can be methyl, ethyl, propyl, n-butyl, sec-butyl, isobutyl, hexyl, and the like, in yet another aspect.

According to another aspect of the present invention, $X^6$ can be H, a halide, or a $C_1$ to hydrocarboxy group. In yet another aspect, $X^6$ can be ft, F, or Cl; alternatively, $X^6$ can be H; alternatively, $X^6$ can be F; or alternatively, $X^6$ can be Cl.

In the formula, $Al(X)_m(X^6)_{3-m}$, m can be a number from 1 to 3, inclusive, and in some aspects, in can be 3. The value of m is not restricted to be an integer; therefore, this formula can include sesquihalide compounds or other organoaluminum cluster compounds.

Non-limiting examples of organoaluminum compounds suitable for use in accordance with the present invention can include, but are not limited to, trialkylaluminum compounds, dialkylaluminum halide compounds, dialkylaluminum alkoxide compounds, dialkylaluminum hydride compounds, and combinations thereof. Specific non-limiting examples of suitable organoaluminum compounds can include, but are not limited to, trimethylaluminum (TMA), triethylaluminum (TEA), tri-n-propylaluminum (TNPA), butylaluminum (TNBA), triisobutylaluminum (TIBA), tri-n-hexylaluminum, tri-n-octylaluminum, diisobutylaluminum hydride, diethylaluminum ethoxide, diethylaluminum chloride, and the like, or combinations thereof.

The present invention contemplates a method of precontacting a transition metal complex with an organoaluminum compound and an olefin monomer to form a precontacted mixture, prior to contacting this precontacted mixture with an activator-support to form a catalyst composition. When the catalyst composition is prepared in this manner, typically, though not necessarily, a portion of the organoaluminum compound can be added to the precontacted mixture and another portion of the organoaluminum compound can be added to the postcontacted mixture prepared when the precontacted mixture is contacted with the solid oxide activator-support. However, the entire organoaluminum compound can be used to prepare the catalyst composition in either the precontacting or postcontacting step. Alternatively, all the catalyst components can be contacted in a single step.

Further, more than one organoaluminum compound can be used in either the precontacting or the postcontacting step. When an organoaluminum compound is added in multiple steps, the amounts of organoaluminum compound disclosed herein include the total amount of organoaluminum compound used in both the precontacted and postcontacted mixtures, and any additional organoaluminum compound added to the polymerization reactor. Therefore, total amounts of organoaluminum compounds are disclosed regardless of whether a single organoaluminum compound or more than one organoaluminum compound is used.

Aluminoxane Compounds

Certain aspects of the present invention provide a catalyst composition which can comprise an aluminoxane compound. As used herein, the term "aluminoxane." refers to aluminoxane compounds, compositions, mixtures, or discrete species, regardless of how such aluminoxanes are prepared, formed or otherwise provided. For example, a catalyst composition comprising an aluminoxane compound can be prepared in which aluminoxane is provided as the poly(hydrocarbyl aluminum oxide), or in which aluminoxane is provided as the combination of an aluminum alkyl compound and a source of active protons such as water. Aluminoxanes also can be referred to as poly(hydrocarbyl aluminum oxides) or organoaluminoxanes.

The other catalyst components typically can be contacted with the aluminoxane in a saturated hydrocarbon compound solvent, though any solvent that is substantially inert to the reactants, intermediates, and products of the activation step can be used. The catalyst composition formed in this manner can be collected by any suitable method, for example, by filtration. Alternatively, the catalyst composition can be introduced into the polymerization reactor without being isolated.

The aluminoxane compound of this invention can be an oligomeric aluminum compound comprising linear structures, cyclic structures, or cage structures, or mixtures of all three. Cyclic aluminoxane compounds having the formula:

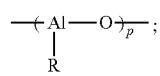

wherein R in this formula can be a linear or branched alkyl having from 1 to 10 carbon atoms, and p in this formula can be an integer from 3 to 20, are encompassed by this invention. The AIRO moiety shown here also can constitute the repeating unit in a linear aluminoxane. Thus, linear aluminoxanes having the formula:

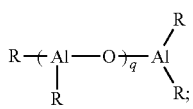

wherein R in this formula can be a linear or branched alkyl having from 1 to 10 carbon atoms, and q in this formula can be an integer from 1 to 50, are also encompassed by this invention.

Further, aluminoxanes can have cage structures of the formula $R^t_{5r+\alpha} R^b_{r-\alpha} Al_{4r} O_{3r}$, wherein $R^1$ can be a terminal linear or branched alkyl group having from 1 to 10 carbon atoms; $R^b$ can be a bridging linear or branched alkyl group having from 1 to 10 carbon atoms; r can be 3 or 4; and a can be equal to $n_{Al(3)} - n_{O(2)} + n_{O(4)}$, wherein $n_{Al(3)}$ is the number of three coordinate aluminum atoms, $n_{O(2)}$ is the number of two coordinate oxygen atoms, and $n_{O(4)}$ is the number of 4 coordinate oxygen atoms.

Thus, aluminoxanes which can be employed in the catalyst compositions of the present invention can be represented generally by formulas such as $(R—Al—O)_p$, $R(R—Al—O)_q AlR_2$, and the like. In these formulas, the R group typically can be a linear or branched $C_1$-$C_6$ alkyl, such as methyl, ethyl, propyl, butyl, pentyl, or hexyl. Examples of aluminoxane compounds that can be used in accordance with the present invention can include, but are not limited to, methylaluminoxane, ethylaluminoxane, n-propylaluminoxane, iso-propylaluminoxane, n-butylatuminoxane, t-butylaluminoxane, sec-butylaluminoxane, iso-butylaluminoxane, 1-pentylaluminoxane, 2-pentyoxane, 3-pentylaluminoxane, isopentylaluminoxane, neopentylahiminoxane, and the like, or any combination thereof. Methylatuminoxane, ethylatuminoxane, and iso-butylataminoxane can be prepared from trimethylaluminum, triethylaluminum, or triisobutylaluminum, respectively, and sometimes are referred to as poly(methyl aluminum oxide), poly(ethyl aluminum oxide), and poly (isobutyl aluminum oxide), respectively. It is also within the scope of the invention to use an aluminoxane in combination with a trialkylaluminum, such as that disclosed in U.S. Pat. No. 4,794,096, incorporated herein by reference in its entirety.

The present invention contemplates many values of p and q in the aluminoxane formulas $(R—Al—O)_p$, and $R(R—Al—O)_q AlR_2$, respectively. In some aspects, p and q can be at least 3. However, depending upon how the organoaluminoxane is prepared, stored, and used, the value of p and q can vary within a single sample of aluminoxane, and such combinations of organoaluminoxanes are contemplated herein.

In preparing a catalyst composition containing an aluminoxane, the molar ratio of the total moles of aluminum in the aluminoxane (or aluminoxanes) to the total moles of transition metal complex(es) in the composition generally can be between about 1:10 and about 100,000:1. In another aspect, the molar ratio can be in a range from about 5:1 to about 15,000:1. Optionally, aluminoxane can be added to a polymerization zone in ranges from about 0.01 mg/L to about 1000 mg/L, from about 0.1 mg/L, to about 100 mg/L, or from about 1 mg/L to about 50 mg/L.

Organoaluminoxanes can be prepared by various procedures. Examples of organoaluminoxane preparations are disclosed in U.S. Pat. Nos. 3,242,099 and 4,808,561, the disclosures of which are incorporated herein by reference in their entirety. For example, water in an inert organic solvent can be reacted with an aluminum alkyl compound, such as $(R^X)_3 Al$, to form the desired organoaluminoxane compound. While not intending to be bound by this statement, it is believed that this synthetic method can afford a mixture of both linear and cyclic R—Al—O aluminoxane species, both of which are encompassed by this invention. Alternatively, organoaluminoxanes can be prepared by reacting an aluminum alkyl compound, such as $(R^X m)_3 Al$, with a hydrated salt, such as hydrated copper sulfate, in an inert organic solvent.

Organoboron & Organoborate Compounds

According to another aspect of the present invention, the catalyst composition can comprise an organoboron or organoborate compound. Such compounds can include neutral boron compounds, borate salts, and the like, or combinations thereof. For example, fluoroorgano boron compounds and fluoroorgano borate compounds are contemplated.

Any fluoroorgano boron or fluoroorgano borate compound can be utilized with the present invention. Examples of fluoroorgano borate compounds that can be used in the present invention can include, but are not limited to, fluorinated aryl borates such as N,N-dimethylanilinium tetrakis(pentafluorophenyl)borate, triphenylcarbenium tetrakis(pentafluorophenyl)borate, lithium tetrakis(pentafluorophenyl)borate, N,N-dimethylanilinium tetrakis[3,5-bis(trifluoromethyl)phenyl]borate, triphenylcarbenium tetrakis[3,5-bis(trifluoromethyl)phenyl]borate, and the like, or mixtures thereof. Examples of fluoroorgano boron compounds that can be used as co-catalysts in the present invention can include, but are not limited to, tris(pentafluorophenyl)boron, tris[3,5-bis(trifluoromethyl)-phenyl]boron, and the like, or mixtures thereof. Although not intending to be bound by the following theory, these examples of fluoroorgano borate and fluoroorgano boron compounds, and related compounds, may form "weakly-coordinating" anions when combined with a transition metal complex (see e.g., U.S. Pat. No. 5,919,983, the disclosure of which is incorporated herein by reference in its entirety). Applicants also contemplate the use of diboron, or bis-boron, compounds or other bifunctional compounds containing two or more boron atoms in the chemical structure, such as disclosed in J. Am. Chem. Soc., 2005, 127, pp, 14756-14768, the content of which is incorporated herein by reference in its entirety.

Generally, any amount of organoboron compound can be used. According to one aspect of this invention, the molar ratio of the total moles of organoboron or organoborate compound (or compounds) to the total moles of transition metal complex (or complexes) in the catalyst composition can be in a range from about 0.1:1 to about 15:1. Typically, the amount of the fluoroorgano boron or fluoroorgano borate compound used can be from about 0.5 moles to about 10 moles of boron/borate compound per mole of transition metal complex(es). According to another aspect of this invention, the amount of fluoroorgano boron or fluoroorgano borate compound can be from about 0.8 moles to about 5 moles of boron/borate compound per mole of transition metal complex(es).

Ionizing Ionic Compounds

In another aspect, catalyst compositions disclosed herein can comprise an ionizing ionic compound. An ionizing ionic compound is an ionic compound that can function as an activator or co-catalyst to enhance the activity of the catalyst composition. While not intending to be bound by theory, it is believed that the ionizing ionic compound may be capable of reacting with a transition metal complex and converting the transition metal complex into one or more cationic transition metal complexes, or incipient cationic transition metal complexes. Again, while not intending to be bound by theory, it is believed that the ionizing ionic compound can function as an ionizing compound by completely or partially extracting an anionic ligand, such as $X^1$ or $X^{11}$, from a transition metal complex. However, the ionizing ionic compound can be an activator or co-catalyst regardless of whether it is ionizes the transition metal complex, abstracts a $X^1$ or $X^2$ ligand in a fashion as to form an ion pair, weakens the metal-$X^1$ or metal-$X^2$ bond in the transition metal complex, simply coordinates to a $X^1$ or $X^2$ ligand, or activates the transition metal complex by some other mechanism.

Further, it is not necessary that the ionizing ionic compound activate the transition metal complex only. The activation function of the ionizing ionic compound can be evident in the enhanced activity of catalyst composition as a whole, as compared to a catalyst composition that does not contain an ionizing ionic compound.

Examples of ionizing ionic compounds can include, but are not limited to, the following compounds: tri(n-butyl)ammonium tetrakis(p-tolyl)borate, tri(n-butyl)ammonium tetrakis(m-tolyl)borate, tri(n-butyl)ammonium tetrakis(2,4-dimethylphenyl)borate, tri(n-butyl)ammonium tetrakis(3,5-dimethylphenyl)borate, tri(n-butyl)ammonium tetrakis[3,5-bis(trifluoromethyl)phenyl]borate, tri-(n-butyl)ammonium tetrakis(pentafluorophenyl)borate, N,N-dimethylanilinium tetrakis(p-tolyl)borate, N,N-dimethylanilinium tetrakis(m-tolyl)borate, N,N-dimethylanilinium tetrakis(2,4-dimethylphenyl)borate, N,N-dimethylanilinium tetrakis(3,5-dimethylphenyl)borate, N,N-dimethylanilinium tetrakis[3,5-bis(trifluoromethyl)phenyl]borate, N,N-dimethylanilinium tetrakis(pentafluorophenyl)borate, triphenylcarbenium tetrakis(p-tolyl)borate, triphenylcarbenium tetrakis(m-tolyl) borate, triphenylcarbenium tetrakis(2,4-dimethylphenyl)borate, triphenylcarbenium tetrakis(3,5-dimethylphenyl) borate, triphenylcarbenium tetrakis[3,5-bis(trifluoromethyl) phenyl]borate, triphenylcarbenium tetrakis (pentafluorophenyl)borate, tropylium tetrakis(p-tolyl)borate, tropylium tetrakis(m-tolyl)borate, tropylium tetrakis(2,4-dimethylphenyl)borate, tropylium tetrakis(3,5-dimethylphenyl)borate, tropylium tetrakis[3,5-bis(trifluoromethyl)phenyl]borate, tropylium tetrakis(pentafluorophenyl)borate, lithium tetrakis(pentafluorophenyl)borate, lithium tetraphenylborate, lithium tetrakis(p-tolyl)borate, lithium tetrakis(m-tolyl)borate, lithium tetrakis(2,4-dimethylphenyl)borate, lithium tetrakis(3,5-dimethylphenyl)borate, lithium tetrafluoroborate, sodium tetrakis(pentafluorophenyl)borate, sodium tetraphenylborate, sodium tetrakis(p-tolyl)borate, sodium tetrakis(m-tolyl)borate, sodium tetrakis(2,4-dimethylphenyl)borate, sodium tetrakis(3,5-dimethylphenyl)borate, sodium tetrafluoroborate, potassium tetrakis(pentafluorophenyl)borate, potassium tetraphenylborate, potassium tetrakis(p-tolyl)borate, potassium tetrakis(m-tolyl)borate, potassium tetrakis(2,4-dimethylphenyl)borate, potassium tetrakis(3,5-dimethylphenyl)borate, potassium tetrafluoroborate, lithium tetrakis(pentafluorophenyl)aluminate, lithium tetraphenylaluminate, lithium tetrakis(p-tolyl)aluminate, lithium tetrakis(m-tolyl)aluminate, lithium tetrakis(2,4-dimethylphenyl)aluminate, lithium tetrakis(3,5-dimethylphenyl)aluminate, lithium tetrafluoroaluminate, sodium tetrakis(pentafluorophenyl)aluminate, sodium tetraphenylaluminate, sodium tetrakis(p-tolyl)aluminate, sodium tetrakis (m-tolyl)aluminate, sodium tetrakis(2,4-dimethylphenyl) aluminate, sodium tetrakis(3,5-dimethylphenyl)aluminate, sodium tetrafluoroaluminate, potassium tetrakis(pentafluorophenyl)aluminate, potassium tetraphenylaluminate, potassium tetrakis(p-tolyl)aluminate, potassium tetrakis(m-tolyl) aluminate, potassium tetrakis(2,4-dimethylphenyl) aluminate, potassium tetrakis(3,5-dimethylphenyl) aluminate, potassium tetrafluoroaluminate, and the like, or combinations thereof. Ionizing ionic compounds useful in this invention are not limited to these; other examples of ionizing ionic compounds are disclosed in U.S. Pat. Nos. 5,576,259 and 5,807,938, the disclosures of which are incorporated herein by reference in their entirety.

Organomagnesium & Organolithium Compounds

Other aspects are directed to catalyst compositions which can include an organomagnesium compound, an organolithium compound, or a combination thereof. In some aspects, the organomagnesium compound and organolithium compound compounds can have the following general formulas:

$$Mg(X^{12})(X^{13}); \text{ and}$$

$$Li(X^{14}).$$

In these formulas, $X^{12}$ and $X^{14}$ independently can be a $C_1$ to $C_{18}$ hydrocarbyl group, and $X^{13}$ can be H, a halide, or a $C_1$ to $C_{18}$ hydrocarbyl or to $C_{18}$ hydrocarboxy group. It is contemplated $X^{12}$ and $X^{13}$ can be the same, or that $X^{12}$ and $X^{13}$ can be different.

In one aspect, $X^{12}$, $X^{13}$, and $X^{14}$ independently can be any $C_1$ to $C_{18}$ hydrocarbyl group, $C_1$ to $C_{12}$ hydrocarbyl group, $C_1$ to $C_8$ hydrocarbyl group, or $C_1$ to $C_5$ hydrocarbyl group disclosed herein. In another aspect, $X^{12}$, $X^{13}$, and $X^{14}$ independently can be any $C_1$ to $C_{18}$ alkyl group, to $C_{18}$ alkenyl group, $C_6$ to $C_{18}$ aryl group, or $C_7$ to $C_{18}$ aralkyl group disclosed herein; alternatively, any $C_1$ to $C_{12}$ alkyl group, $C_1$ to $C_{12}$ alkenyl group, $C_6$ to $C_{12}$ aryl group, or $C_7$ to $C_{12}$ aralkyl group disclosed herein; or alternatively, any $C_1$ to $C_5$ alkyl group, $C_2$ to $C_5$ alkenyl group, $C_6$ to $C_8$ aryl group, or $C_7$ to $C_8$ aralkyl group disclosed herein. Thus, $X^{12}$, $X^{13}$, and $X^{14}$ independently can be a methyl group, an ethyl group, a propyl group, a butyl group, a pentyl group, a hexyl group, a heptyl group, an octyl group, a nonyl group, a decyl group, a undecyl group, a dodecyl group, a tridecyl group, a tetradecyl group, a pentadecyl group, a hexadecyl group, a heptadecyl group, an octadecyl group, an ethenyl group, a propenyl group, a butonyl group, a pentenyl group, a hexenyl group, a heptenyl group, an octenyl group, a nonenyl group, a decenyl group, a undecenyl group, a dodecenyl group, a tridecenyl group, a tetradecenyl group, a pentadecenyl group, a hexadecenyl group, a heptadecenyl group, an octadecenyl group, a phenyl group, a naphthyl group, a benzyl group, or a tolyl group, and the like. In yet another aspect, $X^{12}$, $X^{13}$, and $X^{14}$ independently can be methyl, ethyl, propyl, butyl, or pentyl (e.g., neopentyl), or both or both $X^{12}$ and $X^{13}$ can be methyl, or ethyl, or propyl, or butyl, or pentyl neopentyl).

$X^{13}$ can be H, a halide, or a $C_1$ to $C_{18}$ hydrocarbyl or $C_1$ to $C_{18}$ hydrocarboxy group (e.g., any $C_1$ to $C_{18}$, $C_1$ to $C_{12}$, $C_1$ to $C_{10}$, or $C_1$ to $C_8$ hydrocarboxy group disclosed herein). In some aspects, $X^{13}$ can be H, a halide (e.g., Cl), or a $C_1$ to $C_{18}$ hydrocarbyl or $C_1$ to $C_{18}$ hydrocarboxy group; alternatively, H, a halide, or a $C_1$ to $C_8$ hydrocarbyl or $C_1$ to $C_8$ hydrocarboxy group; or alternatively, H, Br, Cl, F, I, methyl, ethyl, propyl, butyl, pentyl (e.g., neopentyl), hexyl, heptyl, octyl, nonyl, decyl, ethenyl, propenyl, butenyl, pentenyl, hexenyl, heptenyl, octenyl, nonenyl, decenyl, phenyl, benzyl, tolyl, methoxy, ethoxy, propoxy, butoxy, pentoxy, phenoxy, toloxy, xyloxy, or benzoxy.

In other aspects, the organomagnesium compound can have one or two hydrocarbylsilyl moieties. Each hydrocarbyl of the hydrocarbylsilyl group can be any hydrocarbyl group disclosed herein (e.g., a $C_1$ to $C_{15}$ alkyl group, a $C_2$ to $C_{18}$ alkenyl group, a $C_6$ to $C_{18}$ aryl group, a $C_7$ to $C_{18}$ aralkyl group, etc.). Illustrative and non-limiting examples of hydrocarbylsilyl groups can include, but are not limited to, trimethylsilyl, triethylsilyl, tripropylsilyl (e.g., triisopropylsilyl), tributylsilyl, tripentylsilyl, triphenylsilyl, allyldimethylsilyl, trimethylsilylmethyl, and the like.

Exemplary organomagnesium compounds can include, but are not limited to, dimethyl magnesium, diethylmagnesium, dipropylmagnesium, dibutylmagnesium, dineopentylmagnesium, di(trimsthylsilylmethyl)magnesium, methylmagnesium chloride, ethylmagnesium chloride, propylmagnesium chloride, butylmagnesium chloride, neopentylmagnesium chloride, trimethylsilylmethylmagnesium chloride, methylmagnesium bromide, ethylmagnesium bromide, propylmagnesium bromide, butylmagnesium bromide, neopentylmagnesium bromide, trimethylsilylmethylmagnesium bromide, methylmagnesium iodide, ethylmagnesium iodide, propylmagnesium iodide, butylmagnesium neopentylmagnesium iodide, trimethylsilylmethylmagnesium iodide, methylmagnesium ethoxide, ethylmagnesium ethoxide, propylmagnesium ethoxide, butylmagnesium ethoxide, neopentylmagnesium ethoxide, trimethylsilylmethylmagnesium ethoxide, methylmagnesium propoxide, ethylmagnesium propoxide, propylmagnesium propoxide, butylmagnesium propoxide, neopentylmagnesium propoxide, trimethylsilylmethylmagnesium propoxide, methylmagnesium phenoxide, ethylmagnesium phenoxide, propylmagnesium phenoxide, butylmagnesium phenoxide, neopentylmagnesium phenoxide, trimethylsilylmethylmagnesium phenoxide, and the like, or any combination thereof.

Likewise, exemplary organolithium compounds can include, but are not limited to, methyllithium, ethyllithium, propyllithium, butyllithium (e.g., t-butyllithium), neopentyllithium, trimethylsilylmethyllithium, phenyllithium, tolyllithium, xylyilithium, benzyllithium, (dimethylphenyl)methyllithium, allyllithium, and the like, or combinations thereof.

Catalyst Compositions

The methods disclosed herein are not limited to particular transition-metal based catalyst systems or compositions, but rather, can be applied to any transition-metal based catalyst system or composition suitable for the polymerization of an olefin monomer (and optional comonomer(s)). The transition-metal based catalyst composition can comprise, for example, a transition metal (one or more than one) from Groups IIIB-VIIIB of the Periodic Table of the Elements. In one aspect, the transition metal-based catalyst composition can comprise a Group III, IV, V, or VI transition metal, or a combination of two or more transition metals. The transition metal-based catalyst composition can comprise chromium, titanium, zirconium, hafnium, vanadium, or a combination thereof, in one aspect, or can comprise chromium, titanium, zirconium, hafnium, or a combination thereof, in another aspect. Accordingly, the transition metal-based catalyst system can comprise chromium, or titanium, or zirconium, or hafnium, either singly or in combination.

Various transition metal-based catalyst systems or compositions known to a skilled artisan are useful in the polymerization of olefins. These include, but are not limited to, Ziegler-Natta based catalyst compositions, chromium-based catalyst compositions, metallocene-based catalyst compositions, and the like, including combinations thereof. The methods disclosed herein are not limited to the aforementioned catalyst compositions, but Applicants nevertheless contemplate particular aspects directed to these catalyst compositions. Hence, the transition metal-based catalyst composition can be a Ziegler-Natta based catalyst composition, a chromium-based catalyst composition, and/or a metallocene-based catalyst composition; alternatively, a Ziegler-Natta based catalyst composition; alternatively, a chromium-based catalyst composition; or alternatively, a metallocene-based catalyst composition. Examples of representative and non-limiting transition metal-based catalysts systems or compositions include those disclosed in the U.S. Pat. Nos. 3,887,494, 3,119,569, 4,053,436, 4,981,831, 4,364,842, 4,444,965, 4,364,855, 4,504,638, 4,364,854, 4,444,964, 4,444,962, 3,976,632, 4,248,735, 4,297,460, 4,397,766, 2,825,721, 3,225,023, 3,226,205, 3,622,521, 3,625,864, 3,900,457, 4,301,034, 4,547,557, 4,339,559, 4,806,513, 5,037,911, 5,219,817, 5,221,654, 3,900,457, 4,053,436, 4,081,407, 4,296,001, 4,392,990, 4,405,501, 4,981,831, 4,151,122, 4,247,421, 4,248,735, 4,297,460, 4,397,769, 4,460,756, 4,182,815, 4,735,931, 4,820,785, 4,988,657, 5,436,305, 5,610,247, 5,627,247, 3,242,099, 4,808,561, 5,275,992, 5,237,025, 5,244,990, 5,179,178, 4,855,271, 5,179,178, 5,275,992, 3,887,494, 3,119,569, 3,900,457, 4,981,831, 4,364,842, 4,444,965, 4,939,217, 5,210,352, 5,436,305, 5,401,817, 5,631,335, 5,571,880, 5,191,132, 5,480,848, 5,399,636, 5,565,592, 5,347,026, 5,594,078, 5,498,581, 5,496,781, 5,563,284, 5,554,795, 5,420,320, 5,451,649, 5,541,272, 5,705,478, 5,631,203, 5,654,454, 5,705,579, 5,668,230, 6,300,271, 6,831,141, 6,653,416, 6,613,712, 7,294,599, 6,355,594, 6,395,666, 6,833,338, 7,417,097, 6,548,442, and 7,312,283, each of which is incorporated herein by reference in its entirety.

In one aspect, the transition metal compound or complex (one or more) in the catalyst composition can comprise a metallocene compound. A "metallocene" compound contains at least one $\eta^3$ to $\eta^5$-cyclopentadienyl-type moiety, wherein $\eta^3$ to $\eta^5$-cycloalkadienyl moieties include cyclopentadienyl ligands, indenyl ligands, fluorenyl ligands, and the like, including saturated, partially saturated, and/or substituted derivatives or analogs of any of these. Possible substituents on these ligands may include hydrogen, therefore this description encompasses ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like. The metallocene compound can contain one cyclopentadienyl-type moiety (half-sandwich) or two cyclopentadienyl-type moieties (full-sandwich).

Additionally or alternatively, the transition metal compound or complex in the catalyst composition can comprise one or more compounds containing chromium, titanium, zirconium, hafnium, and/or vanadium. Thus, the transition metal compound or complex can comprise a metallocene compound containing chromium, titanium, zirconium, hafnium, and/or vanadium, or a non-metallocene compound containing chromium, titanium, zirconium, hafnium, and/or vanadium. In another aspect, the transition metal compound or complex in the catalyst composition can comprise a compound containing titanium, zirconium, or hafnium. In yet another aspect, the transition metal compound or complex in the catalyst composition can comprise a compound containing chromium. For instance, the transition metal compound or complex in the catalyst composition can have the formula:

$$\text{Cr}(X^4)(X^1)(X^2)(L)_n \qquad (II).$$

Within formula (II), $X^4$, $X^1$, $X^2$, L, and n are independent elements of the transition metal compound. Accordingly, the transition metal compound having formula (II) may be described, using any combination of $X^4$, $X^1$, $X^2$, L and n disclosed herein.

Unless otherwise specified, formula (II) above, any other structural formulas disclosed herein, and any transition metal complex, compound, or species (e.g., a metallocene compound) disclosed, herein are not designed to show stereochemistry or isomeric positioning of the different moieties (e.g., these formulas are not intended to display cis or trans isomers, or R or S diastereoisomers), although such compounds are contemplated and encompassed by these formulas and/or structures.

$X^1$ and $X^2$ in formula (II) independently can be a monoanionic ligand. In some aspects, suitable monoanionic ligands can include, but are not limited to, H (hydride), a halide, a $C_1$ to $C_{36}$ hydrocarbyl group, a $C_1$ to $C_{36}$ hydrocarboxy group, a $C_1$ to $C_{36}$ hydrocarbylaminyl group, a $C_1$ to $C_{36}$ hydrocarbylsilyl group, a $C_1$ to $C_{36}$ hydrocarbylaminylsilyl group, —$OBR^A{}_2$, or —$OSO_2R^A$, wherein $R^A$ is a $C_1$ to $C_{36}$ hydrocarbyl group. It is contemplated that $X^1$ and $X^2$ can be either the same or a different monanionic ligand.

In one aspect, $X^1$ and $X^2$ independently can be H, a halide (e.g., F, Cl, Br, etc.), a $C_1$ to $C_{18}$ hydrocarbyl group, a $C_1$ to $C_{18}$ hydrocarboxy group, a $C_1$ to $C_{18}$ hydrocarbylaminyl group, a $C_1$ to $C_{18}$ hydrocarbylsilyl group, or a $C_1$ to $C_{18}$ hydrocarbylaminylsilyl group. Alternatively, $X^1$ and $X^2$ independently can be H, a halide, $OBR^A{}_2$, or $OSO_2R^A$, wherein $R^A$ is a $C_1$ to $C_{18}$ hydrocarbyl group. In another aspect, $X^1$ and $X^2$ independently can be H, a halide, a $C_1$ to $C_{12}$ hydrocarbyl group, a $C_1$ to $C_{12}$ hydrocarboxy group, a $C_1$ to $C_{12}$ hydrocarbylaminyl group, a $C_1$ to $C_{12}$ hydrocarbylsilyl group, a $C_1$ to $C_{12}$ hydrocarbylaminylsilyl group, $OBR^A{}_2$ or $OSO_2R^A$, wherein $R^A$ is a $C_1$ to $C_{12}$ hydrocarbyl group. In yet another aspect, $X^1$ and $X^2$ independently can be H, a halide, a $C_1$ to $C_{10}$ hydrocarbyl group, a $C_1$ to $C_{10}$ hydrocarboxy group, a $C_1$ to $C_{10}$ hydrocarbylaminyl group, a $C_1$ to $C_{10}$ hydrocarbylsilyl group, a $C_1$ to $C_{10}$ hydrocarbylaminylsilyl group, $OBR^A{}_2$, or $OSO_2R^A$, wherein $R^A$ is a $C_1$ to $C_{10}$ hydrocarbyl group. In still another aspect, $X^1$ and $X^2$ independently can be H, a halide, a $C_1$ to $C_8$ hydrocarbyl group, a $C_1$ to $C_8$ hydrocarboxy group, a $C_1$ to $C_8$ hydrocarbylaminyl group, a $C_1$ to $C_8$ hydrocarbylsilyl group, a $C_1$ to $C_8$ hydrocarbylaminylsilyl group, $OBR^A{}_2$, or $OSO_2R^A$, wherein $R^A$ is a $C_1$ to $C_8$ hydrocarbyl group.

The hydrocarbyl group which can be $X^1$ and/or $X^2$ in formula (II) can be a $C_1$ to $C_{36}$ hydrocarbyl group, including, but not limited to, a $C_1$ to $C_{36}$ alkyl group, a $C_2$ to $C_{36}$ alkenyl group, a $C_4$ to $C_{36}$ cycloalkyl group, a $C_6$ to $C_{36}$ aryl group, or a $C_7$ to $C_{36}$ aralkyl group. For instance, $X^1$ and $X^2$ independently can be a $C_1$ to $C_{18}$ alkyl group, a $C_2$ to $C_{18}$ alkenyl group, a $C_4$ to $C_{18}$ cycloalkyl group, a $C_6$ to $C_{18}$ aryl group, or a $C_7$ to $C_{18}$ aralkyl group; alternatively, $X^1$ and $X^2$ independently can be a $C_1$ to $C_{12}$ alkyl group, a $C_2$ to $C_{12}$ alkenyl group, a $C_4$ to $C_{12}$ cycloalkyl group, a $C_6$ to $C_{12}$ aryl group, or a $C_7$ to $C_{12}$ aralkyl group; alternatively, $X^1$ and $X^2$ independently can be a $C_1$ to $C_{10}$ alkyl group, a $C_2$ to $C_{10}$ alkenyl group, a $C_4$ to $C_{10}$ cycloalkyl group, a $C_6$ to $C_{10}$ aryl group, or a $C_7$ to $C_{10}$ aralkyl group; or alternatively, $X^1$ and $X^2$ independently can be a $C_1$ to $C_5$ alkyl group, a $C_2$ to $C_5$ alkenyl group, a $C_5$ to $C_8$ cycloalkyl group, a $C_6$ to $C_8$ aryl group, or a $C_7$ to $C_8$ aralkyl group.

Accordingly, in some aspects, the alkyl group which can be $X^1$ and/or $X^2$ in formula (II) can be a methyl group, an ethyl group, a propyl group, a butyl group, a pentyl group, a hexyl group, a heptyl group, an octyl group, a nonyl group, a decyl group, a undecyl group, a dodecyl group, a tridecyl group, a tetradecyl group, a pentadecyl group, a hexadecyl group, a heptadecyl group, or an octadecyl group; or alternatively, a methyl group, an ethyl group, a propyl group, a butyl group, a pentyl group, a hexyl group, a heptyl group, an octyl group, a nonyl group, or a decyl group. In some aspects, the alkyl group which can be $X^1$ and/or $X^2$ in formula (II) can be a methyl group, an ethyl group, a n-propyl group, an iso-propyl group, a n-butyl group, an iso-butyl group, a sec-butyl group, a tert-butyl group, un-pentyl group, an iso-pentyl group, a sec-pentyl group, or a neopentyl group; alternatively, a methyl group, an ethyl group, an iso-propyl group, a tert-butyl group, or a neopentyl group; alternatively, a methyl group; alternatively, an ethyl group; alternatively, a n-propyl group; alternatively, an iso-propyl group; alternatively, a tert-butyl group; or alternatively, a neopentyl group.

Suitable alkenyl groups which can be $X^1$ and/or $X^2$ in formula (II) can include, but are not limited to, an ethenyl group, a propenyl group, a butenyl group, a pentenyl group, a hexenyl group, a heptenyl group, an octenyl group, a nonenyl group, a decenyl group, a undecenyl group, a dodecenyl group, a tridecenyl group, a tetradecenyl group, a pentadecenyl group, a hexadecenyl group, a heptadecenyl group, or an octadecenyl group. Such alkenyl groups can be linear or branched, and the double bond can be located anywhere in the chain. In one aspect, $X^1$ and/or $X^2$ in formula (II) can be an ethenyl group, a propenyl group, a butenyl group, a pentenyl group, a hexenyl group, a heptenyl group, an octenyl group, a nonenyl group, or a decenyl group, while in another aspect, $X^1$ and/or $X^2$ in formula (II) can be an ethenyl group, a propenyl group, a butenyl group, a pentenyl group, or a hexenyl group. For example, $X^1$ and/or $X^2$ can be an ethenyl group; alternatively, a propenyl group; alternatively, a butenyl group; alternatively, a pentenyl group; or alternatively, a hexenyl group. In yet another aspect, $X^1$ and/or $X^2$ can be a terminal alkenyl group, such as a $C_3$ to $C_{18}$ terminal alkenyl group, a $C_8$ to $C_{12}$ terminal alkenyl group, or a $C_3$ to $C_8$ terminal alkenyl group. Illustrative terminal alkenyl groups can include, but are not limited to, a prop-2-en-1-yl group, a bute-3-en-1-yl group, a pent-4-en-1-yl group, a hex-5-en-1-yl group, a hept-6-en-1-yl group, an octe-7-en-1-yl group, a non-8-en-1-yl group, a dece-9-en-1-yl group, and so forth.

$X^1$ and/or $X^2$ in formula (II) can be a cycloalkyl group, including, but not limited to, a cyclobutyl group, a substituted cyclobutyl group, a cyclopentyl group, a substituted cyclopentyl group, a cyclohexyl group, a substituted cyclohexyl group, a cycloheptyl group, a substituted cycloheptyl group, a cyclooctyl group, or a substituted cyclooctyl group. For example, $X^1$ and/or $X^2$ in formula (II) can be a cyclopentyl group, a substituted cyclopentyl group, a cyclohexyl group, or a substituted cyclohexyl group. Moreover, $X^1$ and/or $X^2$ in formula (II) can be a cyclobutyl group or a substituted cyclobutyl group; alternatively, a cyclopentyl group or a substituted cyclopentyl group; alternatively, a cyclohexyl group or a substituted cyclohexyl group; alternatively, a cycloheptyl group or a substituted cycloheptyl group; alternatively, a cyclooctyl group or a substituted cyclooctyl group; alternatively, a cyclopentyl group; alternatively, a substituted cyclopentyl group; alternatively, a cyclohexyl group; or alternatively, a substituted cyclohexyl group. Substituents which can be utilized for the substituted cycloalkyl group are independently disclosed herein and can be utilized without limitation to further describe the substituted cycloalkyl group which can be $X^1$ and/or $X^2$ in formula (II).

In some aspects, the aryl group which can be $X^1$ and/or $X^2$ in formula (II) can be a phenyl group, a substituted phenyl group, a naphthyl group, or a substituted naphthyl group. In an aspect, the aryl group can be a phenyl group or a substituted phenyl group; alternatively, a naphthyl group or a substituted naphthyl group; alternatively, a phenyl group or a naphthyl group; alternatively, a substituted phenyl group or a substituted naphthyl group; alternatively, a phenyl group; or alternatively, a naphthyl group. Substituents which can be utilized for the substituted phenyl groups or substituted naphthyl groups are independently disclosed herein and can be utilized without limitation to further describe the substituted phenyl groups or substituted naphthyl groups which can be $X^1$ and/or $X^2$ in formula (II).

In an aspect, the substituted phenyl group which can be $X^1$ and/or $X^2$ in formula (II) can be a 2-substituted phenyl group, a 3-substituted phenyl group, a 4-substituted phenyl group, a 2,4-disubstituted phenyl group, a 2,6-disubstituted phenyl group, a 3,5-disubstituted phenyl group, or a 2,4,6-trisubstituted phenyl group. In other aspects, the substituted phenyl group can be a 2-substituted phenyl group, a 4-substituted phenyl group, a 2,4-disubstituted phenyl group, or a 2,6-disubstituted phenyl group; alternatively, a 3-substituted phenyl group or a 3,5-disubstituted phenyl group; alternatively, a 2-substituted phenyl group or a 4-substituted phenyl group; alternatively, a 2,4-disubstituted phenyl group or a 2,6-disubstituted phenyl group; alternatively, a 2-substituted phenyl group; alternatively, a 3-substituted phenyl group; alternatively, a 4-substituted phenyl group; alternatively, a 2,4-disubstituted phenyl group; alternatively, a 2,6-disubstituted phenyl group; alternatively, a 3,5-disubstituted phenyl group; or alternatively, a 2,4,6-trisubstituted phenyl group. Substituents which can be utilized for these specific substituted phenyl groups are independently disclosed herein and can be utilized without limitation to farther describe these substituted phenyl groups which can be the $X^1$ and/or $X^2$ group(s) in formula (II).

In some aspects, the aralkyl group which can be $X^1$ and/or $X^2$ group in formula (II) can be a benzyl group or a substituted benzyl group. In an aspect, the aralkyl group can be a benzyl group or, alternatively, a substituted benzyl group. Substituents which can be utilized for the substituted aralkyl group are independently disclosed herein and can be utilized without limitation to farther describe the substituted aralkyl group which can be the $X^1$ and/or $X^2$ group(s) in formula (II).

In an aspect, each non-hydrogen substituent(s) for the substituted cycloalkyl group, substituted aryl group, or substituted aralkyl group which can be $X^1$ and/or $X^2$ in formula (II) independently can be a $C_1$ to $C_{18}$ hydrocarbyl group; alternatively, a $C_1$ to $C_8$ hydrocarbyl group; or alternatively, a $C_1$ to $C_5$ hydrocarbyl group. Specific hydrocarbyl groups are independently disclosed herein and can be utilized without limitation to further describe the substituents of the substituted cycloalkyl groups, substituted aryl groups, or substituted aralkyl groups which can be $X^1$ and/or $X^2$ in formula (II). For instance, the hydrocarbyl substituent can be an alkyl group, such as a methyl group, an ethyl group, a n-propyl group, an isopropyl group, a n-butyl group, a sec-butyl group, an isobutyl group, a tert-butyl group, a n-pentyl group, a 2-pentyl group, a 3-pentyl group, a 2-methyl-1-butyl group, a tert-pentyl group, a 3-methyl-1-butyl group, a 3-methyl-2-butyl group, or a neo-pentyl group, and the like. Furthermore, the hydrocarbyl substituent can be a benzyl group, a phenyl group, a tolyl group, or a xylyl group, and the like.

A hydrocarboxy group is used generically herein to include, for instance, alkoxy, aryloxy, aralkoxy, and -(alkyl, aryl, or aralkyl)-O-(alkyl, aryl, or aralkyl) groups, and such groups which are suitable for $X^1$ and/or $X^2$ can comprise up to about 36 carbon atoms (e.g., $C_1$ to $C_{36}$, $C_1$ to $C_{18}$, $C_1$ to $C_{10}$, or $C_1$ to $C_8$ hydrocarboxy groups). Illustrative and non-limiting examples of hydrocarboxy groups which can be $X^1$ and/or $X^2$ in formula (II) can include, but are not limited to, a methoxy group, an ethoxy group, an n-propoxy group, an isopropoxy group, an n-butoxy group, a sec-butoxy group, an isobutoxy group, a tert-butoxy group, an n-pentoxy group, a 2-pentoxy group, a 3-pentoxy group, a 2-methyl-1-butoxy group, a tert-pentoxy group, a 3-methyl-1-butoxy group, a 3-methyl-2-butoxy group, a neo-pentoxy group, a phenoxy group, a toloxy group, a xyloxy group, a 2,4,6-trimethylphenoxy group, a benzoxy group, an acetylacetonate group (acac), and the like. In an aspect, the hydrocarboxy group which can be $X^1$ and/or $X^2$ in formula (II) can be a methoxy group; alternatively, an ethoxy group; alternatively, an n-propoxy group; alternatively, an isopropoxy group; alternatively, an n-butoxy group; alternatively, a sec-butoxy group; alternatively, an isobutoxy group; alternatively, a tert-butoxy group; alternatively, an n-pentoxy group; alternatively, a 2-pentoxy group; alternatively, a 3-pentoxy group; alternatively, a 2-methyl-1-butoxy group; alternatively, a tert-pentoxy group; alternatively, a 3-methyl-1-butoxy group, alternatively, a 3-methyl-2-butoxy group; alternatively, a neo-pentoxy group; alternatively, a phenoxy group; alternatively, a toloxy group; alternatively, a xyloxy group; alternatively, a 2,4,6-trimethylphenoxy group; alternatively, a benzoxy group; or alternatively, an acetylacetonate group.

The term hydrocarbylaminyl group is used generically herein to refer collectively to, for instance, alkylaminyl, arylaminyl, arallspylaminyl, dialkylaminyl, diarylaminyl, diaralkylaminyl, and -(alkyl, aryl, or aralkyl)-N-(alkyl, aryl, or aralkyl) groups, and unless otherwise specified, the hydrocarbylaminyl groups which can be $X^1$ and/or $X^2$ in formula (II) can comprise up to about 36 carbon atoms $C_1$ to $C_{36}$, $C_1$ to $C_{18}$, $C_1$ to $C_{10}$, or $C_1$ to $C_8$ hydrocarbylaminyl groups). Accordingly, hydrocarbylaminyl is intended to cover both (mono)hydrocarbylaminyl and dihydrocarbylaminyl groups. In some aspects, the hydrocarbylaminyl group which can be $X^1$ and/or $X^2$ in formula (II) can be, for instance, a methylaminyl group (—NHCH$_3$), an ethylaminyl group (—NHCH$_2$CH$_3$), an n-propylaminyl group (—NHCH$_2$CH$_2$CH$_3$), an iso-propylaminyl group (MICH(CH$_3$)$_2$), an n-butylaminyl group (—NHCH$_2$CH$_2$CH$_2$CH$_3$), a t-butylaminyl group (—NHC(CH$_3$)$_3$), an n-pentylaminyl group (—NHCH$_2$CH$_2$CH$_2$CH$_3$), a neo-pentylaminyl group (—NHCH$_2$C(CH$_3$)$_3$), a phenylaminyl group (—NHC$_6$H$_5$), a tolylaminyl group (—NHC$_6$H$_4$CH$_3$), or a xylylaminyl group (—NHC$_6$H$_3$(CH$_3$)$_2$); alternatively, a methylaminyl group; alternatively, an ethylaminyl group; alternatively, a propylaminyl group; or alternatively, a phenylaminyl group. In other aspects, the hydrocarbylaminyl group which can be $X^1$ and/or $X^2$ in formula (II) can be, for instance, a dimethylaminyl group (—N(CH$_3$)$_2$), a diethylaminyl group (—N(CH$_2$CH$_3$)$_2$), a di-n-propylaminyl group (—N(CH$_2$CH$_2$CH$_3$)$_2$), a di-iso-propylaminyl group (—N(CH(CH$_3$)$_2$)$_2$), a di-n-butylaminyl group (—N(CH$_2$CH$_2$CH$_2$CH$_3$)$_2$), a di-t-butylaminyl group (—N(C(CH$_3$)$_3$)$_2$), a di-n-pentylaminyl group (—N(CH$_2$CH$_2$CH$_2$CH$_2$CH$_3$)$_2$), a di-neo-pentylaminyl group (—N(CH$_2$C(CH$_3$)$_3$)$_2$), a di-phenylaminyl group (—N(C$_6$H$_5$)$_2$), a di-tolylaminyl group (—N(C$_6$H$_4$CH$_3$)$_2$), or a di-xylylaminyl group (—N(C$_6$H$_3$(CH$_3$)$_2$)$_2$); alternatively, a dimethylaminyl group; alternatively, a di-ethylaminyl group; alternatively, a di-n-propylaminyl group; or alternatively, a di-phenylaminyl group.

In accordance with some aspects disclosed herein, one or both of $X^1$ and $X^2$ independently can be a $C_1$ to $C_{36}$ hydrocarbylsilyl group; alternatively, a $C_1$ to $C_{24}$ hydrocarbylsilyl group; alternatively, a $C_1$ to $C_{18}$ hydrocarbylsilyl group; or alternatively, a $C_1$ to $C_8$ hydrocarbylsilyl group. In an aspect, each hydrocarbyl (one or more) of the hydrocarbylsilyl group can be any hydrocarbyl group disclosed herein (e.g., a $C_1$ to $C_5$ alkyl group, a $C_2$ to $C_5$ alkenyl group, a $C_5$ to $C_8$ cycloalkyl group, a $C_6$ to $C_8$ aryl group, a $C_7$ to $C_8$ aralkyl group, etc.). As used herein, hydrocarbylsilyl is intended to cover (mono)hydrocarbyisilyl (—SiH$_2$R), dihydrocarbylsilyl (—SiHR$_2$), and trihydrocarbylsilyl (—SiR$_3$) groups, with R being a hydrocarbyl group. In one aspect, the hydrocarbyisilyl group can be a $C_3$ to $C_{36}$ or a $C_3$ to $C_{18}$ trihydrocarbylsilyl group, such as, for example, a trialkylsilyl group or a triphenylsilyl group. Illustrative and non-limiting examples of hydrocarbylsilyl groups which can be the $X^1$ and/or $X^2$ group(s) in formula (II) can include, but are not limited to, trimethylsilyl, triethylsilyl, tripropylsilyl (e.g., triisopropylsilyl), tributylsilyl, tripentylsilyl, triphenylsilyl, allyldimethylsilyl, and the like.

A hydrocarbylaminylsilyl group is used herein to refer to groups containing at least one hydrocarbon moiety, at least one N atom, and at least one Si atom. Illustrative and non-limiting examples of hydrocarbylaminylsilyl groups which can be $X^1$ and/or $X^2$ can include, but are not limited to —$N(SiMe_3)_2$, —$N(SiEt_3)_2$, and the like. Unless otherwise specified, the hydrocarbylaminylsilyl groups which can be $X^1$ and/or $X^2$ can comprise up to about 36 carbon atoms (e.g., $C_1$ to $C_{36}$, $C_1$ to $C_{18}$, $C_1$ to $C_{12}$, or $C_1$ to $C_8$ hydrocarbylaminylsilyl groups). In an aspect, each hydrocarbyl (one or more) of the hydrocarbylaminylsilyl group can be any hydrocarbyl group disclosed herein (e.g., a $C_1$ to $C_5$ alkyl group, a $C_2$ to $C_5$ alkenyl group, a $C_5$ to $C_8$ cycloalkyl group, a $C_6$ to $C_8$ aryl group, a $C_7$ to $C_8$ aralkyl group, etc.). Moreover, hydrocarbylaminylsilyl is intended to cover —$NH(SiH_2R)$, —$NH(SiHR_2)$, —$NH(SiR_3)$, —$N(SiH_2R)_2$, —$N(SiHR_2)_2$, —$N(SiR_3)_2$, groups, among others, with R being a hydrocarbyl group.

In an aspect, $X^1$ and $X^2$ independently can be —$OBR^A{}_2$ or —$OSO_2R^A$, wherein $R^A$ is a $C_1$ to $C_{36}$ hydrocarbyl group, or alternatively, a $C_1$ to $C_{18}$ hydrocarbyl group. The hydrocarbyl group in $OBR^A{}_2$ and/or $OSO_2R^A$ independently can be any hydrocarbyl group disclosed herein, such as, for instance, a $C_1$ to $C_{18}$ alkyl group, a $C_2$ to $C_{15}$ alkenyl group, a $C_4$ to $C_{15}$ cycloalkyl group, a $C_6$ to $C_{18}$ aryl group, or a $C_7$ to $C_{18}$ aralkyl group; a $C_1$ to $C_{12}$ alkyl group, a $C_2$ to $C_{12}$ alkenyl group, a $C_4$ to $C_{12}$ cycloalkyl group, a $C_6$ to $C_{12}$ aryl group, or a $C_7$ to $C_{12}$ aralkyl group; or a $C_1$ to $C_8$ alkyl group, a $C_2$ to $C_8$ alkenyl group, a $C_5$ to $C_8$ cycloalkyl group, a $C_6$ to $C_8$ aryl group, or a $C_7$ to $C_8$ aralkyl group.

In one aspect, $X^1$ and $X^2$ independently can be H, a halide, or a $C_1$ to $C_{36}$ hydrocarbyl group, hydrocarboxy group, hydrocarbylaminyl group, hydrocarbylsilyl group, or hydrocarbylaminylsilyl group, while in another aspect. $X^1$ and $X^2$ independently can be H, or a $C_1$ to $C_{18}$ hydrocarboxy group, hydrocarbylaminyl group, hydrocarbyisilyl group, or hydrocarbylaminylsilyl group. In yet another aspect, $X^1$ and $X^2$ independently can be a halide; alternatively, a $C_1$ to $C_{18}$ hydrocarbyl group; alternatively, a $C_1$ to $C_{18}$ hydrocarboxy group; alternatively, a $C_1$ to $C_{18}$ hydrocarbylaminyl group; alternatively, a $C_1$ to $C_{18}$ hydrocarbylsilyl group; or alternatively, a $C_1$ to $C_{18}$ hydrocarbylaminylsilyl group. In still another aspect, both $X^1$ and $X^2$ can be H; alternatively, F; alternatively, Cl; alternatively, Br; alternatively, I; alternatively, a $C_1$ to $C_{18}$ hydrocarbyl group; alternatively, a $C_1$ to $C_{18}$ hydrocarboxy group; alternatively, a $C_1$ to $C_{18}$ hydrocarbylaminyl group; alternatively, a $C_1$ to $C_{18}$ hydrocarbylsilyl group; or alternatively, a $C_1$ to $C_{18}$ hydrocarbylaminylsilyl group.

$X^1$ and $X^2$ independently can be, in some aspects, H, a halide, methyl, phenyl, benzyl, an alkoxy, an aryloxy, acetylacetonate, an alkylaminyl, a dialkylaminyl, a trihydrocarbylsilyl, or a hydrocarbylaminylsilyl; alternatively, H, a halide, methyl, phenyl, or benzyl; alternatively, an alkoxy, an aryloxy, or acetylacetonate; alternatively, an alkylaminyl or a dialkylaminyl; alternatively, a trihydrocarbylsilyl or hydrocarbylaminylsilyl; alternatively, H or a halide; alternatively, methyl, phenyl, benzyl, an alkoxy, an aryloxy, acetylacetonate, an alkylaminyl, or a dialkylaminyl; alternatively, H; alternatively, a halide; alternatively, methyl; alternatively, phenyl; alternatively, benzyl; alternatively, an alkoxy; alternatively, an aryloxy; alternatively, acetylacetonate; alternatively, an alkylaminyl; alternatively, a dialkylaminyl; alternatively, a trihydrocarbylsilyl; or alternatively, a hydrocarbylaminylsilyl. In these and other aspects, the alkoxy, aryloxy, alkylaminyl, dialkylaminyl, trihydrocarbylsilyl, and hydrocarbylaminylsilyl can be a $C_1$ to $C_{36}$, a $C_1$ to $C_{18}$, a $C_1$ to $C_{12}$, or a $C_1$ to $C_8$ alkoxy, aryloxy, alkylaminyl, dialkylaminyl, trihydrocarbylsilyl, and hydrocarbylaminylsilyl.

Moreover, $X^1$ and $X^2$ independently can be, in certain aspects, a halide or a $C_1$ to $C_{15}$ hydrocarbyl group; alternatively, a halide or a $C_1$ to $C_8$ hydrocarbyl group; alternatively, F, Cl, Br, I, methyl, benzyl, or phenyl; alternatively, Cl, methyl, benzyl, or phenyl; alternatively, a $C_1$ to $C_{18}$ alkoxy, aryloxy, alkylaminyl, dialkylaminyl, trihydrocarbylsilyl, or hydrocarbylaminylsilyl group; alternatively, a $C_1$ to $C_8$ alkoxy, aryloxy, dialkylaminyl, trihydrocarbylsilyl, or hydrocarbylaminylsilyl group; or alternatively, methyl, ethyl, propyl, butyl, pentyl, hexyl, heptyl, octyl, nonyl, decyl, ethenyl, propenyl, butenyl, pentenyl, hexenyl, heptenyl, octenyl, nonenyl, decenyl, phenyl, tolyl, benzyl, naphthyl, trimethylsilyl, triisopropylsilyl, triphenylsilyl, or allyldimethylsilyl.

In formula (II), $X^A$ can be a substituted or unsubstituted cyclopentadienyl, indenyl, or fluorenyl group. In one aspect, $X^A$ can be an unsubstituted cyclopentadienyl, indenyl, or fluorenyl group; alternatively, an unsubstituted cyclopentadienyl group; alternatively, an unsubstituted indenyl group; or alternatively, an unsubstituted fluorenyl group. In another aspect, $X^A$ can be a substituted cyclopentadienyl, indenyl, or fluorenyl group; alternatively, a substituted cyclopentadienyl group; alternatively, a substituted indenyl group; or alternatively, a substituted fluorenyl group. Any substituent on the substituted cyclopentadienyl, indenyl, or fluorenyl group independently can be H, a halide, a $C_1$ to $C_{36}$ hydrocarbyl group, a $C_1$ to $C_{36}$ halogenated hydrocarbyl group, a $C_1$ to $C_{36}$ hydrocarboxy group, or a $C_1$ to $C_{36}$ hydrocarbylsilyl group. Since possible substituents on these substituted cyclopentadienyl, indenyl, and fluorenyl groups can include hydrogen, ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like, are encompassed herein.

In some aspects, each substituent independently can be H; alternatively, a halide; alternatively, a $C_1$ to $C_{18}$ hydrocarbyl group; alternatively, a $C_1$ to $C_{18}$ halogenated hydrocarbyl group; alternatively, a $C_1$ to $C_{18}$ hydrocarboxy group; or alternatively, a $C_1$ to $C_{18}$ hydrocarbylsilyl group. Importantly, each $X^A$ can be either the same or a different substituent group. Moreover, each $X^A$ can be at any position(s) of the respective cyclopentadienyl, indenyl, or fluorenyl ring structure that conforms with the rules of chemical valence.

The halide, $C_1$ to $C_{36}$ hydrocarbyl group, $C_1$ to $C_{s6}$ hydrocarboxy group, and $C_1$ to $C_{36}$ hydrocarbylsilyl group which can be a substituent on the substituted cyclopentadienyl, indenyl, or fluorenyl group can be any halide, $C_1$ to $C_{36}$ hydrocarbyl group, $C_1$ to $C_{36}$ hydrocarboxy group, and $C_1$ to $C_{36}$ hydrocarbylsilyl group described herein (e.g., as pertaining to $X^1$ and $X^2$ in formula (II)). Each substituent on the substituted cyclopentadienyl, indenyl, or fluorenyl group in formula (II) can be, in certain aspects, a $C_1$ to $C_{36}$, halogenated hydrocarbyl group, where the halogenated hydrocarbyl group indicates the presence of one or more halogen atoms replacing an equivalent number of hydrogen atoms in the hydrocarbyl group. The halogenated hydrocarbyl group often can be a halogenated alkyl group, a halogenated alkenyl group, a halogenated cycloalkyl group, a halogenated aryl group, or a halogenated aralkyl group. Representative and non-limiting halogenated hydrocarbyl groups include pentafluorophenyl, trifluoromethyl ($CF_3$), and the like.

As a non-limiting example, each substituent on the substituted cyclopentadienyl, indenyl, or fluorenyl group in formula (II) independently can be H, $C_1$, $CF_3$, a methyl group, an ethyl group, a propyl group, a butyl group (e.g., t-Bu), a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a tolyl group, a benzyl group, a naphthyl group; trimethylsilyl group, a triisopropylsilyl group, a triphenylsilyl group, or an allyldimethylsilyl group; alternatively, H; alternatively, Cl; alternatively, $CF_3$; alternatively, a methyl group; alternatively, an ethyl group; alternatively, a propyl group; alternatively, a butyl group; alternatively, a pentyl group; alternatively, a hexyl group; alternatively, a heptyl group; alternatively, an octyl group; alternatively, a nonyl group; alternatively, a decyl group; alternatively, an ethenyl group; alternatively, a propenyl group; alternatively, a butenyl group; alternatively, a pentenyl group; alternatively, a hexenyl group; alternatively, a heptenyl group; alternatively, an octenyl group; alternatively, a nonenyl group; alternatively, a decenyl group; alternatively, a phenyl group; alternatively, a tolyl group; alternatively, a benzyl group; alternatively, a naphthyl group; alternatively, a trimethylsilyl group; alternatively, a triisopropylsilyl group; alternatively, a triphenylsilyl group; or alternatively, an allyldimethylsilyl group.

If $X^A$ is a substituted cyclopentadienyl, indenyl, or fluorenyl group, it may have one substituent, 2 substituents, 3 substituents, 4 substituents, 5 substituents, etc., each of which independently can be any halide, any $C_1$ to $C_{36}$ hydrocarbyl group, any $C_1$ to $C_{36}$ halogenated hydrocarbyl group, any $C_1$ to $C_{36}$ hydrocarboxy group, or any $C_1$ to $C_{36}$ hydrocarbylsilyl group disclosed herein. Moreover, hydrogen also can be a substituent, resulting in partially or fully saturated ligands. For example, $X^A$ can be a mono-substituted cyclopentadienyl, indenyl, or fluorenyl group, or a di-substituted cyclopentadienyl, indenyl, fluorenyl group, and each substituent independently can be H, Cl, $CF_3$, a methyl group, an ethyl group, a propyl group, a butyl group (e.g., t-Bu), a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a tolyl group, a benzyl group, a naphthyl group, a trimethylsilyl group, a triisopropylsilyl group, a triphenylsilyl group, or an allyldimethylsilyl group. In another non-limiting example, $X^A$ can be a cyclopentadienyl, indenyl, or fluorenyl group, with 5 substituents, such as a pentamethylcyclopentadienyl group.

Each L in formula (II) independently can be neutral ligand, and the integer n in formula (II) can be 0, 1 or 2 (e.g., n can be 0 or 1). In an aspect, suitable neutral ligands can include sigma-donor solvents that contain a coordinating atom (or atoms) that can coordinate to the transition metal atom in formula (II). Examples of suitable coordinating atoms in the neutral ligands can include, but are not limited to, O, N, S, and P, or combinations of these atoms. Unless otherwise specified, the neutral ligand can be unsubstituted or can be substituted. Substituent groups are independently described herein and can be utilized, without limitation to further describe a neutral ligand which can be utilized as L in formula (II). In some aspects, the neutral ligand can be a Lewis base. When the integer n is equal to 2, it is contemplated that the two neutral ligands can be either the same or different.

In an aspect, each neutral ligand, L, independently can be an ether, a thioether, no amine, a nitrile, or a phosphine. In another aspect, each neutral ligand independently can be an acyclic ether, a cyclic ether, an acyclic thioether, a cyclic thioether, a nitrile, an acyclic amine, acyclic amine, an acyclic phosphine, or a cyclic phosphine. In other aspects, each neutral ligand independently can be an acyclic ether or a cyclic ether; alternatively, an acyclic thioether or a cyclic thioether; alternatively, an acyclic amine or a cyclic amine; alternatively, an acyclic phosphine or a cyclic phosphine; alternatively, an acyclic ether; alternatively, a cyclic ether; alternatively, an acyclic thioether; alternatively, a cyclic thioether; alternatively, a nitrile; alternatively, an acyclic amine; alternatively, a cyclic amine; alternatively, an acyclic phosphine; or alternatively, a cyclic phosphine. Further, each neutral ligand independently can include any substituted analogs of any acyclic ether, cyclic ether, acyclic thioether, cyclic thioether, nitrite, acyclic amine, cyclic amine, acyclic phosphine, or cyclic phosphine, as disclosed herein.

In an aspect, each neutral ligand independently can be a nitrile having the formula $R^1C\equiv N$, an ether having the formula $R^2-O-R^3$, a thioether having the formula $R^4-S-R^5$, an amine having the formula $NR^6R^7R^8$, $NHR^6R^7$, or $NH_2R^6$, or a phosphine having the formula $PR^9R^{10}R^{11}$, $PHR^9R^{10}$, or $PH_2R^9$; alternatively, a nitrile having the formula $R^1C\equiv N$, an ether having the formula $R^2-O-R^3$, a thioether having the formula $R^4-S-R^5$, an amine having the formula $NR^6R^7R^8$, or a phosphine having the formula $PR^9R^{10}R^{11}$; or alternatively, a nitrile having the formula an ether having the formula $R^2-O-R^3$, a thioether having the formula $R^4-S-R^5$, an amine having the formula $NR^6R^7R^8$, or a phosphine having the formula $PR^9R^{10}R^{11}$. In an aspect, each neutral ligand independently can be a nitrile having the formula $R^1C\equiv N$; alternatively, an ether having the formula $R^2-O-R^3$; alternatively, a thioether having the formula $R^4-S-R^5$; alternatively, an amine having the formula $NR^6R^7R^8$, $NHR^6R^7$, or $NH_2R^6$; alternatively, a phosphine having the formula $PR^9R^{10}R^{11}$, $PHR^9R^{10}$, or $PH_2R^9$; or alternatively, a phosphine having the formula $PR^9R^{10}R^{11}$.

In an aspect, $R^1$ of the nitrile having the formula $R^1C\equiv N$, $R^2$ and $R^3$ of the ether having formula $R^2-O-R^3$, $R^4$ and $R^5$ of the thioether having the formula $R^4-S-R^5$, $R^6$, $R^7$, and $R^8$ of the amine having the formula $NR^6R^7R^8$, $NHR^6R^7$, or $NH_2R^6$, and $R^9$, $R^{10}$, and $R^{11}$ of the phosphine having the formula $PR^9R^{10}R^{11}$, $PHR^9R^{10}$, or $PH_2R^9$, independently can be a $C_1$ to $C_{18}$ hydrocarbyl group; alternatively, a $C_1$ to $C_{15}$ hydrocarbyl group; alternatively, a $C_1$ to $C_{12}$ hydrocarbyl group; alternatively, a $C_1$ to $C_8$ hydrocarbyl group; or alternatively, a $C_1$ to $C_6$ hydrocarbyl group. It should also be noted that $R^2$ and $R^3$ of the ether having formula $R^2-O-R^3$, $R^4$ and $R^5$ of the thioether having the formula $R^4-S-R^5$, any two of $R^6$, $R^7$, and $R^8$ of the amine having the formula $NR^6R^7R^8$ or $NHR^6R^7$, and/or any two of $R^9$, $R^{10}$, and $R^{11}$ of the phosphine having the formula $PR^9R^{10}R^{11}$ or $PHR^9R^{10}$ can be joined to form a ring containing the ether oxygen atom, the thioether sulfur atom, the amine nitrogen atom, or the phosphine phosphorus atom to form a cyclic ether, thioether, amine, or phosphine, respectively, as described herein in regards to cyclic ethers, thioethers, amines, and phosphines.

In an aspect, $R^1$ of the nitrile having the formula $R^1C\equiv N$, $R^2$ and $R^3$ of the ether having formula $R^2-O-R^3$, $R^4$ and $R^5$ of the thioether having the formula $R^4-S-R^5$, $R^6$, $R^7$, and $R^8$ of the amine having the formula $NR^6R^7R^8$, $NHR^6R^7$, or $NH_2R^6$, and $R^9$, $R^{10}$, and $R^{11}$ of the phosphine having the formula $PR^9R^{10}R^{11}$, $PHR^9R^{10}$, or $PH_2R^9$, independently be any hydrocarbyl group disclosed herein. The hydrocarbyl group can be, for instance, any alkyl group, cycloalkyl group, aryl group, or aralkyl group disclosed herein.

In another aspect, each neutral ligand, L, in formula (II) independently can be a $C_2$-$C_{30}$ ether, a $C_2$-$C_{30}$ thioether, a $C_2$-$C_{20}$ nitrile, a $C_1$-$C_{30}$ amine, or a $C_1$-$C_{30}$ phosphine; alternatively, a $C_2$-$C_{18}$ ether; alternatively, a $C_2$-$C_{18}$ thioether; alternatively, a $C_2$-$C_{12}$ nitrile; alternatively, a $C_1$-$C_{18}$ amine; or alternatively, a $C_1$-$C_{18}$ phosphine. In some aspects, each neutral ligand independently can be a $C_2$-$C_{12}$ ether, a $C_2$-$C_{12}$ thioether, a $C_2$-$C_8$ nitrile, a $C_1$-$C_{12}$ amine, or a $C_1$-$C_{12}$ phosphine; alternatively, a $C_2$-$C_{10}$ ether; alternatively, a $C_2$-$C_{10}$ thioether; alternatively, a $C_2$-$C_6$ nitrile; alternatively, a $C_1$-$C_8$ amine; or alternatively, a $C_1$-$C_8$ phosphine.

Suitable ethers which can be utilized as a neutral ligand, either alone or in combination, can include, but are not limited to, dimethyl ether, diethyl ether, dipropyl ether, dibutyl ether, methyl ethyl ether, methyl propyl ether, methyl butyl ether, diphenyl ether, ditolyl ether, tetrahydrofuran, 2-methyltetrahydrofuran, 2,5-dimethyltetrahydrofuran, 2,3-dihydrofuran, 2,5-dihydrofuran, furan, benzofuran, isobenzofuran, dibenzofuran, tetrahydropyran, 3,4-dihydro-2H-pyran, 3,6-dihydro-2H-pyran, 2H-pyran, 4H-pyran, 1,3-dioxane, 1,4-dioxane, morpholine, and the like, including substituted derivatives thereof.

Suitable thioethers which can be utilized as a neutral ligand, either alone or in combination, can include, but are not limited to, dimethyl thioether, diethyl thioether, dipropyl thioether, dibutyl thioether, methyl ethyl thioether, methyl propyl thioether, methyl butyl thioether, diphenyl thioether, ditolyl thioether, thiophene, benzothiophene, tetrahydrothiophene, thiane, and the like, including substituted derivatives thereof.

Suitable nitriles which can be utilized as a neutral ligand, either alone or in combination, can include, but are not limited to, acetonitrile, propionitrile, butyronitrile, benzonitrile, 4-methylbenzonitrile, and the like, including substituted derivatives thereof.

Suitable amines which can be utilized as a neutral ligand, either alone or in combination, can include, but are not limited to, methyl amine, ethyl amine, propyl amine, butyl amine, dimethyl amine, diethyl amine, dipropyl amine, dibutyl amine, tri ethyl amine, triethyl amine, tripropyl amine, tributyl amine, aniline, diphenylamine, triphenylamine, tolylamine, xylylamine, ditolylamine, pyridine, quinoline, pyrrole, indole, 2-methylpyridine, 3-methylpyridine, 4-methylpyridine, 2,5-diethylpyrrole, 2,5-dipropylpyrrole, 2,5-dibutylpyrrole, 2,4-dimethylpyrrole, 2,4-diethylpyrrole, 2,4-dipropylpyrrole, 2,4-dibutylpyrrole, 3,4-dimethylpyrrole, 3,4-diethylpyrrole, 3,4-dipropylpyrrole, 3,4-dibutylpyrrole, 2-methylpyrrole, 2-ethylpyrrole, 2-propylpyrrole, 2-butylpyrrole, 3-methylpyrrole, 3-ethylpyrrole, 3-propylpyrrole, 3-butylpyrrole, 3-ethyl-2,4-dimethylpyrrole, 2,3,4,5-tetramethylpyrrole, 2,3,4,5-tetraethylpyrrole, and the like, including substituted derivatives thereof. Suitable amines can be primary amines, secondary amines, or tertiary amines.

Suitable phosphines which can be utilized as a neutral ligand, either alone or in combination, can include, but are not limited to, trimethylphosphine, triethylphosphine, tripropylphosphine, tributylphosphine, phenylphosphine, tolylphosphine, diphenylphosphine, dirolylphosphine, triphenylphosphine, tritolylphosphine, methyldiphenylphosphine, dimethylphenylphosphine, ethyldiphenylphosphine, diethylphenylphosphine, and the like, including substituted derivatives thereof.

In an aspect of the invention, each neutral ligand independently can be azetidine, oxetane, thietane, dioxetane, dithietane, tetrahydropyrrole, dihydropyrrole, pyrrole, indole, isoindole, tetrahydrofuran, 2-methyltetrahydrofuran, 2,5-dimethyltetrahydrofuran, dihydrofuran, furan, benzofuran, isobenzofuran, tetrahydrothiophene, dihydrothiophene, thiophene, benzothiophene, isobenzothiophene, imidazolidine, pyrazole, imidazole, oxazolidine, oxazole, isoxazole, thiazolidine, thiazole, isothiazole, benzothiazole, dioxolane, dithiolane, triazole, dithiazole, piperidine, pyridine, dimethyl amine, diethyl amine, tetrahydropyran, dihydropyran, pyran, thiane, piperazine, diazine, oxazine, thiazine, dithiane, dioxane, dioxin, triazine, triazinane, trioxane, oxepin, azepine, thiepin, diazepine, morpholine, quinoline, tetrahydroquirione, bicyclo[3.3.1]tetrasiloxane, or acetonitrile; alternatively, azetidine, oxetane, thietane, dioxetane, dithietane, tetrahydropyrrole, tetrahydrofuran, 2-methyltetrahydrofuran, 2,5-dimethyltetrahydrofuran, tetrahydrothiophene, imidazolidine, oxazolidine, oxazole, thiazolidine, thiazole, dioxolane, dithiolane, piperidine, tetrahydropyran, pyran, thiane, piperazine, oxazine, thiazine, dithiane, dioxane, triazinane, trioxane, azepine, thiepin, diazepine, morpholine, 1,2-thiazole, or bicyclo[3.3.1]tetrasiloxane; alternatively, tetrahydropyrrole, tetrahydrofuran, 2-methyltetrahydrofuran, 2,5-dim ethyl tetrahydrofuran, tetrahydrothiophene, oxazolidine, thiazolidine, dioxolane, dithiolane, dithiazole, piperidine, tetrahydropyran, pyran, thiane, piperazine, dithiane, dioxane, dioxin, trioxane, or morpholine; alternatively, tetrahydrofuran, 2-methyltetrahydrofuran, 2,5-dimethyltetrahydrofuran, tetrahydrothiophene, dioxolane, dithiolane, tetrahydropyran, pyran, thiane, dithiane, dioxane, dioxin, or trioxane; alternatively, tetrahydrofuran, dioxolane, tetrahydropyran, dioxane, or trioxane; alternatively, pyrrole, furan, pyrazole, imidazole, oxazole, isoxazole, thiazole, isothiazole, triazole, pyridine, dimethyl amine, diethyl amine, diazine, triazine, or quinoline; alternatively, pyrrole, furan, imidazole, oxazole, thiazole, triazole, pyridine, dimethyl amine, diethyl amine, diazine, or triazine; or alternatively, furan, oxazole, thiazole, triazole, pyridine, diazine, or triazine. In some aspects, each neutral ligand independently can be azetidine; alternatively, oxetane; alternatively, thietane; alternatively, dioxetane; alternatively, dithietane; alternatively, tetrahydropyrrole; alternatively, dihydropyrrole, alternatively, pyrrole; alternatively, indole; alternatively, isoindole; alternatively, tetrahydrofuran; alternatively, 2-methyltetrahydrofuran; alternatively, 2,5-dimethyltetrahydrofuran; alternatively, dihydropyrrole; alternatively, furan; alternatively, benzofuran; alternatively, isobenzofuran; alternatively, tetrahydrothiophene; alternatively, dihydrothiophene; alternatively, thiophene; alternatively, benzothiophene; alternatively, isobenzothiophene; alternatively, imidazolidine; alternatively, pyrazole; alternatively, imidazole; alternatively, oxazolidine; alternatively, oxazole; alternatively, isoxazole; alternatively; thiazolidine; alternatively, thiazole; alternatively, benzothiazole; alternatively, isothiazole; alternatively, dioxolane; alternatively, dithiolane; alternatively, triazole; alternatively, dithiazole; alternatively, piperidine; alternatively, pyridine; alternatively, dimethyl amine; alternatively, diethyl amine; alternatively, tetrahydropyran; alternatively, dihydropyran; alternatively, pyran; alternatively, thiane; alternatively, piperazine; alternatively, diazine; alternatively, oxazine; alternatively, thiazine; alternatively, dithiane; alternatively, dioxane; alternatively, dioxin; alternatively, triazine; alternatively, triazinane; alternatively, trioxane; alternatively, oxepin; alternatively, azepine; alternatively, thiepin; alternatively, diazepine; alternatively, morpholine; alternatively, quinoline; alternatively, tetrahydroquinone; alternatively, bicyclo[3.3.1]tetrasiloxane; or alternatively, acetonitrile.

In another aspect, each neutral ligand independently can be azetidine, tetrahydropyrrole, dihydropyrrole, pyrrole, indole, isoindole, imidazolidine, pyrazole, imidazole, oxazolidine, oxazole, isoxazole, thiazolidine, thiazole, isothiazole, triazole, benzotriazole, dithiazole, piperidine, pyridine, dimethyl amine, diethyl amine, piperazine, diazine, oxazine, thiazine, triazine, azepine, diazepine, morpholine, quinoline, or tetrahydroisoquinoline. In another aspect, each neutral ligand independently can be thietane, dithietane, tetrahydrothiophene, dihydrothiophene, thiophene, benzothiophene, isobenzothiophene, thiazolidine, thiazole, isothiazole, dithiolane, dithiazole, thiane, thiazine, dithiane, or thiepin. In another aspect, each neutral ligand independently can be tetrahydrofuran, furan, methyltetrahydrofuran, dihydrofuran, tetrahydropyran, 2,3-dihydropyran, 1,3-dioxane, 1,4-dioxane, morpholine, N-methylmorpholine, acetonitrile, propionitrile, butyronitrile, benzonitrile, pyridine, ammonia, methyl amine, ethyl amine, dimethyl amine, diethyl amine, trimethyl amine, triethyl amine, trimethylphosphine, triethylphosphine, triphenylphosphine, tri-n-butylphosphine, methyl isocyanide, n-butyl isocyanide, phenyl isocyanide, $SMe_2$, thiophene, or tetrahydrothiophene. In another aspect, each neutral ligand independently can be tetrahydrofuran, methyltetrahydrofuran, tetrahydropyran, 1,4-dioxane, acetonitrile, pyridine, dimethyl amine, diethyl amine, ammonia, trimethyl amine, triethyl amine, trimethylphosphine, triethylphosphine, triphenylphosphine, $SMe_2$, or tetrahydrothiophene; alternatively, tetrahydrofuran, methyltetrahydrofuran, tetrahydropyran, or 1,4-dioxane; alternatively, ammonia, trimethylamine, or triethylamine; or alternatively, trimethylphosphine, triethylphosphine, or triphenylphosphine. Yet, in another aspect, each neutral ligand independently can be tetrahydrofuran, acetonitrile, pyridine, ammonia, dimethyl amine, diethyl amine, trimethyl amine, trimethylphosphine, or triphenylphosphine; alternatively, tetrahydrofuran, acetonitrile, pyridine, dimethyl amine, diethyl amine, trimethyl amine, trimethylphosphine, or triphenylphosphine; alternatively, tetrahydrofuran, acetonitrile, dimethyl amine, diethyl amine, or pyridine; alternatively, tetrahydrofuran; alternatively, acetonitrile; alternatively, dimethyl amine; alternatively, diethyl amine; or alternatively, pyridine.

Methods of the present invention can be practiced with a variety of catalyst compositions. In one aspect, the catalyst composition can comprise a transition metal compound or complex (e.g., any transition metal complex or compound disclosed herein, such as a metallocene compound, a compound having formula (II), etc.) and an activator, while in another aspect, the catalyst composition can comprise a transition metal complex, an activator, and a co-catalyst. These catalyst compositions can be utilized to produce polyolefins—homopolymers, copolymers, and the like—for a variety of end-use applications.

Transition metal complexes or compounds, including those with formula (II), were discussed above. In aspects of the present invention, it is contemplated that the catalyst composition can contain more than one transition metal compound, such as, for instance, a dual catalyst system. Additionally, more than one activator (e.g., aluminoxane, chemically-treated solid oxide, etc.) also may be utilized.

Generally, catalyst compositions of the present invention can comprise a transition metal complex and an activator, and in some aspects, the activator can comprise an activator-support. Activator-supports useful in the present invention were disclosed above. Such catalyst compositions can further comprise one or more than one co-catalyst or co-catalysts (suitable co-catalysts, such as organoaluminum compounds, also were discussed above). Thus, a catalyst composition of this invention can comprise a transition metal complex (e.g., a metallocene compound, a compound having formula (II), etc.), an activator-support, and an organoaluminum compound. For instance, the activator-support can comprise (or consist essentially of, or consist of) fluorided alumina, chlorided alumina, bromided alumina, sulfated alumina, fluorided silica-alumina, chlorided silica-alumina, bromided silica-alumina, sulfated silica-alumina, fluorided chlorided silica-zirconia, bromided silica-zirconia, sulfated silica-zirconia, fluorided silica-titania, fluorided silica-coated alumina, sulfated silica-coated alumina, phosphated silica-coated alumina, and the like, or combinations thereof. Additionally, the organoaluminum compound can comprise (or consist essentially of, or consist of) trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, and the like, or combinations thereof. Accordingly, a catalyst composition consistent with aspects of the invention can comprise (or consist essentially of, or consist of) a transition metal compound, sulfated alumina (or fluorided silica-alumina), and triethylaluminum (or triisobutylaluminum).

In another aspect of the present invention, a catalyst composition is provided which comprises a transition metal complex, an activator-support, and an organoaluminum compound, wherein this catalyst composition is substantially free of aluminoxanes, organoboron or organoborate compounds, ionizing ionic compounds, and/or other similar materials; alternatively, substantially free of aluminoxanes; alternatively, substantially free or organoboron or organoborate compounds; or alternatively, substantially free of ionizing ionic compounds. In these aspects, the catalyst composition has catalyst activity in the absence of these additional materials. For example, a catalyst composition of the present invention can consist essentially of a transition metal complex, an activator-support, and an organoaluminum compound, wherein no other materials are present in the catalyst composition which would increase/decrease the activity of the catalyst composition by more than about 10% from the catalyst activity of the catalyst composition in the absence of said materials.

However, in other aspects of this invention, these activators/co-catalysts can be employed. For example, a catalyst composition comprising a transition metal complex and an activator-support can further comprise an optional co-catalyst. Suitable co-catalysts in this aspect include, but are not limited to, an aluminoxane compound, an organoboron or organoborate compound, an ionizing ionic compound, an organoaluminum compound, an organomagnesium compound, an organolithium compound, and the like, or any combination thereof. More than one co-catalyst can be present in the catalyst composition.

In a different aspect, a catalyst composition is provided which does not require an activator-support. Such a catalyst composition can comprise a transition metal complex and an activator, wherein the activator comprises aluminoxane compound, an organoboron or organoborate compound, an ionizing ionic compound, or combinations thereof. Optionally, such catalyst compositions can further comprise a co-catalyst (e.g., an organoaluminum compound).

This invention farther encompasses any methods of making these catalyst compositions, such as, for example, contacting the respective catalyst components in any order or sequence.

The transition metal complex (e.g., a metallocene compound, a compound having formula (II), etc.) can be precontacted with an olefinic monomer if desired, not necessarily the olefin monomer to be polymerized, and an organoaluminum compound for a first period of time prior to contacting this precontacted mixture with an activator-support. The first period of time for contact, the precontact time, between the transition metal complex, the olefinic monomer, and the organoaluminum compound typically ranges from a time period of about 1 minute to about 24 hours, for example, from about 3 minutes to about 1 hour. Precontact times from about 10 minutes to about 30 minutes are also employed. Alternatively, the precontacting process is carried out in multiple steps, rather than a single step, in which multiple mixtures are prepared, each comprising a different set of catalyst components. For example, at least two catalyst components are contacted forming a first mixture, followed by contacting the first mixture with at least one other catalyst component forming a second mixture, and so forth.

Multiple precontacting steps can be carried out in a single vessel or in multiple vessels. Further, multiple precontacting steps can be carried out in series (sequentially), in parallel, or a combination thereof. For example, a first mixture of two catalyst components can be formed in a first vessel, a second mixture comprising the first mixture plus one additional catalyst component can be formed in the first vessel or in a second vessel, which is typically placed downstream of the first vessel.

In another aspect, one or more of the catalyst components can be split and used in different precontacting treatments. For example, part of a catalyst component is fed into a first precontacting vessel for precontacting with at least one other catalyst component, while the remainder of that same catalyst component is fed into a second precontacting vessel for precontacting with at least one other catalyst component, or is fed directly into the reactor, or a combination thereof. The precontacting can be carried out in any suitable equipment, such as tanks, stirred mix tanks, various static mixing devices, a flask, a vessel of any type, or combinations of these apparatus.

In another aspect of this invention, the various catalyst components (for example, a transition metal complex, activator-support, organoaluminum co-catalyst, and optionally an unsaturated hydrocarbon) can be contacted in the polymerization reactor simultaneously while the polymerization reaction is proceeding. Alternatively, any two or more of these catalyst components can be precontacted in a vessel prior to entering the reaction zone. This precontacting step can be continuous, in which the precontacted product is fed continuously to the reactor, or it can be a stepwise or batchwise process in which a batch of precontacted product is added to make a catalyst composition. This precontacting step can be carried out over a time period that can range from a few seconds to as much as several days, or longer. In this aspect, the continuous precontacting step generally lasts from about 1 second to about 1 hour. In another aspect, the continuous precontacting step lasts from about 10 seconds to about 45 minutes, or from about 1 minute to about 30 minutes.

Once the precontacted mixture of the transition metal compound, the olefin monomer, and the organoaluminum co-catalyst is contacted with the activator-support, this composition (with the addition of the activator-support) is termed the "postcontacted mixture." The postcontacted mixture optionally can remain in contact for a second period of time, the postcontact time, prior to initiating the polymerization process. Postcontact times between the precontacted mixture and the activator-support generally range from about 1 minute to about 24 hours. In a further aspect, the postcontact time is in a range from about 3 minutes to about 1 hour. The precontacting step, the postcontacting step, or both, can increase the productivity of the polymer as compared to the same catalyst composition that is prepared without precontacting or postcontacting. However, neither a precontacting step nor a postcontacting step is required.

The postcontacted mixture can be heated at a temperature and for a time period sufficient to allow adsorption, impregnation, or interaction of precontacted mixture and the activator-support, such that a portion of the components of the precontacted mixture is immobilized, adsorbed, or deposited thereon. Where heating is employed, the postcontacted mixture generally can be heated to a temperature of from between about −15° C. to about 70° C., or from about 0° C. to about 40° C.

When a precontacting step is used, the molar ratio of the total moles of olefin monomer to total moles of transition metal compound(s) in the precontacted mixture typically can be in a range from about 1:10 to about 100,000:1. Total moles of each component are used in this ratio to account for aspects of this invention where more than one olefin monomer and/or more than one transition metal complex is employed in a precontacting step. Further, this molar ratio can be in a range from about 10:1 to about 1,000:1 in another aspect of the invention.

Generally, the weight ratio of organoaluminum compound to activator-support can be in a range from about 10:1 to about 1:1000. If more than one organoaluminum compound and/or more than one activator-support is employed, this ratio is based on the total weight of each respective component. In another aspect, the weight ratio of the organoaluminum compound to the activator-support can be in a range from about 3:1 to about 1:100, or from about 1:1 to about 1:50.

In some aspects of this invention, the weight ratio of transition metal compound(s) to activator-support can be in a range from about 1:1 to about 1:1,000,000. If more than one activator-support is employed, this ratio is based on the total weight of the activator-support. In another aspect, this weight ratio can be in a range from about 1:5 to about 1:100,000, or from about 1:10 to about 1:10,000. Yet, in another aspect, the weight ratio of the transition metal compound(s) to the activator-support can be in a range from about 1:20 to about 1:1000.

Interestingly, in some aspects of the present invention, the catalyst activity of the catalyst composition using the synergistic amount of hydrogen and the organozinc compound to produce an olefin polymer with a predetermined Mw (or MI) can be greater than a catalyst activity of the catalyst composition obtained under the same polymerization conditions using hydrogen only (i.e., without the organozinc compound) to produce an olefin polymer with the same predetermined Mw (or MI). Catalyst activity increases can be in a range of from about 5% to about 50%, or from about 10% to about 40%, for example. While not wishing to be bound by theory, Applicants believe that this improvement in catalyst activity may be particularly noticeable for olefin polymers having a predetermined MI that falls within a range from about 1 to about 6 g/10 min. For instance, for an olefin polymer having a MI of about 4 g/1.0 min, the catalyst activity of the catalyst composition using the synergistic amount of hydrogen and the organozinc compound to produce the olefin polymer with a MI of 4 can be at least about 10% greater, at least about 20% greater, at least about 25% greater, or at least about 30% greater, than the catalyst activity of the catalyst composition obtained under the same polymerization conditions using hydrogen only (without the organozinc compound) to produce the olefin polymer with a MI of 4. While not limited to specific polymerization conditions (temperature, pressure, polymerization process, etc.), particular conditions that may be useful in some aspects of the invention to measure or determine catalyst activity can include: slurry polymerization conditions, using isobutane as the diluent, at a polymerization temperature of about 80° C. (or about 90° C., or about 100° C.) and a reactor pressure of about 490 psig (3.4 MPa), or about 550 psig (3.8 MPa), or about 580 psig (4 MPa).

As discussed above, any combination of the transition metal compound, the activator-support, the organoaluminum compound, and the olefin monomer, can be precontacted ho some aspects of this invention. When any precontacting occurs with an olefinic monomer, it is not necessary that the olefin monomer used in the precontacting step be the same as the olefin to be polymerized. Further, when a precontacting step among any combination of the catalyst components is employed for a first period of time, this precontacted mixture can be used in a subsequent postcontacting step between any other combination of catalyst components for a second period of time. For example, the transition metal compound, the organoaluminum compound, and 1-hexene can be used in a precontacting step for a first period of time, and this precontacted mixture then can be contacted with the activator-support to form a postcontacted mixture that is contacted for a second period of time prior to initiating the polymerization reaction. For example, the first period of time for contact, the precontact time, between any combination of the transition metal compound, the olefinic monomer, the activator-support, and the organoaluminum compound can be from about 1 minute to about 24 hours, from about 3 minutes to about 1 hour, or from about 10 minutes to about 30 minutes. The postcontacted mixture optionally is allowed to remain in contact for a second period of time, the postcontact time, prior to initiating the polymerization process. According to one aspect of this invention, postcontact times between the precontacted mixture and any remaining catalyst components is from about 1 minute to about 24 hours, or from about 5 minutes to about 1 hour.

Olefin Monomers

Olefin monomers contemplated herein typically include olefin compounds having from 2 to 30 carbon atoms per molecule and having at least one olefinic double bond. Homopolymerization processes using a single olefin, such as ethylene, propylene, butene, hexene, octene, and the like, are encompassed, as well as copolymerization, terpolymerization, etc., reactions using an olefin monomer with at least one different olefinic compound.

As an example, any resultant ethylene copolymers, terpolymers, etc., generally can contain a major amount of ethylene (>50 mole percent) and a minor amount of comonomer (<50 mole percent). Comonomers that can be copolymerized with ethylene often have from 3 to 20 carbon atoms in their molecular chain.

Acyclic, cyclic, polycyclic, terminal ($\alpha$), internal, linear, branched, substituted, unsubstituted, functionalized, and non-functionalized olefins can be employed. For example, typical unsaturated compounds that can be polymerized to produce olefin polymers can include, but are not limited to, ethylene, propylene, 1-butene, 2-butene, 3-methyl-1-butene, isobutylene, 1-pentene, 2-pentene, 3-methyl-1-pentene, 4-methyl-1-pentane, 1-hexene, 2-hexene, 3-hexene, 3-ethyl-1-hexene, 1-heptene, 2-heptene, 3-heptene, the four normal octenes (e.g., 1-octene), the four normal nonenes, the five normal decenes, and the like, or mixtures of two or more of these compounds. Cyclic and bicyclic olefins, including but not limited to, cyclopentene, cyclohexene, norbornylene, norbornadiene, and the like, also can be polymerized as described herein. Styrene also can be employed as a monomer or as a comonomer. In some aspects, the olefin monomer can comprise a $C_2$-$C_{20}$ olefin; alternatively, a $C_2$-$C_{12}$ olefin; alternatively, a $C_2$-$C_{20}$ olefin; alternatively, ethylene, propylene, 1-butene, 1-hexene, or -octene; alternatively, ethylene or propylene; alternatively, ethylene; or alternatively, propylene.

When a copolymer (or alternatively, a terpolymer) is desired, the olefin monomer can be, for example, ethylene or propylene, which is copolymerized with at least one comonomer. According to one aspect, the olefin monomer in the polymerization process can comprise ethylene. In this aspect, examples of suitable olefin comonomers can include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, and the like, or combinations thereof. According to one aspect, the comonomer can comprise a $C_3$-$C_{16}$ $\alpha$-olefin, while in another aspect, the comonomer can comprise 1-butene, 1-pentene, 1-hexene, 1-octene, -decene, styrene, or any combination thereof. For example, ethylene can be the olefin monomer, and the olefin comonomer can comprise 1-butene, 1-hexene, 1-octene, or a combination thereof.

Generally, the amount of comonomer introduced into a polymerization reactor to produce the copolymer can be from about 0.01 to about 50 weight percent of the comonomer based on the total weight of the monomer and comonomer. According to another aspect, the amount of comonomer introduced into a polymerization reactor can be from about 0.01 to about 10 weight percent comonomer based on the total weight of the monomer and comonomer. In still another aspect, the amount of comonomer introduced into a polymerization reactor can be from about 0.1 to about 35 weight percent comonomer based on the total weight of the monomer and comonomer. Yet, in another aspect, the amount of comonomer introduced into a polymerization reactor can be from about 0.5 to about 20 weight percent comonomer based on the total weight of the monomer and comonomer.

While not intending to be bound by this theory, where branched, substituted, or functionalized olefins are used as reactants, it is believed that a steric hindrance can impede and/or slow the polymerization reaction. Thus, branched and/or cyclic portion(s) of the olefin removed somewhat from the carbon-carbon double bond would not be expected to hinder the reaction in the way that the same olefin substituents situated more proximate to the carbon-carbon double bond might.

According to one aspect, at least one monomer/reactant can be ethylene, so the polymerization reaction can be a homopolymerization involving only ethylene, or a copolymerization with a different acyclic, cyclic, terminal, internal, linear, branched, substituted, or unsubstituted olefin. In addition, the methods disclosed herein intend for olefin to also encompass diolefin compounds that include, but are not limited to, 1,3-butadiene, isoprene, 1,4-pentadiene, 1,5-hexadiene, and the like.

Olefin polymers encompassed herein can include any polymer produced from any olefin monomer (and optional comonomer(s)) described herein. For example, the olefin polymer can comprise an ethylene homopolymer, a propylene homopolymer, an ethylene copolymer (e.g., ethylene/1-butene, ethylene/1-hexene, ethylene/1-octene, etc.), a propylene copolymer, an ethylene terpolymer, a propylene terpolymer, and the like, including combinations thereof, Polymerization Reactor Systems The disclosed methods are intended for any olefin polymerization process using various types of polymerization reactors, polymerization reactor systems, and polymerization reaction conditions. As used herein, "polymerization reactor"

includes any polymerization reactor capable of polymerizing, (inclusive of oligomerizing) olefin monomers and comonomers (one or more than one comonomer) to produce homopolymers, copolymers, terpolymers, and the like. The various types of polymerization reactors include those that can be referred to as a batch reactor, slurry reactor, gas-phase reactor, solution reactor, high pressure reactor, tubular reactor, autoclave reactor, and the like, or combinations thereof. The polymerization conditions for the various reactor types are well known to those of skill in the art. Gas phase reactors can comprise fluidized bed reactors or staged horizontal reactors. Slurry reactors can comprise vertical or horizontal loops. High pressure reactors can comprise autoclave or tubular reactors. Reactor types can include batch or continuous processes. Continuous processes could use intermittent or continuous product discharge. Polymerization reactor systems and processes also can include partial or full direct recycle of unreacted monomer, unreacted comonomer, and/or diluent.

A polymerization reactor system can comprise one type of reactor or multiple reactors of the same or different type. For instance, the polymerization reactor system can comprise a slurry reactor, a gas-phase reactor, a solution reactor, or a combination of two or more of these reactors. Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop and/or gas phase reactors. The multiple reactors can be operated in series, in parallel, or both.

According to one aspect, the polymerization reactor system can comprise at least one loop slurry reactor comprising vertical or horizontal loops. Monomer, diluent, catalyst, and comonomer can be continuously fed to a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction; separation by cyclonic action in either a cyclone or hydrocyclone; or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, and 6,833,415, each of which is incorporated herein by reference in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another aspect, the polymerization reactor system can comprise at least one gas phase reactor (e.g., a fluidized bed reactor). Such reactor systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790, and 5,436,304, each of which is incorporated by reference in its entirety herein.

According to still another aspect, the polymerization reactor system can comprise a high pressure polymerization reactor, e.g., can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately to obtain optimal polymerization reaction conditions.

According to yet another aspect, the polymerization reactor system can comprise a solution polymerization reactor wherein the monomer/comonomer are contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone can be maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

The polymerization reactor system can further comprise any combination of at least one raw material feed system, at least one feed system for catalyst or catalyst components, and/or at least one polymer recovery system. Suitable reactor systems can further comprise systems for feedstock purification, catalyst storage and preparation, extrusion, reactor cooling, polymer recovery, fractionation, recycle, storage, load-out, laboratory analysis, and process control.

Polymerization conditions that are controlled for efficiency and to provide desired polymer properties can include temperature, pressure, and the concentrations of various reactants. Polymerization temperature can affect catalyst productivity, polymer molecular weight, and molecular weight distribution. A suitable polymerization temperature can be any temperature below the de-polymerization temperature according to the Gibbs Free energy equation. Typically, this includes from about 60° C. to about 280° C., for example, or from about 60° C. to about 110° C., depending upon the type of polymerization reactor. In some reactor systems, the polymerization temperature generally can be within a range from about 70° C. to about 90° C., or from about 75° C. to about 85° C.

Suitable pressures will also vary according to the reactor and polymerization type. The pressure for liquid phase polymerizations in a loop reactor is typically less than 1000 psig (6.9 MPa). The pressure for gas phase polymerization is usually in the 200 to 500 psig range (1.4 MPa to 3.4 MPa). High pressure polymerization in tubular or autoclave reactors generally can be conducted at about 20,000 to 75,000 psig (138 to 517 MPa). Polymerization reactors can also be operated in a supercritical region occurring at generally higher temperatures and pressures. Operation above the critical point of a pressure/temperature diagram (supercritical phase) may offer advantages.

As an example, a representative set of polymerization conditions can include, among others, a polymerization reaction temperature in a range from about 60° C. to about 110° C., (or from about 70° C. to about 90° C.), and a reaction pressure in a range from about 200 to about 1000 psig (about 1.4 to about 6.9 MPa).

The concentration of the reactants entering the polymerization reactor can be controlled to produce resins with certain physical and mechanical properties. The proposed end-use product that will be formed by the polymer resin and the method of forming that product ultimately can determine the desired polymer properties and attributes. Mechanical properties include tensile, flexural, impact, creep, stress relaxation, and hardness tests. Physical properties include density, molecular weight, molecular weight distribution, melting temperature, glass transition temperature, temperature melt of crystallization, density, stereoregularity, crack growth, long chain branching, and theological measurements.

This invention is also directed to, and encompasses, the polymers produced by any of the polymerization processes and methods disclosed herein. Articles of manufacture can be formed from, and/or can comprise, the polymers produced in accordance with this invention.

EXAMPLES

The invention is further illustrated by the following examples, which are not to be construed in any way as imposing limitations to the scope of this invention. Various other aspects, embodiments, modifications, and equivalents thereof which, after reading the description herein, may suggest themselves to one of ordinary skill in the art without departing from the spirit of the present invention or the scope of the appended claims.

The sulfated alumina activator-support used in the examples was prepared as follows. Bohemite was obtained from W.R. Grace Company under the designation "Alumina A" and having a surface area of about 300 m$^2$/g and a pore volume of about 1.3 mL/g. This material was obtained as a powder having an average particle size of about 100 microns. This material was impregnated to incipient wetness with an aqueous solution of ammonium sulfate to equal about 15% sulfate. This mixture was then placed in a flat pan and allowed to dry under vacuum at approximately 110° C. for about 16 hours. To calcine the resultant powdered mixture, the material was fluidized in a stream of dry air at about 550° C. for about 6 hours. Afterward, the sulfated alumina was collected and stored under dry nitrogen, and was used without exposure to the atmosphere.

Melt index (NH, g/10 min) was determined in accordance with ASTM D1238 at 190° C. with a 2,160 gram weight.

High load melt index (HLMI, g/10 min) was determined in accordance with ASTM D1238 at 190° C. with a 21,600 gram weight.

Molecular weights and molecular weight distributions were obtained using a PL 220 high temperature GPC/SEC unit (Polymer Laboratories, now an Agilent company) with 1,2,4-trichlorobenzene (TCB) as the solvent, and with a flow rate of 1 mL/min at a temperature of 145° C. 2,6-di-tert-butyl-4-methylphenol (BHT) at a concentration of 0.5 g/L was added to the solvent as a stabilizer. An injection volume of 400 µL was used with a nominal polymer concentration of 1.5 mg/mL. Dissolution of the sample in stabilized TCB was carried out by heating at 150° C. for 5 hr or longer, depending upon the sample, with occasional gentle agitation. The columns used were three Waters Styragel HMW-6E columns (7.8×300 mm) (Waters Corp., MA), and were calibrated with the broad calibration method using a broad linear polyethylene standard (Chevron Phillips Chemical Company Marlex® BHB 5003), whose molecular weight and molecular weight distribution had been determined separately.

Mn is the number-average molecular weight (g/mol); Mw is the weight-average molecular weight (g/mol); Mz is the z-average molecular weight (g/mol); Mv is the viscosity-average molecular weight (g/mol); and Mp is the peak molecular weight.

Examples 1-5

Polymerization Experiments Using Hydrogen and/or Diethylzinc (DEZ)

All polymerization experiments were conducted for either 30 min or 60 min in a one-gallon (3.8-L) stainless-steel autoclave reactor containing two liters of isobutane as diluent. Sulfated alumina was used as the activator. The metallocene compound was pentamethylcyclopentadienyl chromium dichloride, and the neutral ligand was pyridine, with zero or one coordinated, with the metallocene compound. A solution of the metallocene was prepared by dissolving about 2 mg of the metallocene compound in about 2 mL of toluene.

Example 1

Under isobutane purge, 0.5 mL of a TIBA solution (25% in heptanes) were charged to a cold reactor, followed by 1 mL of the metallocene solution, and, 0.2 g of the sulfated alumina. The reactor was sealed, 2 L of isobutane were added, and stirring was initiated at 700 rpm. As the reactor temperature approached the target run temperature of 105° C., ethylene and hydrogen (molar ratio of $H_2/C_2$=0.1) were added to maintain a reactor pressure of 584 psi (4 MPa) throughout the run. The reactor was maintained at 105° C. for 60 min, and then the volatiles were vented from the reactor. Solid polyethylene was collected from the reactor (297 g).

Example 2

Under isobutane purge, 0.5 mL of a TIBA solution (25% in heptanes) and 0.2 mL of DEZ (14.3% in heptanes) were charged to a cold reactor, followed by 1 mL of the metallocene solution, and 0.2 g of the sulfated alumina. The reactor was sealed, 2 L of isobutane were added, and stirring was initiated at 700 rpm. As the reactor temperature approached the target run temperature of 105° C., ethylene and hydrogen (molar ratio of $H_2/C_2$=0.1) were added to maintain a reactor pressure of 584 psi (4 MPa). The reactor was maintained at 105 for 60 min, and then the volatiles were vented from the reactor. Solid polyethylene was collected from the reactor (288 g).

Example 3

Under isobutane purge, 0.5 mL of a TIBA solution (25% in heptanes) were charged to a cold reactor, followed by 1 mL of the metallocene solution, and 0.2 g of the sulfated alumina. The reactor was sealed, 2 E of isobutane were added, and stirring was initiated at 700 rpm. As the reactor temperature approached the target run temperature of 105° C., ethylene was added to maintain a reactor pressure of 490 psi (3.4 MPa) throughout the run. The reactor was maintained at 105° C. for 30 min, and then the volatiles were vented from the reactor. Solid polyethylene was collected from the reactor (182 g).

Example 4

Under isobutane purge, 0.5 nit, of a TIBA solution (25% in heptanes) and 0.2 mL of DEZ (14.3% in heptanes) were charged to a cold reactor, followed by 1 mL of the metallocene solution, and 0.2 g of the sulfated alumina. The reactor was sealed, 2 L of isobutane were added, and stirring was initiated at 700 rpm. As the reactor temperature approached the target run temperature of 105° C., ethylene was added to maintain a reactor pressure of 490 psi (3.4 MPa). The reactor was maintained at 105° C. for 30 min, and then the volatiles were vented from the reactor. Solid polyethylene was collected from the reactor (171 g).

Example 5

Under isobutane purge, 0.5 mL of a TIBA solution (25% in heptanes) and 5 in L of DEZ (14.3% in heptanes) were charged to a cold reactor, followed by 1 mL of the metallocene solution, and 0.2 g of the sulfated alumina. The reactor was sealed, 2 L of isobutane were added, and stirring was initiated at 700 rpm. As the reactor temperature approached the target run temperature of 105 ethylene was added to maintain a reactor pressure of 490 psi (3.4 MPa). The reactor was maintained at 105° C., for 30 min, and then the volatiles were vented from the reactor. Solid polyethylene was collected from the reactor (143 g).

Figure 2:
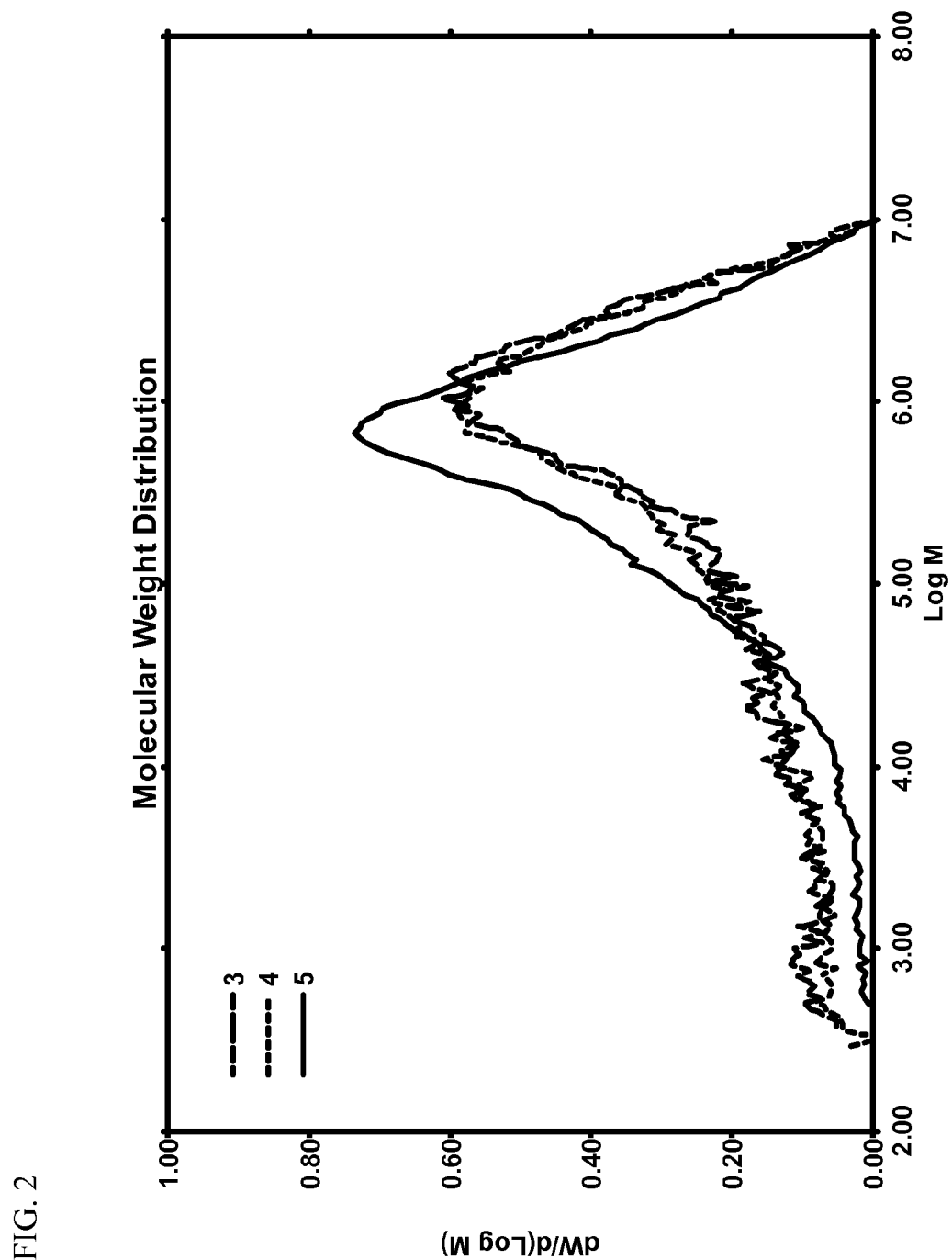
FIG. 2 presents a plot of the molecular weight distributions of the polymers of Examples 3-5.

Table I summarizes certain polymerization reaction conditions, catalyst activities (grams of polyethylene), and polymer properties for Examples 1-5. The DEZ concentration was based on the total liquid volume in the reactor. FIG. 1 illustrates the molecular weight distributions of the polymers of Examples 1-2, and FIG. 2 illustrates the molecular weight distributions of the polymers of Examples 3-5.

As compared to Example 3, the addition of DEZ in Examples 4-5 had relatively little effect on MI, HLMI, Mw, Mz, and MV. As compared to Example 3, the addition of hydrogen in Example 1 increased the MI and HEW and decreased all molecular weight parameters, but at the same time, the catalyst activity was reduced. Unexpectedly, the addition of hydrogen and DEZ in Example 2 resulted in a synergistic reduction in Mw, Mz, Mv, and Mp, and a synergistic increase in MI and HLMI. For comparison, see the individual effect of hydrogen in Example 1 and the individual effect of DEZ in Example 4. Moreover, Mn was largely unaffected in Example 2.

Constructive Examples 6-7

Constructive Polymerization Experiments with and without Hydrogen and an Organozinc Compound A production-scale loop slurry reactor running under standard polymerization conditions is used. The reactor size is about 27,000 gal (102 kL), the reactor temperature is in the 80-120° C. range (e.g., 105° C.), the reactor pressure is in the 2.7-5.1 MPa psig range 3.4-4.1 MPa), and the ethylene weight percent is in the 3-9.5% range (e.g., 5-7%). A comonomer, such as 1-hexene, can be added to the polymerization reactor to produce an olefin polymer having a density within the 0.89-0.95 g/cm$^3$ range, for instance, a density in the 0.91-0.93 g/cm$^3$ range. However, in Constructive Examples 6-7, no comonomer is added. The catalyst composition for these Constructive Examples can include a metallocene compound (e.g., pentamethylcyclopentadienyl chromium dichloride), an activator-support (e.g., sulfated alumina), and an organoaluminum (e.g., TIBA).

Constructive Example 6 does not utilize hydrogen and an organozinc compound (e.g., DEZ), while Constructive Example 7 utilizes a synergistic amount of hydrogen and an organozinc compound (e.g., DEZ). The olefin polymer produced in Constructive Example 6 can be an ethylene homopolymer having a Mw of about 1,000,000 g/mol, and a MI and HLMI that cannot be measured (i.e., too low). This polymer can be produced at a production rate in a range of about 11,500 to about 16,000 kg/hr. In Constructive Example 7, hydrogen can be added to the reactor at a hydrogen:ethylene monomer molar ratio in the 0.01:1 to 0.2:1 range (e.g., a molar ratio of 0.1:1). DEZ can be added directly to the reactor at a feed rate that provides a hydrogen:DEZ molar ratio in the 100:1 to 25,000:1 range (e.g., a molar ratio of 500:1, or 2,500:1, or 5,000:1). At generally the same production rate as Constructive Example 6, the olefin polymer of Constructive Example 7 can be produced: an ethylene homopolymer having a MI of greater than 1 (e.g., a nominal MI of 4) and a Mw of less than 200,000 g/mol (e.g., a Mw of 100,000 g/mol). Thus, the addition of the synergistic amount of hydrogen and the organozinc compound (e.g., DEZ) in Constructive Example 7 can reduce Mw and increase MI as compared to Constructive Example 6. The synergistic amount of hydrogen and the organozinc compound (e.g., DEZ) can be varied throughout the production run of the olefin polymer of Constructive Example 7 in order to control the desired polymer properties, such as MI and Mw, amongst other properties. It is expected that any variation in the respective amounts of hydrogen and the organozinc compound during the course of the production nm n (i.e., to produce the nominal 4 MI polyethylene) can be within the hydrogen:organozinc compound molar ratio range of 100:1 to 25,000:1 (or in the 200:1 to 20,000:1 range, or in the 500:1 to 5000:1 range),

TABLE I

Summary of Examples 1-5

| Example | H$_2$/Ethylene (molar ratio) | [DEZ] (mmol/L) | H$_2$/DEZ (molar ratio) | MI (g/10 min) | HLMI (g/10 min) | HLMI/MI | Run Time (min) | PE (grams) |
|---|---|---|---|---|---|---|---|---|
| 1 | 0.1 | 0 | N/A | 1.28 | 49 | 38 | 60 | 297 |
| 2 | 0.1 | 0.0845 | 2.300 | 4.58 | 150 | 33 | 60 | 288 |
| 3 | 0 | 0 | N/A | too low | too low | N/A | 30 | 182 |

TABLE I-continued

Summary of Examples 1-5

| | | | | | | | | |
|---|---|---|---|---|---|---|---|---|
| 4 | 0 | 0.0845 | 0 | too low | too low | N/A | 30 | 171 |
| 5 | 0 | 2.1125 | 0 | too low | too low | N/A | 30 | 143 |

| Example | Mn/1000 (g/mol) | Mw/1000 (g/mol) | Mz/1000 (g/mol) | Mv/1000 (g/mol) | Mp/1000 (g/mol) | Mw/Mn | Mz/Mw |
|---|---|---|---|---|---|---|---|
| 1 | 9.4 | 180 | 1898 | 127 | 73 | 19.2 | 10.52 |
| 2 | 10.0 | 96 | 337 | 78 | 59 | 9.6 | 3.50 |
| 3 | 11.3 | 1014 | 2877 | 809 | 830 | 89.4 | 2.84 |
| 4 | 9.8 | 1063 | 3024 | 839 | 1210 | 108.2 | 2.85 |
| 5 | 44.7 | 932 | 2528 | 774 | 650 | 20.9 | 2.71 |

We claim:

1. A method of controlling a polymerization reaction in a polymerization reactor system, the method comprising:
  (i) introducing a transition metal-based catalyst composition, ethylene, and an olefin comonomer into a polymerization reactor within the polymerization reactor system, wherein the transition metal-based catalyst composition comprises (a) a transition metal compound comprising chromium; (b) an activator-support comprising a solid oxide treated with an electron-withdrawing anion; and (c) a co-catalyst comprising an organoaluminum compound;
  (ii) contacting the transition metal-based catalyst composition with ethylene and the olefin comonomer under polymerization conditions to produce an ethylene polymer; and
  (iii) introducing a synergistic amount of hydrogen and an organozinc compound into the polymerization reactor system to increase a melt index (MI) of the ethylene polymer to within a range from about 1 to about 20 g/10 min;

wherein:
  the organozinc compound comprises diethylzinc;
  the olefin comonomer comprises 1-butene, 1-hexene, 1-octene, or a mixture thereof; and
  the polymerization reactor system comprises a slurry reactor, a gas-phase reactor, a solution reactor, or a combination thereof.

2. The method of claim 1, wherein:
  the synergistic amount of hydrogen and the organozinc compound comprises a hydrogen:organozinc compound molar ratio in a range from about 500:1 to about 7,500:1; and
  hydrogen is added to the polymerization reactor system at a hydrogen:ethylene molar ratio in a range from about 0.01:1 to about 0.2:1.

3. The method of claim 2, wherein the MI of the ethylene polymer is increased to within a range from about 1 to about 10 g/10 min.

4. An olefin polymerization process, the process comprising:
  contacting a transition metal-based catalyst composition with ethylene and an olefin comonomer under polymerization conditions, and in the presence of a synergistic amount of hydrogen and an organozinc compound, to produce an ethylene polymer; wherein the transition metal-based catalyst composition comprises (a) a transition metal compound; (b) an activator-support comprising a solid oxide treated with an electron-withdrawing anion; and (c) an organoaluminum co-catalyst; and wherein:
  the olefin comonomer comprises 1-butene, 1-hexene, 1-octene, or a mixture thereof;
  the synergistic amount of hydrogen and the organozinc compound comprises a hydrogen:organozinc compound molar ratio in a range from about 500:1 to about 7,500:1; and
  a Mw of the ethylene polymer is in a range from about 50,000 to about 250,000 g/mol and/or a MI of the ethylene polymer is greater than about 1 g/10 min.

5. The process of claim 4, wherein:
  the organozinc compound comprises diethylzinc;
  the activator-support comprises fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, or any combination thereof; and
  the organoaluminum co-catalyst comprises trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, or any combination thereof.

6. The process of claim 5, wherein:
  the transition metal compound comprises chromium;
  the Mw of the ethylene polymer is within a range from about 60,000 to about 180,000 g/mol; and
  the MI of the ethylene polymer is within a range from about 1.5 to about 20 g/10 min.

7. A method of controlling a polymerization reaction in a polymerization reactor system, the method comprising:
  (i) introducing a transition metal-based catalyst composition, an olefin monomer, and optionally an olefin comonomer into a polymerization reactor within the polymerization reactor system, wherein the transition metal-based catalyst composition comprises (a) a transition metal compound; (b) an activator; and (c) optionally, a co-catalyst;
  (ii) contacting the transition metal-based catalyst composition with the olefin monomer and the optional olefin comonomer under polymerization conditions to produce an olefin polymer; and
  (iii) introducing a synergistic amount of hydrogen and an organozinc compound into the polymerization reactor system to reduce a weight-average molecular weight (Mw) and/or to increase a melt index (MI) of the olefin polymer;

wherein:
the activator comprises an aluminoxane compound, an organoboron or organoborate compound, an ionizing ionic compound, or any combination thereof;
the synergistic amount of hydrogen and the organozinc compound comprises a hydrogen:organozinc compound molar ratio in a range from about 100:1 to about 25,000:1; and
a Mn of the olefin polymer is substantially unchanged and/or a ratio of Mw/Mn of the olefin polymer is reduced by at least 75%.

8. The method of claim 7, wherein the transition metal compound has the formula:

$$Cr(X^4)(X^1)(X^2)(L)_n;$$ wherein:

$X^4$ is a substituted or unsubstituted cyclopentadienyl, indenyl, or fluorenyl group;
$X^1$ and $X^2$ independently are a monoanionic ligand; and
L is a neutral ligand, wherein n is 0, 1, or 2.

9. The method of claim 8, wherein:
$X^4$ is a substituted cyclopentadienyl group;
$X^1$ and $X^2$ independently are hydrogen, a halide, a $C_1$ to $C_{36}$ hydrocarbyl group, a $C_1$ to $C_{36}$ hydrocarbyloxy group, a $C_1$ to $C_{36}$ hydrocarbylaminyl group, a $C_1$ to $C_{36}$ hydrocarbylsilyl group, a $C_1$ to $C_{36}$ hydrocarbylaminylsilyl group, $OBR^A_2$, or $OSO_2R^A$, wherein $R^A$ is a $C_1$ to $C_{36}$ hydrocarbyl group; and
L is an ether, a thioether, an amine, a nitrile, or a phosphine.

10. The method of claim 7, wherein:
the catalyst composition is contacted with ethylene and an olefin comonomer comprising 1-butene, 1-hexene, 1-octene, or a mixture thereof; and
the catalyst composition comprises an organoaluminum co-catalyst.

11. The method of claim 10, wherein:
the activator comprises an aluminoxane compound; and
the organozinc compound comprises diethylzinc.

12. The method of claim 11, wherein the polymerization reactor system comprises a slurry reactor, a gas-phase reactor, a solution reactor, or a combination thereof.

13. The method of claim 7, wherein:
the synergistic amount of hydrogen and the organozinc compound comprises a hydrogen:organozinc compound molar ratio in a range from about 500:1 to about 7,500:1;
hydrogen is added to the polymerization reactor system at a hydrogen:olefin monomer molar ratio in a range from about 0.01:1 to about 0.2:1; and
the MI of the olefin polymer is increased to within a range from about 1 to about 10 g/10 min.

14. The method of claim 13, wherein:
the organozinc compound comprises diethylzinc; and
the catalyst composition is contacted with ethylene and an olefin comonomer comprising 1-butene, 1-hexene, 1-octene, or a mixture thereof.

15. The method of claim 14, wherein:
the polymerization reactor system comprises a slurry reactor, a gas-phase reactor, a solution reactor, or a combination thereof; and
the transition metal-based catalyst composition comprises a transition metal compound comprising chromium, an activator comprising an aluminoxane compound, and a co-catalyst comprising an organoaluminum compound.

16. An olefin polymerization process, the process comprising:
contacting a transition metal-based catalyst composition with ethylene and an olefin comonomer under polymerization conditions, and in the presence of a synergistic amount of hydrogen and an organozinc compound, to produce an ethylene polymer; wherein the transition metal-based catalyst composition comprises (a) a transition metal compound; (b) an activator comprising an aluminoxane compound, an organoboron or organoborate compound, an ionizing ionic compound, or any combination thereof; and (c) optionally, a co-catalyst; and wherein:
the olefin comonomer comprises 1-butene, 1-hexene, 1-octene, or a mixture thereof;
a Mw of the ethylene polymer is in a range from about 50,000 to about 250,000 g/mol; and
a MI of the ethylene polymer is greater than about 1 g/10 min.

17. The process of claim 16, wherein:
a Mn of the ethylene polymer is substantially unchanged; and
a ratio of Mw/Mn of the ethylene polymer is reduced by at least 75%.

18. The process of claim 16, wherein:
the catalyst composition comprises an organoaluminum co-catalyst;
the synergistic amount of hydrogen and the organozinc compound comprises a hydrogen:organozinc compound molar ratio in a range from about 500:1 to about 7,500:1.

19. The process of claim 18, wherein:
the organozinc compound comprises diethylzinc;
the organoaluminum co-catalyst comprises trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, or any combination thereof.

20. The process of claim 16, wherein:
the transition metal compound comprises chromium;
the Mw of the ethylene polymer is within a range from about 60,000 to about 180,000 g/mol; and
the MI of the ethylene polymer is within a range from about 1.5 to about 20 g/10 min.

* * * * *